United States Patent
Murphy et al.

(10) Patent No.: US 11,561,993 B2
(45) Date of Patent: Jan. 24, 2023

(54) GENERATING REAL-TIME AGGREGATES AT SCALE FOR INCLUSION IN ONE OR MORE MODIFIED FIELDS IN A PRODUCED SUBSET OF DATA

(71) Applicant: Ab Initio Technology LLC, Lexington, MA (US)

(72) Inventors: Trevor Murphy, Singapore (SG); Oded Ravid, Lincoln, MA (US)

(73) Assignee: Ab Initio Technology LLC, Lexington, MA (US)

(*) Notice: Subject to any disclaimer, the term of this patent is extended or adjusted under 35 U.S.C. 154(b) by 184 days.

(21) Appl. No.: 16/163,647

(22) Filed: Oct. 18, 2018

(65) Prior Publication Data
US 2020/0050680 A1   Feb. 13, 2020

Related U.S. Application Data

(60) Provisional application No. 62/716,155, filed on Aug. 8, 2018.

(51) Int. Cl.
*G06F 16/25* (2019.01)
*G06F 16/21* (2019.01)
(Continued)

(52) U.S. Cl.
CPC .......... *G06F 16/252* (2019.01); *G06F 16/212* (2019.01); *G06F 16/2255* (2019.01); *G06F 16/244* (2019.01); *G06F 16/2456* (2019.01)

(58) Field of Classification Search
CPC .. G06F 16/252; G06F 16/2255; G06F 16/212; G06F 16/244; G06F 16/2456
See application file for complete search history.

(56) References Cited

U.S. PATENT DOCUMENTS 5,966,072 A    10/1999  Stanfill et al.
6,505,189 B1 *  1/2003  On Au ............... G06F 16/24556
(Continued)

FOREIGN PATENT DOCUMENTS

EP          3188043       7/2017
WO    WO 2017/023340      2/2017

OTHER PUBLICATIONS

PCT International Search Report and Written Opinion in International Appln. No. PCT/US2019/045115, dated Dec. 17, 2019, 18 pages.

(Continued)

*Primary Examiner* — Miranda Le
(74) *Attorney, Agent, or Firm* — Fish & Richardson P.C.

(57) ABSTRACT

A data processing system for producing a subset of data from a plurality of data sources, including: memory storing a plurality of data sources to be represented in an editor interface; a data structure modification module that selects a plurality of data sources to be represented in an editor interface and generates a subset of data included in the plurality of data sources; memory that stores the selected data structures included in the subset, with at least one of the stored data structures including the one or more modified attributes of the one or more respective fields; rendering module that displays, in the editor interface, representations of the stored data structures; and a segmentation modules that segments a plurality of received data records.

24 Claims, 34 Drawing Sheets

(51) Int. Cl.
*G06F 16/242* (2019.01)
*G06F 16/22* (2019.01)
*G06F 16/2455* (2019.01)

(56) References Cited

U.S. PATENT DOCUMENTS

| | | | | |
|---|---|---|---|---|
| 6,768,995 | B2* | 7/2004 | Thier | G06F 16/24556 |
| 7,519,620 | B2 | 4/2009 | Yokouchi | |
| 7,747,473 | B1* | 6/2010 | Mesaros | G06Q 30/0224 |
| | | | | 705/14.25 |
| 7,873,541 | B1* | 1/2011 | Klar | G06Q 10/08345 |
| | | | | 705/14.1 |
| 8,682,925 | B1 | 3/2014 | Marquardt et al. | |
| 8,738,619 | B2* | 5/2014 | Lambert | G06F 16/24556 |
| | | | | 707/736 |
| 8,938,416 | B1* | 1/2015 | Cole | G06F 16/283 |
| | | | | 707/607 |
| 9,619,502 | B2 | 4/2017 | Klauke et al. | |
| 9,747,351 | B2 | 8/2017 | Boe et al. | |
| 2005/0125280 | A1* | 6/2005 | Carr | G06Q 30/0631 |
| | | | | 705/26.7 |
| 2005/0192941 | A1* | 9/2005 | Biedenstein | G06F 16/24556 |
| 2009/0327208 | A1* | 12/2009 | Bittner | G06F 16/24564 |
| | | | | 706/61 |
| 2011/0227754 | A1* | 9/2011 | Hill | G06F 16/244 |
| | | | | 340/870.01 |
| 2014/0214753 | A1* | 7/2014 | Guerra | G06F 16/254 |
| | | | | 707/602 |
| 2017/0344672 | A1 | 11/2017 | Gould et al. | |

OTHER PUBLICATIONS

Andre Freitas and Edward Curry, "Big Data Curation, New Horizons for a Data-Driven Economy", Springer Nature, 2017, pp. 87-118.

Informatica Enterprise Data Catalog, Informatica LLC, 2018, 5 pages.

"Using Data flows to Create Curated Data Sets," Oracle, 2016, 2 pages.

"Real-time event aggregation at scale using Postgres w/Citus," Citus Data, Inc., 2018.

"Aggregating Streaming Data in Real Time," WSO2 Inc. 2015-2018, 6 pages.

Baulier et al., "A Database System for Real-Time Event Aggregation in Telecommunication," Information Sciences Research Center, Bell Labs, Lucent Technologies, jdb.blott.hfk.avi@research.bell-labs.com, pp. 680-684.

Remond, "Mastering Qlikview," Packt Publishing, Nov. 26, 2014, 165-346, 182 pages.

* cited by examiner

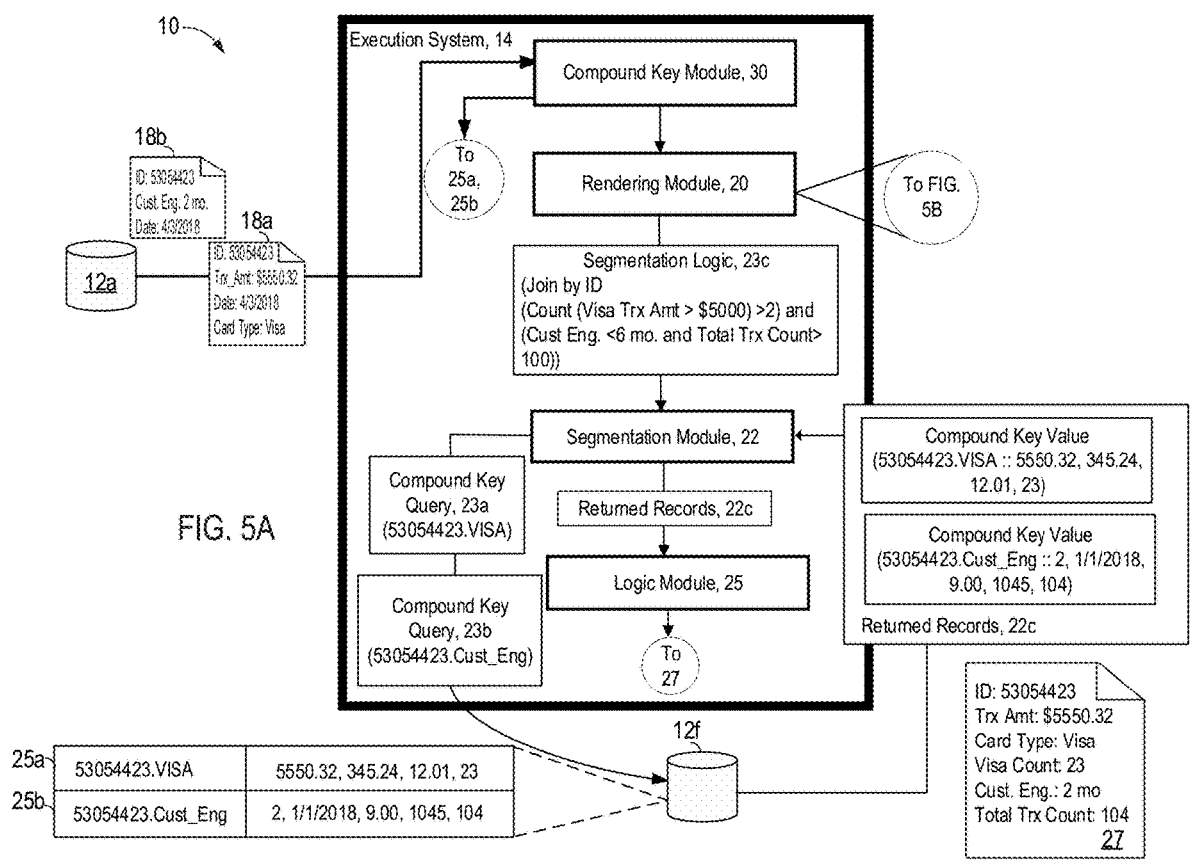

210 ⟶

Create Subscriber Entity

| Subscriber Enrichments | 210a |
| in.subscriber_profile.subscriber | 210b |
| Subscriber Profile | 210c |

Entity Fields ⟵ 212n

| Field Name ⟵212k | Business Name ⟵212l | Type | Cmd |
|---|---|---|---|
| msisdn ⟵212a | MSISDN | long_t | ✎ 🗑 |
| prefix_flag ⟵212b | Prefix Flag | string_t | ✎ 🗑 |
| imsi ⟵212c | IMSI | long_t | ✎ 🗑 |
| subs_status ⟵212d | Subscriber Status | string_t | ✎ 🗑 |
| SIM_card_4G ⟵212e | SIM Card 4G | string_t | ✎ 🗑 |
| cust_no ⟵212f | Customer No ⟵212g | long_t | ✎ 🗑 |
| payment_category ⟵ | Payment Category | string_t | ✎ 🗑 |
| Prc_pln_id ⟵212h | Price Plan Name ⟵212m | int_t | ✎ 🗑 |
| ppg ⟵212i | Price Plan Group | string_t | ✎ 🗑 |
| sppg ⟵212j | Super Priceplan Group | string_t | ✎ 🗑 |

Showing 1 to 10 of 48 entries   Prev 1 2 3 4 5 Next

[OK] [Cancel]

Edit Subscriber Entity

Subscriber Enrichments in.subscriber_profile.subscriber.

Subscriber Profile

Entity Fields                                                    272

[🔍]                                              [Create...] [10 ▼]

| Field Name | Business Name | Type | Cmd |
|---|---|---|---|
| msisdn | MSISDN | long_t | ✏️ 🗑️ |
| prefix_flag | Prefix Flag | string_t | ✏️ 🗑️ |
| imsi | IMSI | long_t | ✏️ 🗑️ |
| subs_status | Subscriber Status | string_t | ✏️ 🗑️ |
| SIM_card_4G | SIM Card 4G | string_t | ✏️ 🗑️ |
| cust_no | Customer No | long_t | ✏️ 🗑️ |
| payment_category | Payment Category | string_t | ✏️ 🗑️ |
| Prc_pln_id | Price Plan Name | int_t | ✏️ 🗑️ |
| ppg | Price Plan Group | string_t | ✏️ 🗑️ |
| sppg | Super Priceplan Group | string_t | ✏️ 🗑️ |

212

Showing 1 to 10 of 48 entries          Prev [1] 2 3 4 5 Next

[OK] [Cancel]

Edit Subscriber Entity

Subscriber Enrichments in.subscriber_profile.subscriber.

Subscriber Profile

Entity Fields

Create... | 10 ▼

| Field Name | Business Name | Type | Cmd |
|---|---|---|---|
| msisdn | MSISDN | long_t | ✎ 🗑 |
| prefix_flag | Prefix Flag | string_t | ✎ 🗑 |
| imsi | IMSI | long_t | ✎ 🗑 |
| subs_status | Subscriber Status | string_t | ✎ 🗑 |
| SIM_card_4G | SIM Card 4G | string_t | ✎ 🗑 |
| cust_no | Customer No | long_t | ✎ 🗑 |
| payment_category | Payment Category | string_t | ✎ 🗑 |
| Prc_pln_id | Price Plan Name | int_t | ✎ 🗑 |
| ppg | Price Plan Group | string_t | ✎ 🗑 |
| sppg | Super Priceplan Group | string_t | ✎ 🗑 |
| SMS_usg_cnt ╱278 | SMS Usage Count | int_t | ✎ 🗑 |

212

Showing 1 to 10 of 48 entries    Prev | 1 | 2 | 3 | 4 | 5 | Next

OK   Cancel

FIG. 8S

GENERATING REAL-TIME AGGREGATES AT SCALE FOR INCLUSION IN ONE OR MORE MODIFIED FIELDS IN A PRODUCED SUBSET OF DATA

CLAIM OF PRIORITY

This application claims priority to U.S. patent application Ser. No. 62/716,155, filed on Aug. 8, 2018, the entire contents of which are incorporated here by reference.

TECHNICAL FIELD

The present application relates to aggregating of data in a networked database environment. The present application also relates to segmenting of data in a networked database environment.

BACKGROUND

In a database management system, the primary data source is the database, which can be located in a disk or a remote server. The data source for a computer program can be a file, a data sheet, a spreadsheet, an XML file or even hard-coded data within the program.

SUMMARY

In a general aspect 1, described is a method implemented by a data processing system for producing a subset of data from a plurality of data sources, modifying one or more attributes of one or more respective fields of the subset and displaying an editor interface that enables segmentation of data records by displaying one or more representations of the one or more modified fields, the method including: selecting a plurality of data sources to be represented in an editor interface; generating a subset of data included in the plurality of data sources, by: for each of the data sources, selecting one or more data structures from that data source, with each data structure including one or more fields; for at least one selected data structure, modifying one or more attributes of one or more respective fields in that data structure; storing in memory selected data structures included in the subset, with at least one of the stored data structures including the one or more modified attributes of the one or more respective fields; displaying, in the editor interface, representations of the stored data structures, with at least one of the representations being of the one or more modified attributes of the one or more respective fields, with each representation including one or more selectable portions, with a selectable portion representing a field of a data structure; receiving, through the editor interface, selection data specifying selection of one or more selectable portions; and segmenting a plurality of received data records by identifying which of the received data records have one or more fields that correspond to one or more fields represented in the one or more selectable portions selected.

In an aspect 2 according to aspect 1, a data structure includes a key field that represents a key for that data structure, a record is associated with a value of the key, and the method further includes: selecting a plurality of fields from a plurality of the selected data structures; storing in memory executable instructions that when executed: select, for a specified value of the key, values for the respective selected fields; join the selected values for the specified value of the key; and output the joined values.

In an aspect 3 according to any one of aspects 1 to 2, the representations are first representations, and the method further includes: displaying in the editor interface a second representation of the executable instructions.

In an aspect 4 according to any one of aspects 1 to 3, the method further includes: receiving, through the editor interface, additional selection data specifying selection of the second representation and further specifying that the one or more criteria be applied to those output, joined values of the one or more given fields represented by the one or more selectable portions selected through the editor interface.

In an aspect 5 according to any one of aspects 1 to 4, the method further includes: displaying a user interface with one or more first controls for selecting data structures and with one or more second controls for modifying the one or more fields.

In an aspect 6 according to any one of aspects 1 to 5, the method further includes: receiving, through the editor interface, additional data specifying one or more criteria to be applied to one or more given fields represented by the one or more selectable portions selected through the editor interface; wherein segmenting includes segmenting the plurality of received data records by identifying which of the received data records have one or more value of one or more fields that correspond to one or more fields represented in the one or more selectable portions selected and that satisfy the one or more criteria.

In an aspect 7 according to any one of aspects 1 to 6, a data structure includes one or more records, with each record having one or more values for a particular field.

In an aspect 8 according to any one of aspects 1 to 7, at least one of the data sources includes an unselected data structure.

In a general aspect 9, described is a data processing system for producing a subset of data from a plurality of data sources, modifying one or more attributes of one or more respective fields of the subset and displaying an editor interface that enables segmentation by displaying one or more representations of the one or more modified fields, the data processing system including: one or more processing devices; and one or more machine-readable hardware storage devices storing instructions that are executable by the one or more processing devices to perform operations including: selecting a plurality of data sources to be represented in an editor interface; generating a subset of data included in the plurality of data sources, by: for each of the data sources, selecting one or more data structures from that data source, with each data structure including one or more fields; for at least one selected data structure, modifying one or more attributes of one or more respective fields in that data structure; storing in memory selected data structures included in the subset, with at least one of the stored data structures including the one or more modified attributes of the one or more respective fields; displaying, in the editor interface, representations of the stored data structures, with at least one of the representations being of the one or more modified attributes of the one or more respective fields, with each representation including one or more selectable portions, with a selectable portion representing a field of a data structure; receiving, through the editor interface, selection data specifying selection of one or more selectable portions; and segmenting a plurality of received data records by identifying which of the received data records have one or more fields that correspond to one or more fields represented in the one or more selectable portions selected.

In an aspect 10 according to aspect 9, a data structure includes a key field that represents a key for that data structure, a record is associated with a value of the key, and the one or more operations further include: selecting a plurality of fields from a plurality of the selected data structures; storing in memory executable instructions that when executed: select, for a specified value of the key, values for the respective selected fields; join the selected values for the specified value of the key; and output the joined values.

In an aspect 11 according to any one of aspects 9 to 10, the representations are first representations, and wherein the one or more operations further include: displaying in the editor interface a second representation of the executable instructions.

In an aspect 12 according to any one of aspects 9 to 11, the one or more operations further include: receiving, through the editor interface, additional selection data specifying selection of the second representation and further specifying that the one or more criteria be applied to those output, joined values of the one or more given fields represented by the one or more selectable portions selected through the editor interface.

In an aspect 13 according to any one of aspects 9 to 12, the one or more operations further include: displaying a user interface with one or more first controls for selecting data structures and with one or more second controls for modifying the one or more fields.

In an aspect 14 according to any one of aspects 9 to 13, the one or more operations further include: receiving, through the editor interface, additional data specifying one or more criteria to be applied to one or more given fields represented by the one or more selectable portions selected through the editor interface; wherein segmenting includes segmenting the plurality of received data records by identifying which of the received data records have one or more value of one or more fields that correspond to one or more fields represented in the one or more selectable portions selected and that satisfy the one or more criteria.

In an aspect 15 according to any one of aspects 9 to 14, a data structure includes one or more records, with each record having one or more values for a particular field.

In an aspect 16 according to any one of aspects 9 to 15, at least one of the data sources includes an unselected data structure.

In a general aspect 17, described are one or more machine-readable hardware storage devices for producing a subset of data from a plurality of data sources, modifying one or more attributes of one or more respective fields of the subset and displaying an editor interface that enables segmentation by displaying one or more representations of the one or more modified fields, the one or more machine-readable hardware storage devices storing instructions that are executable by one or more processing devices to perform operations including: selecting a plurality of data sources to be represented in an editor interface; generating a subset of data included in the plurality of data sources, by: for each of the data sources, selecting one or more data structures from that data source, with each data structure including one or more fields; for at least one selected data structure, modifying one or more attributes of one or more respective fields in that data structure; storing in memory selected data structures included in the subset, with at least one of the stored data structures including the one or more modified attributes of the one or more respective fields; displaying, in the editor interface, representations of the stored data structures, with at least one of the representations being of the one or more modified attributes of the one or more respective fields, with each representation including one or more selectable portions, with a selectable portion representing a field of a data structure; receiving, through the editor interface, selection data specifying selection of one or more selectable portions; and segmenting a plurality of received data records by identifying which of the received data records have one or more fields that correspond to one or more fields represented in the one or more selectable portions selected.

In an aspect 18 according to aspect 17, a data structure includes a key field that represents a key for that data structure, a record is associated with a value of the key, the one or more operations further include: selecting a plurality of fields from a plurality of the selected data structures; storing in memory executable instructions that when executed: select, for a specified value of the key, values for the respective selected fields; join the selected values for the specified value of the key; and output the joined values.

In an aspect 19 according to any one of aspects 17 to 18, the representations are first representations, and the one or more operations further include: displaying in the editor interface a second representation of the executable instructions.

In an aspect 20 according to any one of aspects 17 to 19, wherein the one or more operations further include: receiving, through the editor interface, additional selection data specifying selection of the second representation and further specifying that the one or more criteria be applied to those output, joined values of the one or more given fields represented by the one or more selectable portions selected through the editor interface.

In an aspect 21 according to any one of aspects 17 to 20, wherein the one or more operations further include: displaying a user interface with one or more first controls for selecting data structures and with one or more second controls for modifying the one or more fields.

In an aspect 22 according to any one of aspects 17 to 21, wherein the one or more operations further include: receiving, through the editor interface, additional data specifying one or more criteria to be applied to one or more given fields represented by the one or more selectable portions selected through the editor interface; wherein segmenting includes segmenting the plurality of received data records by identifying which of the received data records have one or more value of one or more fields that correspond to one or more fields represented in the one or more selectable portions selected and that satisfy the one or more criteria.

In an aspect 23 according to any one of aspects 17 to 22, a data structure includes one or more records, with each record having one or more values for a particular field.

In an aspect 24 according to any one of aspects 17 to 23, wherein at least one of the data sources includes an unselected data structure.

In a general aspect 25, described is a method performed by a data processing system for generating near real-time aggregates, the method including: intermittently receiving data records from one or more data sources; for a given data record received, identifying at least a first field and a second field in the given data record; detecting a first value in the first field and a second value in the second field; and generating a compound key in accordance with the first value of the first field and the second value of the second field; accessing, from memory, aggregation data related to at least the first field or the second field; generating a compound key value by generating a data record with a field storing the compound key and one or more fields each storing an item of the aggregation data, wherein the compound key value represents a near real-time aggregation of data related to at least the first field or the second field; and recording an occurrence of the given data record by storing in memory the compound key value.

In an aspect 26 according to aspect 25, generating the compound key includes concatenating the first value with the second value.

In an aspect 27 according to any one of aspects 25 to 26, the method further including: hashing the compound key; and storing, in a hash table; the hashed compound key with a compound value.

In an aspect 28 according to any one of aspects 25 to 27, wherein the compound value is the aggregation data.

In an aspect 29 according to any one of aspects 25 to 28, the method further including: for the given record, detecting a value of each field included in that given record; and generating a plurality of unique combinations of at least two detected values, wherein each unique combination is a compound key; for each compound key, identifying one or more fields in the given record for which the compound key includes one or more respective values of those one or more field; accessing, from memory, aggregation data related to at least one of the one or more identified fields; generating a compound key value by generating a data record with a field storing the compound key and a field storing the aggregation data; and storing in memory the compound key value.

In an aspect 30 according to any one of aspects 25 to 29, wherein generating a plurality of unique combinations includes generating a plurality of all unique combinations of detected values of fields in the given record.

In an aspect 31 according to any one of aspects 25 to 30, the method further including: receiving a request for an aggregation of a specified value over a period of time; selecting from memory a compound key value that stores occurrences of the specified value; and extracting from the compound key value the requested aggregation.

In an aspect 32 according to any one of aspects 25 to 31, the method further including: aggregating one or more items of the aggregation data with a value of a field in the given data record; generating, based on the aggregating, a near real-time aggregate value for that field; and storing the near real-time aggregate value in the compound key value.

In an aspect 33 according to any one of aspects 25 to 32, the method further including: receiving a request for an aggregation related to one or more specified values; generating from the one or more specified values a compound key; hashing the compound key; requesting, from the hash table stored in memory, the compound value stored with the hashed compound key; and extracting from the compound value an item of aggregation data requested.

In a general aspect 34, described is a data processing system for generating near real-time aggregates, including: one or more processing devices; and one or more machine-readable hardware storage devices storing instructions that are executable by the one or more processing devices to perform operations including: intermittently receiving data records from one or more data sources; for a given data record received, identifying at least a first field and a second field in the given data record; detecting a first value in the first field and a second value in the second field; and generating a compound key in accordance with the first value of the first field and the second value of the second key; accessing, from memory, aggregation data related to at least the first field or the second field; generating a compound key value by generating a data record with a field storing the compound key and one or more fields each storing an item of the aggregation data, wherein the compound key value represents a near real-time aggregation of data related to at least the first field or the second field; and recording an occurrence of the given data record by storing in memory the compound key value.

In an aspect 35 according to aspect 34, generating the compound key includes concatenating the first value with the second value.

In an aspect 36 according to any one of aspects 34 to 35, wherein the one or more operations further include: hashing the compound key; and storing, in a hash table; the hashed compound key with a compound value.

In an aspect 37 according to any one of aspects 34 to 36, wherein the compound value is the aggregation data.

In an aspect 38 according to any one of aspects 34 to 37, wherein the one or more operations further include: for the given record, detecting a value of each field included in that given record; and generating a plurality of unique combinations of at least two detected values, wherein each unique combination is a compound key; for each compound key, identifying one or more fields in the given record for which the compound key includes one or more respective values of those one or more field; accessing, from memory, aggregation data related to at least one of the one or more identified fields; generating a compound key value by generating a data record with a field storing the compound key and a field storing the aggregation data; and storing in memory the compound key value.

In an aspect 39 according to any one of aspects 34 to 38, wherein generating a plurality of unique combinations includes generating a plurality of all unique combinations of detected values of fields in the given record.

In an aspect 40 according to any one of aspects 34 to 39, wherein the one or more operations further include: receiving a request for an aggregation of a specified value over a period of time; selecting from memory a compound key value that stores occurrences of the specified value; and extracting from the compound key value the requested aggregation.

In an aspect 41 according to any one of aspects 34 to 40, wherein the one or more operations further include: aggregating one or more items of the aggregation data with a value of a field in the given data record; generating, based on the aggregating, a near real-time aggregate value for that field; and storing the near real-time aggregate value in the compound key value.

In an aspect 42 according to any one of aspects 34 to 41, wherein the one or more operations further include: receiving a request for an aggregation related to one or more specified values; generating from the one or more specified values a compound key; hashing the compound key; requesting, from the hash table stored in memory, the compound value stored with the hashed compound key; and extracting from the compound value an item of aggregation data requested.

In a general aspect 43 any one of aspects 1 to 42, described are one or more machine-readable hardware storage devices for generating near real-time aggregates, the one or more machine-readable hardware storage devices storing instructions that are executable by one or more processing devices to perform operations including: intermittently receiving data records from one or more data sources; for a given data record received, identifying at least a first field and a second field in the given data record; detecting a first value in the first field and a second value in the second field; and generating a compound key in accordance with the first value of the first field and the second value of the second key; accessing, from memory, aggregation data related to at least the first field or the second field; generating a compound key value by generating a data record with a field storing the compound key and one or more fields each storing an item of the aggregation data, wherein the compound key value represents a near real-time aggregation of data related to at least the first field or the second field; and recording an occurrence of the given data record by storing in memory the compound key value.

In an aspect 44 according to any one of aspects 1 to 44, generating the compound key includes concatenating the first value with the second value.

In an aspect 45 according to any one of aspects 1 to 44, the one or more operations further include: hashing the compound key; and storing, in a hash table; the hashed compound key with a compound value.

In an aspect 46 according to any one of aspects 1 to 45, wherein the compound value is the aggregation data.

In an aspect 47 according to any one of aspects 1 to 46, wherein the one or more operations further include: for the given record, detecting a value of each field included in that given record; and generating a plurality of unique combinations of at least two detected values, wherein each unique combination is a compound key; for each compound key, identifying one or more fields in the given record for which the compound key includes one or more respective values of those one or more field; accessing, from memory, aggregation data related to at least one of the one or more identified fields; generating a compound key value by generating a data record with a field storing the compound key and a field storing the aggregation data; and storing in memory the compound key value.

In an aspect 48 according to any one of aspects 1 to 47, wherein generating a plurality of unique combinations includes generating a plurality of all unique combinations of detected values of fields in the given record.

In an aspect 49 according to any one of aspects 1 to 48, wherein the one or more operations further include: receiving a request for an aggregation of a specified value over a period of time; selecting from memory a compound key value that stores occurrences of the specified value; and extracting from the compound key value the requested aggregation.

In an aspect 50 according to any one of aspects 1 to 49, wherein the one or more operations further include: aggregating one or more items of the aggregation data with a value of a field in the given data record; generating, based on the aggregating, a near real-time aggregate value for that field; and storing the near real-time aggregate value in the compound key value.

In an aspect 51 according to any one of aspects 1 to 50, wherein the one or more operations further include: receiving a request for an aggregation related to one or more specified values; generating from the one or more specified values a compound key; hashing the compound key; requesting, from the hash table stored in memory, the compound value stored with the hashed compound key; and extracting from the compound value an item of aggregation data requested.

In an aspect 52 according to any one of aspects 1 to 50, including a data processing system for producing a subset of data from a plurality of data sources, modifying one or more attributes of one or more respective fields of the subset and displaying an editor interface that enables segmentation of data records by displaying one or more representations of the one or more modified fields, including: memory storing a plurality of data sources to be represented in an editor interface; a data structure modification module that selects a plurality of data sources to be represented in an editor interface and generates a subset of data included in the plurality of data sources, by: for each of the data sources, selecting one or more data structures from that data source, with each data structure including one or more fields; and for at least one selected data structure, modifying one or more attributes of one or more respective fields in that data structure; memory that stores the selected data structures included in the subset, with at least one of the stored data structures including the one or more modified attributes of the one or more respective fields; a rendering module that displays, in the editor interface, representations of the stored data structures, with at least one of the representations being of the one or more modified attributes of the one or more respective fields, with each representation including one or more selectable portions, with a selectable portion representing a field of a data structure, and that receives, through the editor interface, selection data specifying selection of one or more selectable portions; and a segmentation modules that segments a plurality of received data records by identifying which of the received data records have one or more fields that correspond to one or more fields represented in the one or more selectable portions selected.

Other features and advantages of the invention will become apparent from the following description, and from the claims.

DESCRIPTION OF DRAWINGS

FIG. 5A is a block diagram depicting the execution system configured to generate and use a compound key.

DETAILED DESCRIPTION

Figure 1:
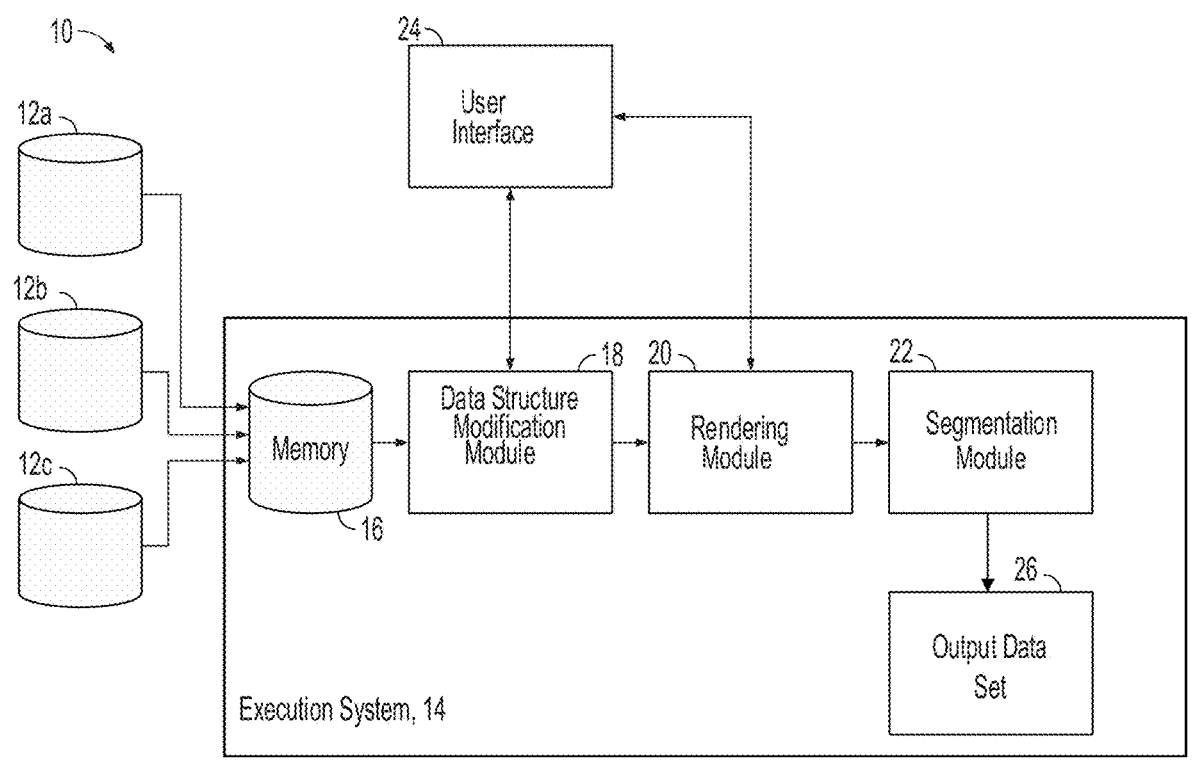
FIG. 1 is a block diagram of a networked system for producing a subset of modified data included in combined data sources.

Referring to FIG. 1, networked system 10 for modifying data structures (e.g., tables) is shown. In particular, networked system 10 enables retrieval of data structures from multiple data sources and modification of one or more fields (or other attributes or attributes of fields) of those data structures from data sources. Generally, a field includes a specified portion of a data record for storage of data and/or a row in a relational database, for example. Generally, an attribute includes a characteristic, e.g., such as a data form. Networked system 10 includes data sources 12a-12c. Networked system 10 includes execution system 14, e.g., for accessing data structures, for specifying which of those data structures are made available to a client device and for modifying those data structures. Execution system 14 includes memory 16 (including, e.g., volatile memory, non-volatile memory and so forth) for receiving and storing data structures from data sources 12a-12c.

In an example, memory 16 stores a reference to each of data sources 12a-12c. Memory 16 receives from, each of data sources 12a-12c, data structures included in those data sources. Memory 16 stores the data structures (and data included in the data structures, such as records in tables) in association with a reference to the data source that transmitted, to execution system 14, the data structure. Execution system 14 also includes data structure selection and data structure modification module 18 (hereinafter "module 18"), e.g., for selecting one or more data sources from which data is made available and one or more data structures in those selected one or more data sources and for modifying one or more data structures (e.g., by modifying field names) in the one or more selected data sources. In an example where a data structure is a table, a column in the table is referred to as a field and a row in the table is referred to as a record. Module 18 also enables enrichment of the data structures and/or fields in the data structures, e.g., by enabling generation of new data structures that include a joining of two or more fields from various data structures. Execution system 14 includes rendering module 20, e.g., for rendering in user interface 24 (displayed on a client device) visual representations of the modified data structures.

Through user interface 24, a user selects one or more fields or portions of the data structures to specify instructions for segmentation. Generally, segmentation includes the process of defining and subdividing a collection of data records into only those data records that satisfy one or more specified criteria. The client device that renders user interface 24 transmits, to rendering module 20, data specifying the selection of the one or more fields or the portions of the data structures. Rendering module 20 transmits this data (specifying the selection) to segmentation module 22, which implements segmentation of various data records stored in memory 16 or other data repositories and produces an output data set 26.

Figure 2:
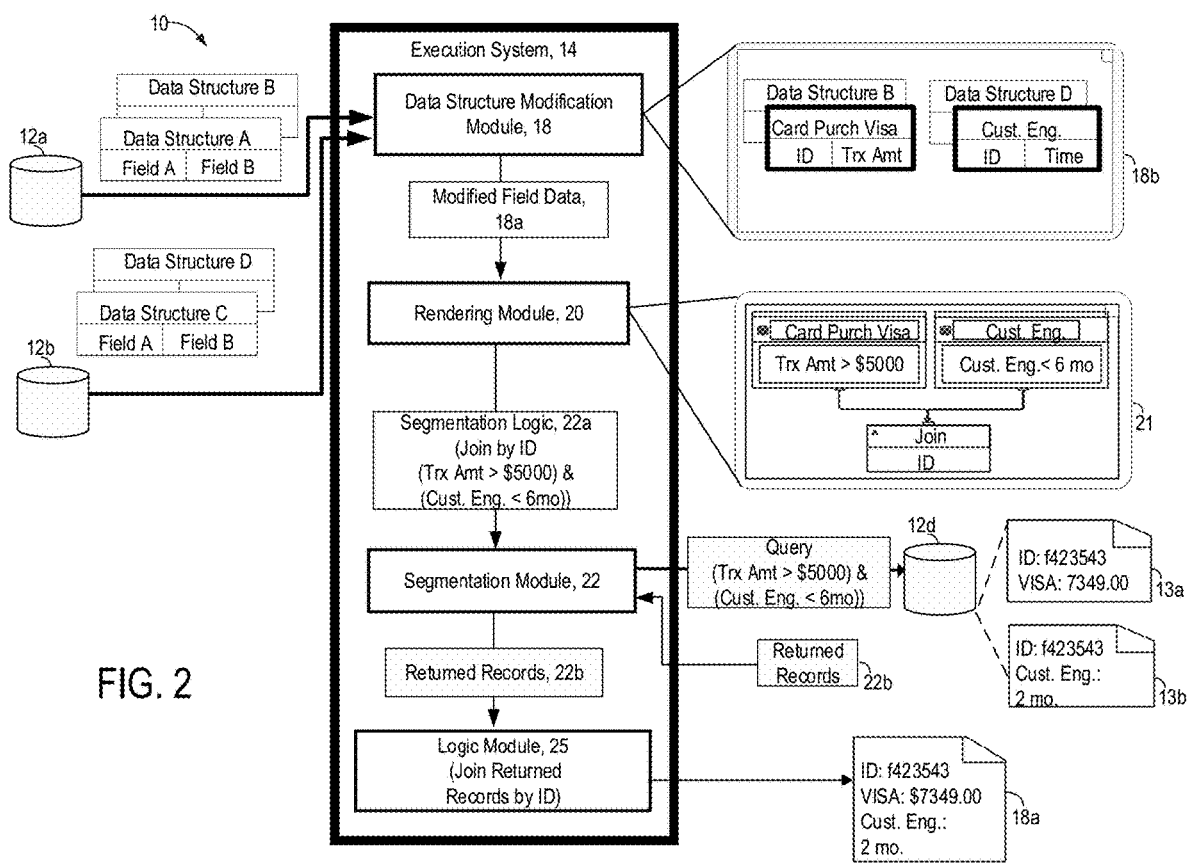
FIG. 2 is a block diagram of an execution system for producing a subset of modified data included in combined data sources.

Referring to FIG. 2, the networked system 10 has the execution system 14 configured to modify data structure A to data structure D (e.g., tables). In this particular example, data structure A and data structure C are modified by data structure modification module 18. From the data structure modification module 18, modified data structures A and B are shown populated with fields entitled with "card purch Visa" and "Cust. Eng.", respectively and containing field names "ID", "Trx Amt"; and "ID" and Time, respectively—as shown in graphical user interface 18b. The data structure modification module 18 also produces modified field data 18a that is sent to the rendering module 20 that renders via the user interface 24 (FIG. 1) a representation 21 of the modified structures A and C with a join ID, e.g., instructions to join together returned data records based on values of a ID field included in those returned data records. Generally, modified field data includes data specifying one or more modifications to field of a data structure, e.g., such as a modification of name of a field or column or row in data structure.

The execution system 14 through segmentation logic 22a sends the modified field data 18a (joined by ID (Trx Amt>$5000) & (Cust. Eng.<6 mo)) to the segmentation module 22 that produces a query (Query (Trx Amt>$5000) & (Cust. Eng.<6 mo) based on the segmentation logic 22a for accessing data source, e.g., 12d that returns two records 13a, 13b, each of which respectively include the following contents "ID: f423543 VISA: 7349.00" and "ID: f423543 Cust. Eng.: 2 mo.", as shown. The returned records 22b are sent back to the segmentation module 22 and feed a logic module 25 for specifying a join return record 18a (by join ID) "ID: f423543 VISA: $7349.00 Cust. Eng.: 2 mo."

Figure 3:
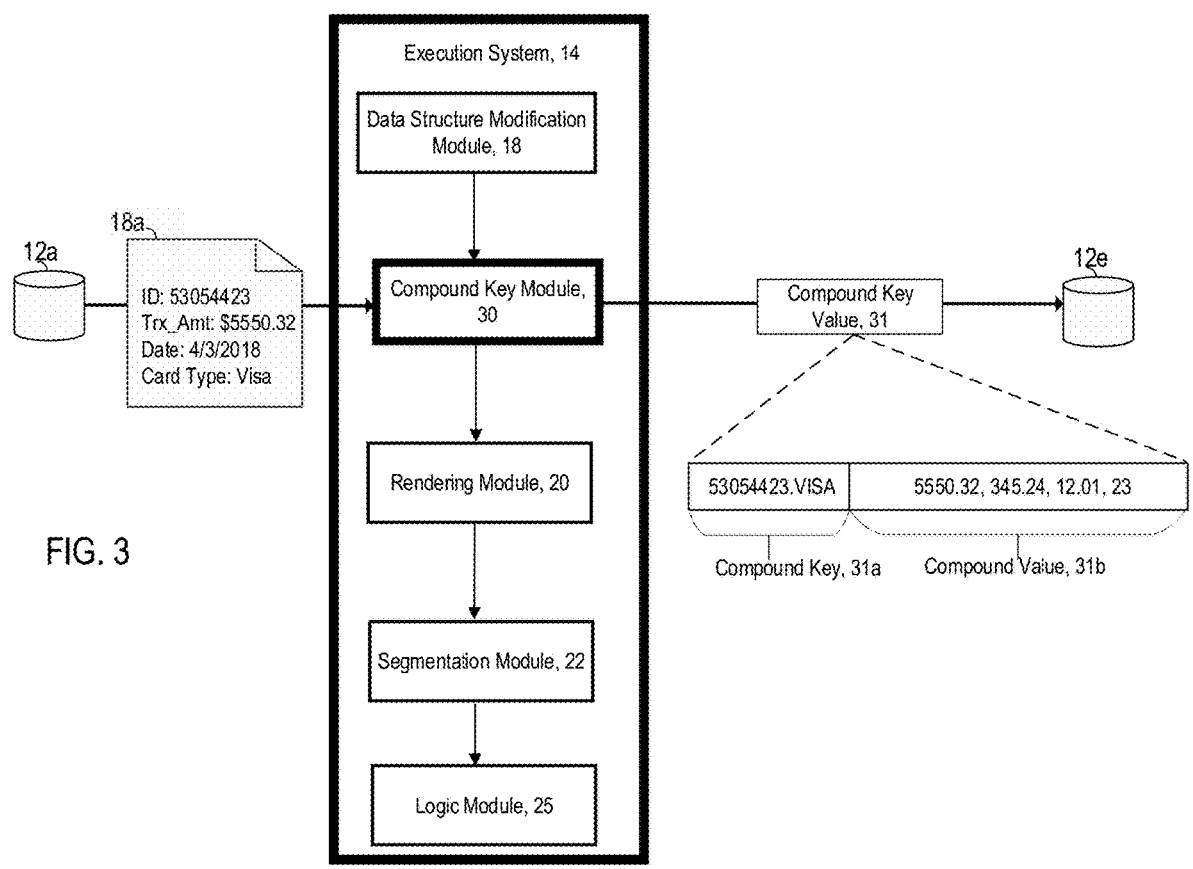
FIG. 3 is a block diagram of an execution system producing a compound key with a compound key module.

Referring now to FIG. 3, the execution system 14 is shown configured to produce a compound key via compound key module 30. The data structure modification module 18 sends the modified field data to the compound key module 30. The compound key module 30 also is sent the join return record 18a "ID: f423543 VISA: $7349.00 Cust. Eng.: 2 mo." and produces a compound key value 31 that is compound key 31a concatenated with a compound value 31b, which is stored in data store 12e. Generally, a compound key includes a key that is generated from one or more values of one more fields in a data record. Generally, a compound value includes a number of aggregations or other data that is related to one or more of the values from which the compound key is generated. In this example, compound value includes the following aggregations: "5550.32, 345.24, 12.01, 23," each of which respectively represent a current amount of the current transaction, an average amount of transactions associated with that particular ID over a specified period of time (e.g., the last 30 days), a minimum transaction amount that has occurred over that period of time and a count of a number of transactions that have occurred over that period of time. Also shown are the rendering module 20, the segmentation module 22 and the logic module 25 that operate respectively on output from the compound key module 30 and from each other, as will be discussed below.

Figure 4:
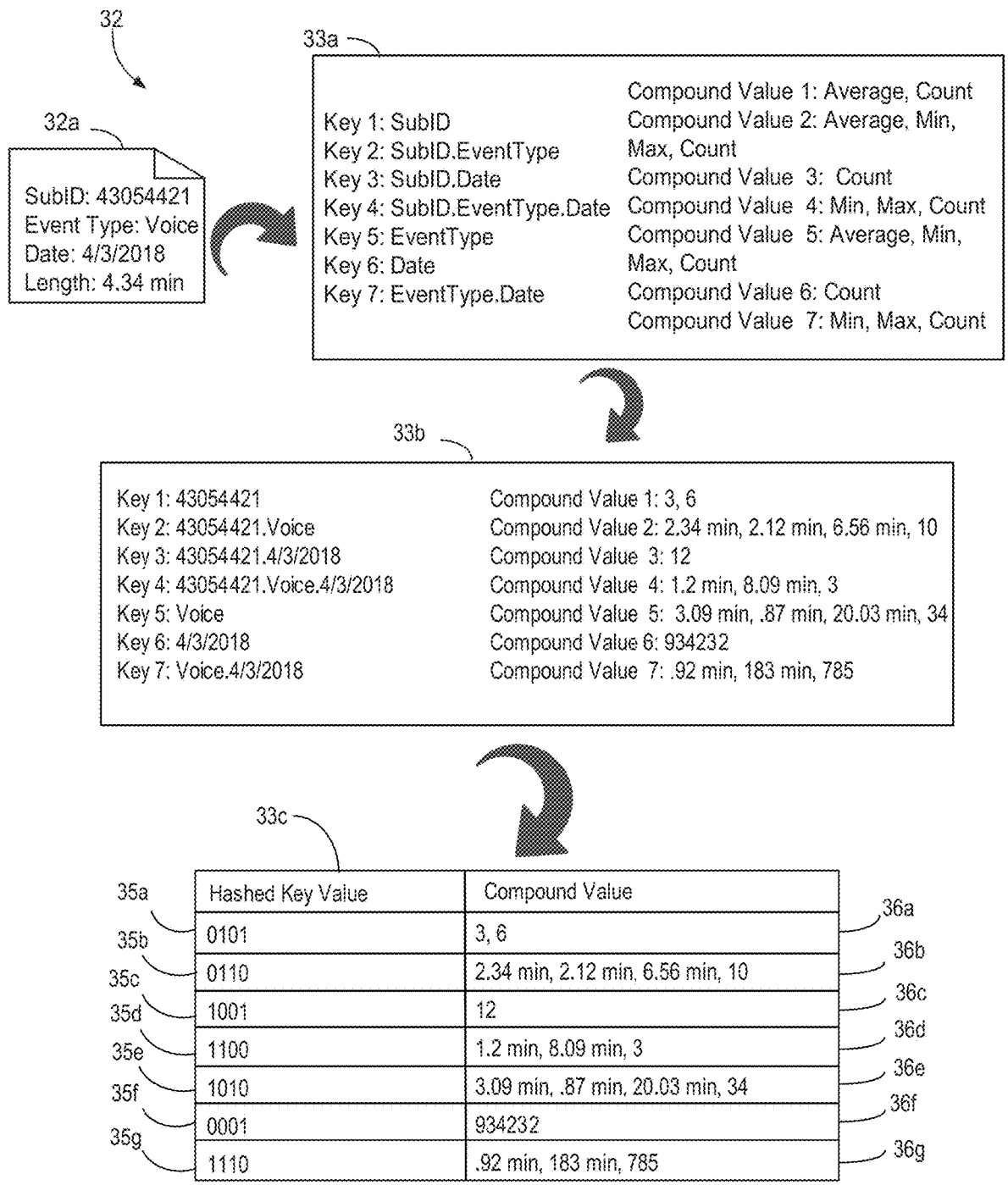
FIG. 4 is a block diagram depicting tables involved in generation of compound keys.

Referring to FIG. 4, structures 32 of compound keys and associated compound values from the values of data record fields is shown. In this example, the system 10 receives data record 32a that includes four fields, a subscriber ID (SubID) field, an event type field, a date field and a length field (specifying a length of time of the voice event). In this example, the value of the SubID field is "43054421." The value of the event type field is "Voice." The value of the date field is "4/3/2018." The value of the length field is "4.34 min." From the values of the first three fields in data record 32a, the system 10 generates several keys, e.g., one key for each potential combination of the fields. In some examples, when a data record has "n" fields, the number of different combination of fields is $2^n$. In this example, from the fields in data records 32, the system 10 generates seven distinct keys, as shown in table 33a. The seven distinct keys are:

Key 1: SubID
Key 2: SubID.EventType
Key 3: SubID.Date
Key 4: SubID.EventType.Date
Key 5: EventType
Key 6: Date
Key 7: EventType.Date For each of the compound keys, the system generates a compound value that includes one or more specified values. For the "SubID" key (i.e., key 1 in table 33a), the compound values (represented in Compound Value 1 in table 33a) are an average number ("Average") of events received over a specified amount of time (e.g., five days) for the subscriber represented by SubID and a count ("Count") of a number of events received over the specified amount of time for that subscriber. That is, for the key of "SubID," the compound values are "Average, Count," as shown in table 33a.

For the "SubID.EventType" key (i.e., key 2 in table 33a), the compound values (represented in Compound Value 2 in table 33a) are an average number ("Average") of events (of the event type specified in the key) received over a specified amount of time (e.g., five days) for the subscriber represented by SubID, a minimum ("Min") amount of time of the events of the specified event type, a maximum ("Max") amount of time of the events of the specified event type, and a count ("Count") of a number of events (of the event type specified in the key) received over the specified amount of time for that subscriber. That is, for the key of "SubID.EventType," the compound values are "Average, Min, Max, Count," as shown in table 33a.

For the "SubID.Date" key (i.e., key 3 in table 33a), the compound value (represented in Compound Value 3 in table 33a) is a count ("Count") of a number of events received on the day specified by the Date field for that subscriber specified by the SubID field. That is, for the key of "SubID.Date," the compound value is "Count," as shown in table 33a.

For the "SubID.EventType.Date" key (i.e., key 4 in table 33a), the compound values (represented in Compound Value 4 in table 33a) are a minimum ("Min") amount of time of the events of the specified event type for the subscriber specified in the SubID field and on the specified date in the Date field, a maximum ("Max") amount of time of the events of the specified event type for the subscriber specified in the SubID field and on the specified date in the Date field, and a count ("Count") of a number of events (of the event type specified in the key) for the subscriber specified in the SubID field and on the specified date in the Date field. That is, for the key of "SubID.EventType.Date," the compound values are "Min, Max, Count," as shown in table 33a.

For the "EventType" key (i.e., key 5 in table 33a), the compound values (represented in Compound Value 5 in table 33a) are an average number ("Average") of events (of the event type specified in the key) received over a specified amount of time (e.g., five days), a minimum ("Min") amount of time of the events of the specified event type for the specified amount of time, a maximum ("Max") amount of time of the events of the specified event type for the specified amount of time, and a count ("Count") of a number of events (of the event type specified in the key) for the specified amount of time. That is, for the key of "EventType," the compound values are "Average, Min, Max, Count," as shown in table 33a.

For the "Date" key (i.e., key 6 in table 33a), the compound value (represented in Compound Value 6 in table 33a) is a count ("Count") of a number of events received on the day specified by the Date field. That is, for the key of "Date," the compound value is "Count," as shown in table 33a.

For the "EventType.Date" key (i.e., key 7 in table 33a), the compound values (represented in Compound Value 7 in table 33a) are a minimum ("Min") amount of time of the events of the specified event type on the specified date in the Date field, a maximum ("Max") amount of time of the events of the specified event type on the specified date in the Date field, and a count ("Count") of a number of events (of the event type specified in the key) on the specified date in the Date field. That is, for the key of "EventType.Date," the compound values are "Min, Max, Count," as shown in table 33a.

Figure 6:
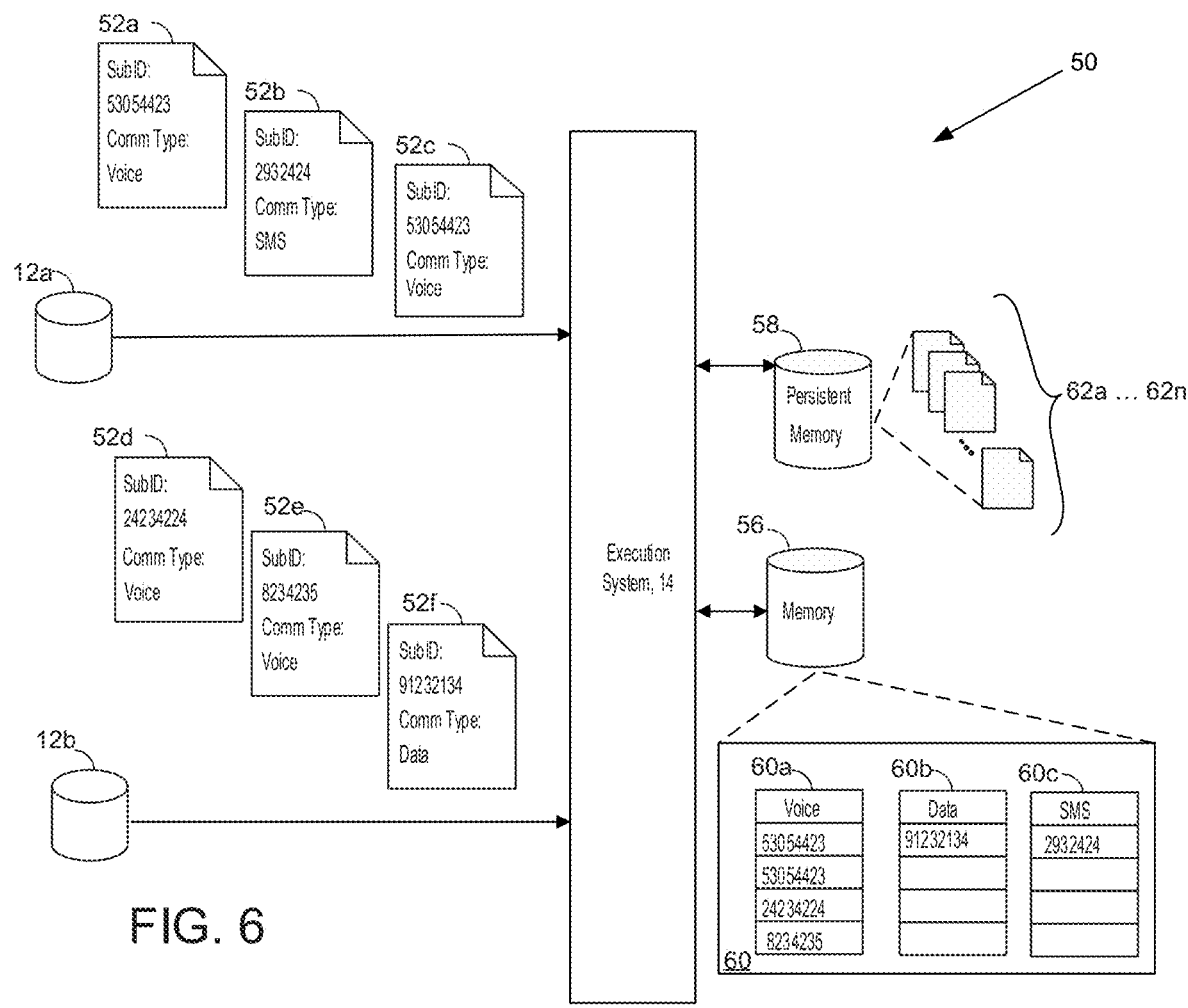
FIG. 6 is a block diagram of the execution system configured to generate near real-time aggregates.

Table 33b illustrates the actual keys of keys 1-7 and the associated compound values, compound values 1-7 respectively. In this example, the values of keys 1-7 are generated from the values of the fields in data record 33a. The system generates the compound values by updating previously computed compound values and/or by accessing the specified data from persistent memory 58 (FIG. 6). For example, for key 4 (i.e., the SubID.EventType.Date key), memory 56 (FIG. 6) may already store an entry for that key. That stored entry may be as follows: Key 4: 43054421.Voice.4/3/2018, Compound Value 4: 0.9 min, 8.09 max, 2. In this example, upon receipt of record 32a, the system 10 identifies that it already stores a compound values for the key of: 43054421.Voice.4/3/2018. As such, the system 10 updates the compound value in accordance with the length of time (i.e., 4.34 minutes) of the voice event specified in data record 268a. Based on this updating, system determines a new compound value of "1.2 min, 8.09 max, 3," as shown in FIG. 4.

In other examples, the system may not have already identified a compound value for key 4. In this example, the system accesses from memory 56 (FIG. 6) and/or persistent memory 58 (FIG. 6) those data records for the subscriber referenced in data record 32a (i.e., SubID: 43054421). From those accessed data records, the system determines which data records reference voice events for the specified date, namely, Apr. 3, 2018. From those data records that reference voice events for the specified date, the system determines the minimum amount of time of the voice events (e.g., from the "length" field of the respective records), the maximum amount of time of the voice events (e.g., from the "length" field of the respective records), and a count of a number of voice events occurring on the specified date for the specified subscriber. From these determined values, the system determines the compound values and stores them (i.e., in hash table 268d) in association with the hashed value of the key "43054421.Voice.4/3/2018," i.e., key 4.

In this example, memory (not shown) stores hash table 33c with hashed key values 35a-35g for keys 1-7, respectively. In this example, the system generates a hashed key value by applying a hashing algorithm to a compound key. Hash table 33c also stores compound values 36a-36g that correspond to compound values 1-7 in table 33c, respectively. Generally, correspond or correspondence refers to matching or having a threshold amount of similarity. In this example, each record is stored independently through storage of the compound key and associated compound value.

In these examples, the system is pre-computing data values for the various combinations of keys. For example, for the key "43054421.Voice.4/3/2018," the system pre-computes a minimum value, a maximum value and a count value for voice events occurring on Apr. 3, 2018 of the specified subscriber. By pre-computing these values, the system reduces (or eliminates) latency at run-time in terms of determining real-time aggregates and other real-time values. For example, at run-time, the system needs to determine a number of voice events that occur on Apr. 3, 2018 for the subscriber represented by SubID 43054421. The system could determine this real-time aggregates by querying various data repositories and warehouses for data records that include a SubID field with a value of 43054421. Then, from all the returned data records, the system could parse the data records to determine a subset of data records with a value of "Voice" for the Event Type field and a value of "4/3/2018" for the date field. The system 10 could then could the number of records returned in the subset to determine the count. However, this querying and processing introduces an associated latency, as the system performs the querying and parsing. To reduce or eliminate this latency, the system pre-compute the aggregates (or other values, such as minimum and maximum values) and stores these aggregates in association with hashed values of the compound key. As such, to look-up a count of a number of voice calls made by particular subscriber on a particular day, the system generates the appropriate key SubID.Voice.Date or 43054421.Voice.4/3/2018. The system the hashes the value of the key and uses the hashed key value to access, in the hashed table 33c, the compound value. By doing so, the system eliminates or reduces the latency associated with having to compute the aggregate in real-time.

Another advantage to storing the compound values in association with the compound key is that if a new field is added to the data records, the occurrence of values in that new field can easily be tracked by generating a new compound key with a value for that new field and then tracking the count (or another aggregate) in the associated compound value. For example, a "new customer" field is added to data record 32a. In this example, if a customer has signed up for telco services in the last six months, then the customer is a new customer. In this case, the new customer field has a value of yes. Otherwise, the new customer field has a value of no. In this example, the system tracks occurrences of new customers who have made voice calls on a specified date of Apr. 3, 2018, the system generates a new key of NewCustomer.EventType.Date with a value of Yes.Voice.4/3/2018. The compound value for this new key is "count." Then, as new records are received, the system generates or updates the compound value in accordance with the number of records, received on Apr. 3, 2018, that reference voice events for new customers. An advantage of generating the compound value and storing it in association is with the compound key is that as new fields are added to data records columns do not need to be added to tables to track values of those new fields. Rather, the new values of the field can be tracked through generation of new keys that simply require adding new rows to the tables and not changing the structure of the table by adding new columns.

Figure 5B:
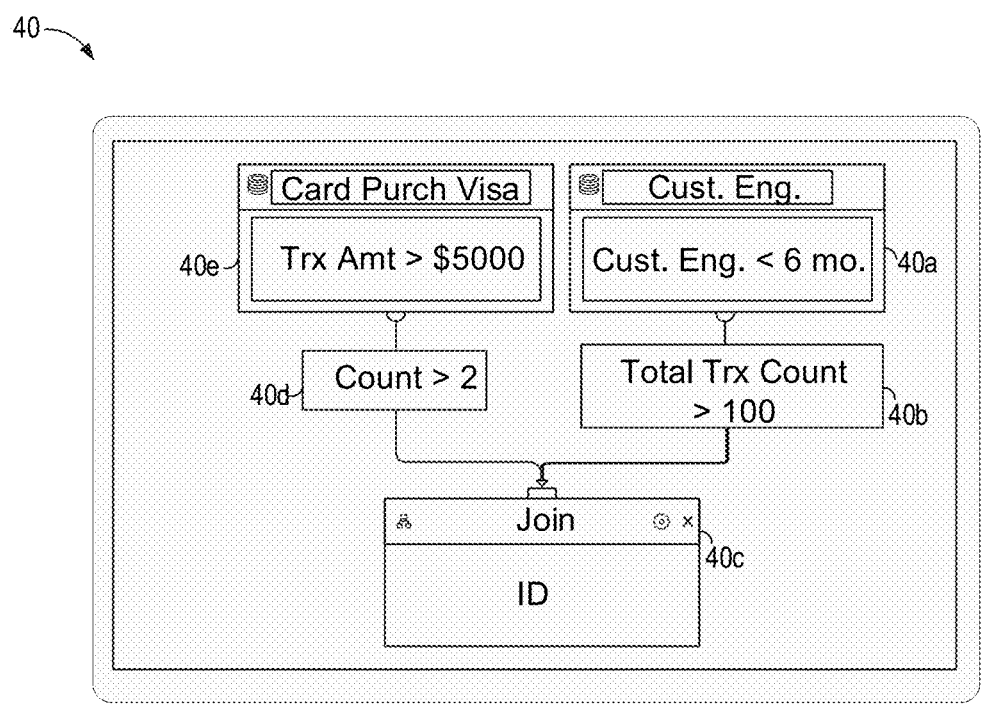
FIGS. 8A-8T and 5B are depictions of graphical user interfaces for producing a subset of modified data included in combined data sources.

Referring now to FIG. 5A, the execution system 14 accesses the data source 12a that returns the two records 18a, 18b, each of which include the respective contents of "ID: 53054423, Trx_Amt: $5550.32, Date: 4/3/2018, Card Type: Visa" and "ID: 53054423, Cust. Eng: 2 mo., Date: 4/3/2018." The returned records 18a, 18b are sent to the compound key module 30 to produce the compound key 25a (for record 18a) and compound key 25b (for record 18b. The compound key values 25a, 25b are stored in data store 12f and the compound key module 30 sends the compound key values 25a, 25b to rendering module 20 that renders the representation shown in FIG. 5B In this example, compound key value 25a includes a compound key of "53054423.VISA" and a compound value of "5550.32, 345.24, 12.01, 23," representing the total purchase amount of the current transaction, an average purchase amount over a specified number of days (e.g., the last 30 days), a minimum purchase amount over a specified number of days and a count of a number of purchases that have been made over the specified number of days. Compound key value 25b includes a compound key of "53054423.Cust_Eng" and a compound value of "2, 1/1/2018, 9.00, 1045, 104," representing—respectively—a length of time a particular user resented by the ID field has been a customer, a date the user became a customer, a minimum purchase amount of the customer, a maximum purchase amount of the customer and an average purchase amount of the customer. The compound key values 25a, 25b are sent to rendering module 20 to enable rendering module to determine which aggregates can be displayed as part of the segmentation template, as will be described in further detail below with reference to FIG. 5B. In this example, the aggregations (e.g., minimum, count, etc.) included in compound key values 25a, 25b, will be available for definition in the segmentation, depending on which tables are selects and which compound key values are associated with or otherwise available for those tables—as described in further detail below.

The rendering module 20 receives the segmentation logic 23c (that is specified in the graphical user interface shown in FIG. 5B) and sends the segmentation logic 23c to the segmentation module 22. In this example, the segmentation logic is as follows: "(Join by ID (Count (Visa Trx Amt>$5000)>2) and (Cust Eng.<6 mo. and Total Trx Count>100))." In response, the segmentation module 22 produces the Compound Key Query 23a (53054423.VISA) and Compound Key Query 23b (53054423.Cust_Eng) and transmits compound key queries 23a, 23b to data repository 12f. In response, data repository 12f looks-up (e.g., in a table) a compound key value with a compound key matching the compound key specified in the queries 23a, 23b. In this example, compound key query 23a includes a compound key of "53054423.VISA." Based on this compound key, data repository 12f retrieves compound key value 25a, which has a compound key of "53054423.VISA" and thus matches the compound key specified in compound key query 23a. In this example, compound key query 23b includes a compound key of "53054423.Cust Eng." Based on this compound key, data repository 12f retrieves compound key value 25b, which has a compound key of "53054423.Cust_Eng" and thus matches the compound key specified in compound key query 23b. Data repository 12f returns compound key values 25a, 25b to segmentation module 22 as returned records 22c. In response, segmentation module 22 transmits returned records 22c to logic module 25 for further processing. In this example, logic module 25 has also received segmentation logic 23c (e.g., from segmentation module 22) and implements the join logic to join together returned records 22c to produce aggregated or joined record 27.

Referring to FIG. 5B, graphical user interface 40 is a variation of graphical user interface 21 (FIG. 2). In this example, graphical user interface 40 includes components 40a-40e. In this example, component 40a specifies that the "Customer Engagement" table is used to segment customers by only including those customers who have been customers for more than six months. In this example, certain aggregations (e.g., count) are associated with the customer engagement table. In some example, each compound value will include the same types of aggregations. As such, each table can be associated with the same types of aggregations. In other examples, a table may only be associated with certain types of aggregations. In this example, if a compound key query is sent to a data repository and a compound key value is returned that does not include the aggregation required for the segmentation, the execution system will simply discard the retained compound key value). In this example, component 40e specifies that the Visa Card Purchase table is used for segmentation and further that only those customer with more than two card purchases are included in the segment, as specified by component 40d. Component 40c specifies that the records returned from execution of logic specified in components 40a-40b, 40d and 40e are joined together.

Generating Real-Time (or Near Real-Time) Aggregates at Scale

In some examples, the system 10 aggregates data in fields, in real-time (or near real-time) as the data is being received, and also aggregates the data at scale—such that as large volumes of data are received by the system 10, the system 10 performs the aggregation without significant latency. In some examples, these aggregations are used in generation of data that are accessed or retrieved when the system performs segmentations.

Referring now to FIG. 6, the networked system 10 (FIG. 1) also includes system 50 that generates real-time aggregates. In some examples, system 50 is execution system 14 in FIG. 1. In this example, system 50 receives from data source 12a, data records 52a-52c and records 52d-52f from data source 12b. Each of data records 52a-52f includes one or more fields, such as a key field (i.e., a subscriber identifier (SubID) field) with a value that uniquely identifies a user. Each of data records 52a-52f may also include a communication type ("Comm Type") field for storing a value (i.e., Voice, SMS or Data) that identifies a communication type.

Networked system 10 also the execution system 14 (FIG. 1) and includes storage including memory 56 (e.g., shared memory, semiconductor memory, less persistent memory, etc.) and persistent memory 58. Memories 56 and 58 may form the memory 16 of FIG. 1. Generally, memory 56 includes memory that is accessible by system 50 with reduced latency, e.g., relative to a latency in retrieving data or data records from persistent memory 58. Memory 56 has reduced latency because memory 56 is not disk memory (e.g., data records are not being stored to disk when storing in memory 56). In some examples, memory 56 includes memory cache, sometimes called a cache store or RAM cache, which is a portion of memory made of high-speed static RAM (SRAM), instead of the slower and dynamic RAM (DRAM) used for main memory, e.g., persistent memory 58. In this example, memory 56 only stores recent data (or a record of an occurrence of recent data), where data is "recent" if it has been received in less than a threshold amount of time (e.g., less than fourteen days). After the data is older than the threshold amount of time, system 50 or memory 56 transmits the data to persistent memory 58 for more permanent storage. Memory caching on memory 56 is effective because system 50 accesses the more recent data the most frequently. That is, the data stored in memory 56 is data that is actively used by system 50. By keeping as much of this information as possible in SRAM or memory 56, system 50 avoids accessing the slower DRAM or persistent memory 58.

In this example, system 50 stores a record of events, not the received data or data records themselves. Generally, an event includes an occurrence of a particular value for a particular field. In this example, system 50 specifies that each possible value (i.e., voice, SMS or data) for the "Comm Type" field is an event. Memory 56 stores data record 60 that saves a record of the individual detected events (and a subscriber ID for that event). In particular, data record 60 includes columns 60a-60c. Column 60a stores data indicating occurrences of a "voice event"—a detection of a "voice" value for the "Comm Type" field. Column 60b stores data indicating occurrences of a "data event"—a detection of a "data" value for the "Comm Type" field. Column 60c stores data indicating occurrences of a "SMS event"—a detection of a "SMS" value for the "Comm Type" field.

In particular, system 50 receives data record 52a and detects in data record 52a an occurrence of a voice event. As such, system 50 inserts into column 60a of data record 60 a value of the subscriber ID. System 50 receives data record 52b and detects in data record 52b an occurrence of a SMS event. As such, system 50 inserts into column 60c the subscriber ID specified in the SubID field in data record 52b.

System 50 receives data record 52c and detects in data record 52c an occurrence of a voice event. As such, system 50 inserts into column 60a the subscriber ID specified in the SubID field in data record 52c. System 50 receives data record 52d and detects in data record 52d an occurrence of a voice event. As such, system 50 inserts into column 60a a value the subscriber ID specified in the SubID field in data record 52d. System 50 receives data record 52e and detects in data record 52e an occurrence of a voice event. As such, system 50 inserts into column 60a a value of "the subscriber ID specified in the SubID field in data record 52e. System 50 receives data record 52f and detects in data record 52f an occurrence of a data event. As such, system 50 inserts into column 60b a value of the subscriber ID specified in the SubID field in data record 52f.

In this example, data record 60 is a data record with an increased amount of flexibility, because data record 60 can be modified to also track occurrences of other types of events (e.g., a video conference event) by adding another column to data record 60. As such, data record 60 can be modified—on the fly—to track aggregates of new events. This provides for improved flexibility over saving the received data records themselves, because a new event can be tracked through generation of a new compound key for that event, as described in further detail below. Additionally, searching of data record 60 provides for decreased latency in executing queries, relative to an amount of latency in executing queries on individual data records. For example, system 50 may query data record 60 for those subscribers engaging in voice communications. In this example, system 50 generates queries for "comm type=voice." Based on this query, memory 56 return the values in column 60a simply looking up values of subscriber IDs included in column 60a. System 50 returns results of this query with increased speed (relative to a speed required to search individual data records 52a-f to identify data records satisfying the query), because system 50 (or memory 56) only has to identify columns matching or satisfying the query, rather than searching through data records to identify those records storing values that satisfy the query. In some examples, after the threshold amount of time, the data in data record 60 is transferred to persistent memory 58 and stored in one of data records 62a . . . 62n.

In some examples, the data included in columns 60a-60c is each referred to as in-memory aggregates, as each of these columns represents an aggregation of a particular type of event. Generally, an in-memory aggregate (e.g., a count, average, etc.) includes an aggregation of data stored in memory 56. In other example, system 50 may perform an operation on data included in record 60 to generate the in-memory aggregate. For example, system 50 may query memory 56 for a count of records in which "comm type=voice" and "SubID=53054423." In this example, memory 56 would return a value of "2," as column 60a indicates that a subscriber with "SubID=53054423" has had two voice communications. In this example, memory 56 generates an in-memory aggregation for the query and the in-memory aggregation has a value of two. Memory 56 (or system 50) stores the value of the in-memory aggregation in a shared variable. In this example, upon receipt of the query "count of comm type=voice and SubID=53054423," memory 56 generates a shared variable with a name of "count of comm type=voice and SubID=53054423" and sets the value of the shared variable to be "2." In this example, the shared variable stores the value of the in-memory aggregate. As previously described, these in-memory aggregates are retrieved from memory 56 with increased speed (relative to a speed of retrieving these in-memory aggregates from persistent memory 58 or by building these in-memory aggregates by searching through individual data records 52a-f).

Once the data in data record 60 is moved to disk (i.e., is moved to persistent memory 58), the values in columns 60a-60c are on-disk aggregates, including, e.g., records of occurrences that are stored on disk, rather than being stored on memory. In some examples, the values of the shared variables are also moved to persistent memory 58 after the threshold amount of time.

By recording occurrences of events—rather than storing the data records themselves—system 50 determines aggregates at scale, e.g., as the number of records represented in data record 60 increases, there is no increased latency (or there is only minimal increased latency) in determining an aggregate—because system 50 only has to identify relevant fields in data record 60 (or relevant cells in columns), rather than parsing through and identifying contents of the individual records 52a-f. The identification of relevant fields in data records is a scalable process, as the number of fields does not grow as the number of occurrences in records grows. As such, the identification of these real-time aggregates is scalable and does not introduce latency, even as the number of processed data records grows.

In a variation, memory 56 stores a hash table in which hashed values of compound keys are stored in association with compound values, as described in further detail below. Generally, a compound key includes a key that is assembled from (or includes) multiple distinct values. Generally, a compound value includes a concatenation or assembly of multiple, distinct values.

Figure 7:
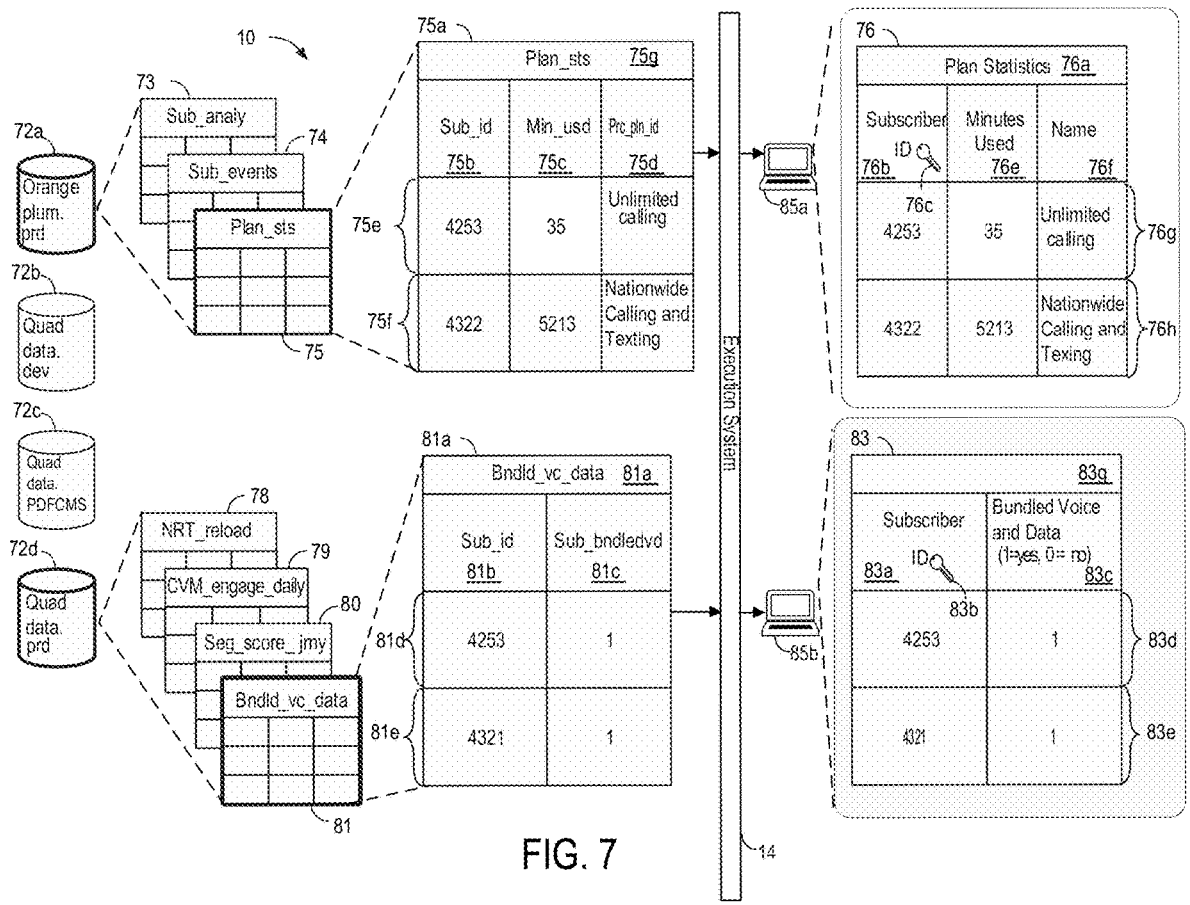
FIG. 7 is a block diagram showing use of the execution system to cause rendering of user interfaces through which data sources and fields of data structures are modified.

Referring to FIG. 7, selection and modification functions performed by the system 10 (e.g., by module 18 in FIG. 1) is shown. In this example, the system causes rendering of various user interfaces through which one or more data sources are selected, one of more data structures are selected and one or more fields of those data structures are modified. In this example, data sources 72a-72d (of which data sources 72a-72c correspond to data sources 12a-12c, respectively) are candidate data sources from which data is made available through a rendering module (e.g., rendering module 20 in FIG. 1). The rendering module 20 (FIG. 1) provides various graphical user interfaces through which end users (e.g., business users) view and access a curated subset of data. From the curated subset, the system generates instructions to perform various operations and action, e.g., based on data received through the graphical user interfaces. The subset of data is curated from a superset of data across data sources (e.g., data sources 72a-72d) into a subset for specified operations—such as segmentation operations. The rendering module also provides graphical user interfaces to receive instructions on how the data is curated. In this example, data sources 72a-72d are the superset of data from which the subset is generated, e.g., curated. The system selects data sources 72b, 72d as the data sources from which various data structures (e.g., tables) are modified. In some examples, based on the selection of data sources 14, 18, the system identifies references for data sources 72a, 72d and looks-up in memory 16 (FIG. 1) which tables are associated with those identified references. The system then retrieves those tables from data sources 72b, 72d or from memory 16, when memory 16 stores the tables themselves.

In this example, data source 72a includes tables 73, 74, 75. Data source 72d includes tables 78, 79, 80, 81. From tables 73, 74, 75, the system selects table 75 as a data structure to be modified (e.g., curated) by rendering a visual representation of table 75 through rendering module 20 (FIG. 1). From tables 78, 79, 80, 81, the system selects table 81 as a data structure to be modified (e.g., curated) by rendering a visual representation of table 81 through rendering module 20 (FIG. 1). These selections are made in accordance with user instructions, e.g., received through a user interface, to select tables 75, 81. That is, not all of tables 73, 74, 75, 78, 79, 80, and 81 are modified and curated. Only those selected tables from those selected data sources are modified and made available in user interface 24 (FIG. 1) through rendering module 20.

View 75a of table 75 illustrates contents of table 75. View 75a and table 75 may collectively be referred to herein as "table 75," without limitation and for purposes of convenience. Table 75 includes title portion 75g, which specifies a title of "plan sts." In this example, table 75 includes columns 75b, 75c, 75d (also referred to herein as "fields 75b, 75c, 75d," respectively). The names of fields 75b, 75c, 75d are "sub_id," "min_usd," prc_pln_id," respectively. Table 75 also includes rows 75e, 75f. In an example, table 75 (or a visual representation of table 75) is rendered in a user interface to enable modification and/or renaming of the title and/or fields and to also enable specification of one of the fields to be a key, e.g., to be used when joining fields of various tables. Table 76 is a modified version of table 75. Table 76 is rendered on client device 85a based on receipt of graphical user interface data from execution system 14, with the graphical user interface data specifying the contents of table 75. In this modified version of table 75, the original title specified in portion 75g has been modified to a title of "plan statistics," as specified in portion 76a. Additionally, each of fields 75b, 75c, 75d has been renamed to more descriptive names (e.g., names that are more meaningful to a business user). In this example, the name of field 75b is renamed to "subscriber ID," as shown in field 76b. Generally, a subscriber includes a user of the system and is identified by a key, also referred to as the subscriber ID. In this example, field 76b is selected as a key, as indicated by icon 76c. The name of field 75c is renamed to "minutes used," as specified by field 76e. The name of field 75d is renamed to "price plan name," as specified in field 76f. Table 76 also includes rows 76g, 76h, the contents of each of which correspond to rows 75e, 75f, respectively. In this example, table 76 is presented to an end user through the system. In this example, only table 76 (and none of tables 73, 74, 75) is presented to the end user to enable viewing and/or selection of data available from data source 14. Table 76 (or a visual representation (not shown) of table 76) represents a curated version or arrangement of data from data source 14. In some examples, the curated version (e.g., table 76) of table 75 may only include a subset of the fields in table 75. For example, field 75c or 75d may be removed and not included in table 76. In another example, a user may select a row in table 75 (or table 76) to be a pivot row, e.g., when they are multiple rows for a particular subscriber ID.

View 83 of table 81 illustrates contents of table 81. View 83 and table 81 may collectively be referred to herein as "table 81," without limitation and for purposes of convenience. Table 81 includes title portion 81a, which specifies a title of "Bndld_vc_data." In this example, table 81 includes columns 81b, 81c (also referred to herein as "fields 81b, 81c," respectively). The names of fields 81b, 81c are "sub_id" and "sub_bndledvd," respectively. Table 81 also includes rows 81d, 81e. In an example, table 81 is rendered in a user interface to enable modification and/or renaming of the title and/or fields and to also enable specification of one of the fields to be a key, e.g., to be used when joining fields of various tables. Table 83 is a modified version of table 81. Table 83 is rendered on client device 85*b* based on receipt of graphical user interface data from execution system 14, with the graphical user interface data specifying the contents of table 81. In this modified version, the original title specified in portion 81*a* has been modified to a title of "Bundled Voice & Data," as specified in portion 83*g*. Additionally, each of fields 81*b*, 81*c* have been renamed to more descriptive names (e.g., names that are more meaningful to a business user). In this example, the name of field 81*b* is renamed to "subscriber ID," as shown in field 83*a*. In this example, field 83*a* is selected as a key, as indicated by icon 83*b*.

The name of field 81*c* is renamed to "bundled voice and data," as specified by field 83*c*. Table 83 also includes rows 83*d*, 83*e*, the contents of each of which correspond to rows 81*d*, 81*e*, respectively. In this example, table 83 is presented to an end user through the system. In this example, only table 83 (and none of tables 78, 79, 80, 81) is presented to the end user to enable viewing and/or selection of data available from data source 72*d*. Table 83 represents a curated version or arrangement of data from data source 72*d*.

Figure 8A:

Referring to FIG. 8A, graphical user interface 90 is rendered by the system to enable selection of one or more data sources, e.g., from which data is modified. In this example, graphical user interface 90 is one of the graphical user interfaces rendered by rendering module 20 (FIG. 1). Graphical user interface 90 includes menu portion 92, with control 92*a*—selection of which causes graphical user interface 90 to display visual representations 93*a*-93*d* of available data sources in portion 94 of graphical user interface 90. In this example, visual representations 93*a*-93*d* represent data sources 72*a*-72*d* (FIG. 7), respectively. Through graphical user interface 90, a user selects data sources 72*a*, 72*d* (FIG. 7) or 12, 14 (FIG. 2) as the data sources from which to select data structures for modification, as indicated by visual representations 95*a*, 95*d* in juxtaposition to visual representations 93*a* and 93*d*, respectively. In this example, column 96 includes selectable controls (not shown), selection of which causes display of a visual representation, such as one of visual representations 93*a* and 93*d*.

Figure 8B:
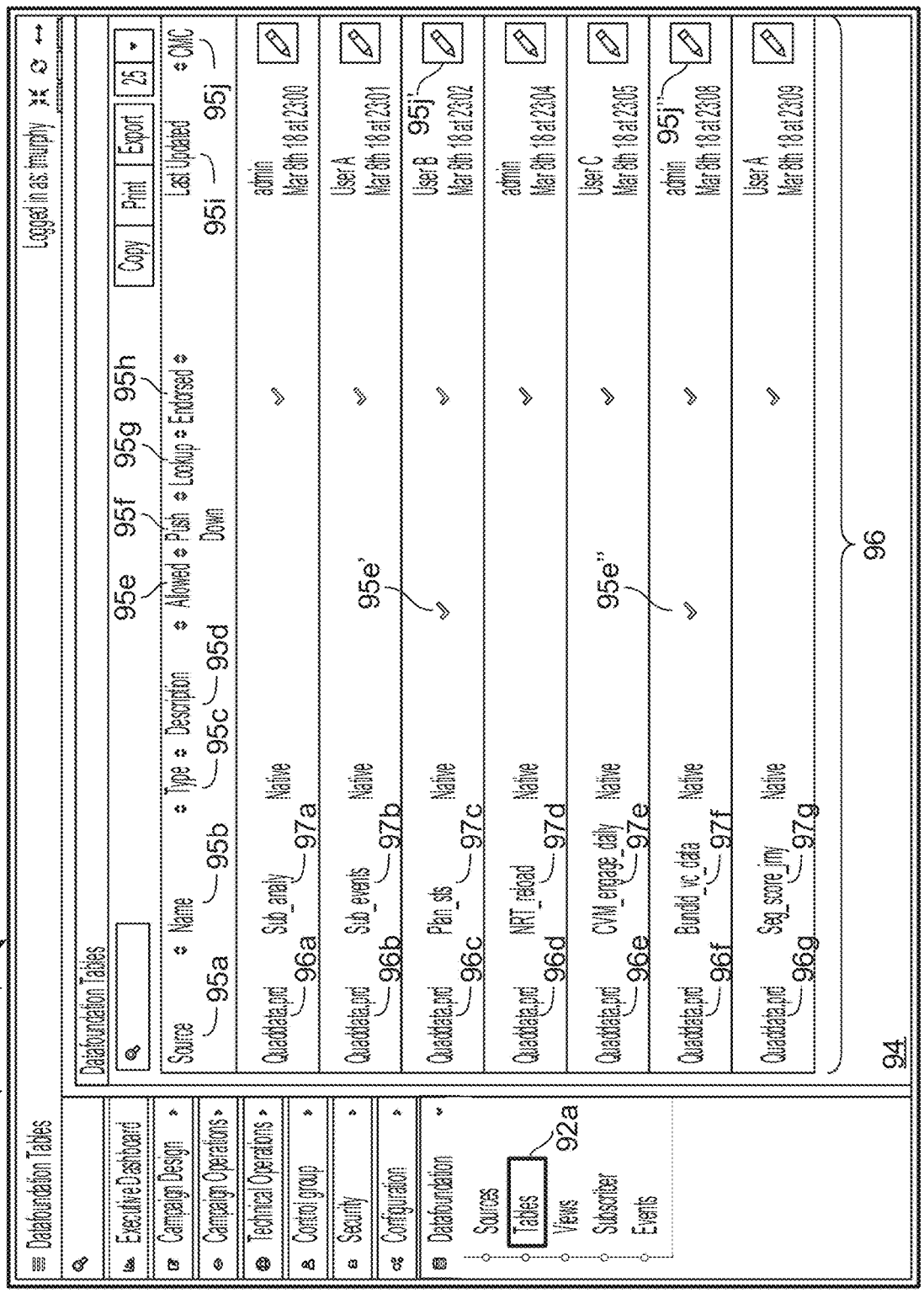

Referring to FIG. 8B, an advanced state of the graphical user interface 90 is displayed to enable selection of one or more data structures (e.g., tables)—from the selected data sources—to be modified. In this example, graphical user interface 90 displays the menu portion 92 (e.g., which may correspond to menu portion 92 in FIG. 8A), with control 92*a*—selection of which causes graphical user interface 90 to display in portion 94, for each selected data source 72*a*, 72*d* (FIG. 7) data structures included in that data source. For example, portion 94 displays table 96, which includes columns 95*a*-95*j*. Column 95*a* displays visual representations 96*a*-96*g* with names of selected data sources, e.g., as selected in FIG. 3 or 7. Visual representations 96*a*-96*g* represent selected data source 72*d*, e.g., in accordance with visual representation 95*d* (FIG. 8A) specifying data source 72*d* as a data source from which tables are selected for curation. Visual representations 96*a*-96*g* represent data source 72*d*, e.g., in accordance with visual representation 58 (FIG. 8A) specifying data source 72*d* as a data source from which tables are selected for curation. Column 95*b* displays visual representations 97*a*-97*g*, each of which represents a name of a table in a data source represented in a corresponding one of visual representations 96*a*-96*g*, respectively. Column 95*c* displays a data type for each of the tables represented in column 95*b*. Column 95*d* provides controls for entry of a description of each of the tables represented in column 95*a*. Column 95*e* displays selectable controls, selection of which specifies (e.g., through display of a visual representation, such as visual representations 95*e*', 95*e*") a table from which data and/or data structures are selected for modification. In this example, visual representations 95*e*', 95*e*" displayed in column 95*e* to specify that tables represented by visual representations 97*c*, 97*f*, respectively, are tables selected for modification.

Table 96 also includes the columns 95*f*-95*h* that each specify particular functionality that may be selected and applied. Table 96 includes "last updated" column 95*i* that displays—for each row in table 96—data specifying a user who last updated the table represented by that row and when the update was performed. Table 96 also includes edit column 95*j* that displays controls (e.g., controls 95*j*', 95*j*") for each row in table 96. For a particular row for which column 95*e* specifies that a table represented by that row is editable, selection of a control displayed in edit column 95*j* for that row enables editing and modification of that table. For example, selection of control 95*j*' enables modification of the table represented by visual representation 97*c*. In this example, visual representation 97*c* represents table 75 (FIG. 7) and table 75 is modified as previously described. Selection of control 95*j*" enables modification of the table represented by visual representation 97*f*. In this example, visual representation 97*f* represents table 81 (FIG. 7) and table 81 is modified as previously described.

Figure 8C:
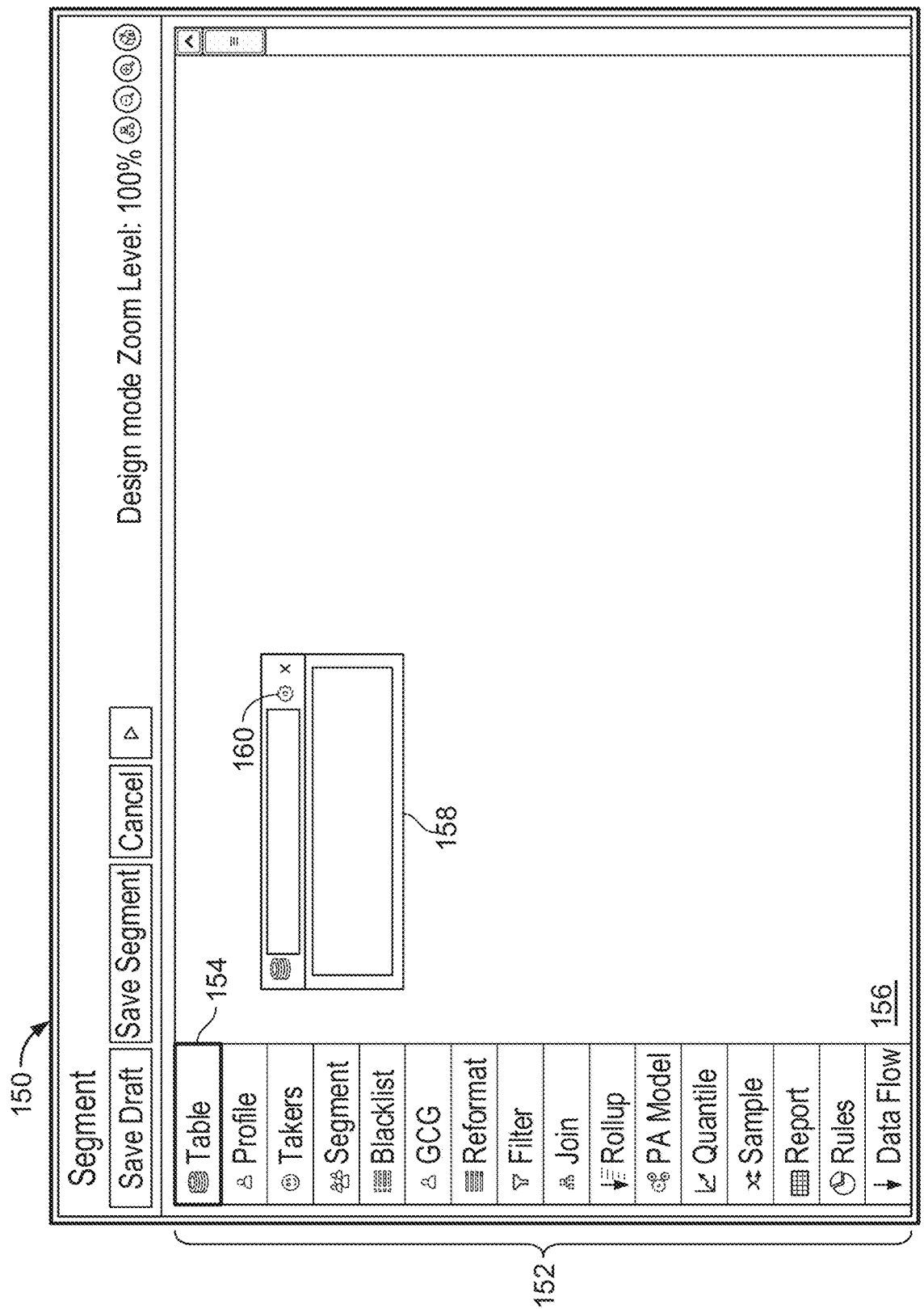

Referring to FIG. 8C, graphical user interface 150 is displayed (e.g., by rendering module 20 in FIG. 1) to enable a user to access, view and generate instructions from the modified data structures, e.g., by enabling the user to generate instructions to perform segmentation. Graphical user interface 150 includes menu portion 152 that includes controls, selection of which enable generation of various types of instructions. In this example, menu portion 152 includes control 154, selection of which enables specification of one or more fields in one or more of the selected data structures, e.g. 72*a*, 72*d*, from which to select data records (and/or perform operations on those data records).

Graphical user interface 150 includes editor interface 156 for specification of data segmentation and various other operations, e.g., such as filtering, joining, and so forth. Upon selection of control 154, component 158 is displayed in editor interface 156. Generally, a component represents executable logic (or instructions), such as segmentation logic, to perform various operations. The component receives input (via editor interface 156), such as selection data or other input data, and the system uses the received input in generating the executable logic. In an example, the system stores a preconfigured mapping among executable logic and components. Then, based on the input or otherwise specified by a component, the executable logic (for that component) is updated or modified to include the input. Component 158 enables specification of instructions to select a particular table (e.g., a curated table), such as 97*a*-97*g*. Component 158 includes icon 160, selection of which enables selection of a particular curated table.

Figure 8D:
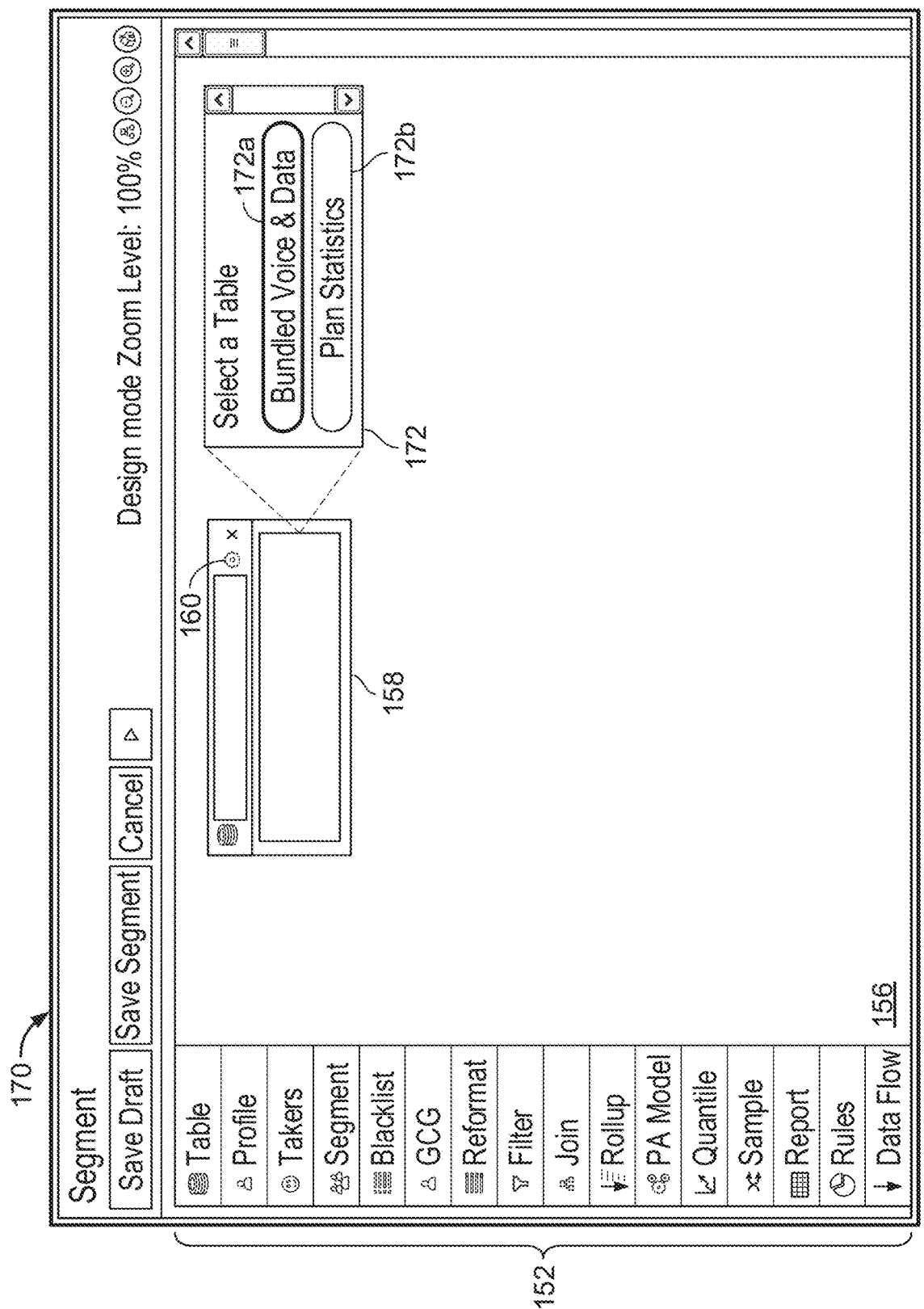

Referring to FIG. 8D, graphical user interface 170 is shown. Graphical user interface 170 is an updated version of graphical user interface 150 (FIG. 8C), e.g., that is updated following selection of icon 160. Upon selection of icon 160, overlay portion 172 is rendered in graphical user interface 170. Overlay portion 172 includes visual representation 172*a* (of table 83 (FIG. 2), 97*f* (FIG. 8B) which has been modified and curated) and visual representation 172*b* (of table 76 (FIG. 7), which has been modified and curated). In this example, visual representation 172*a* is selected.

Figure 8E:
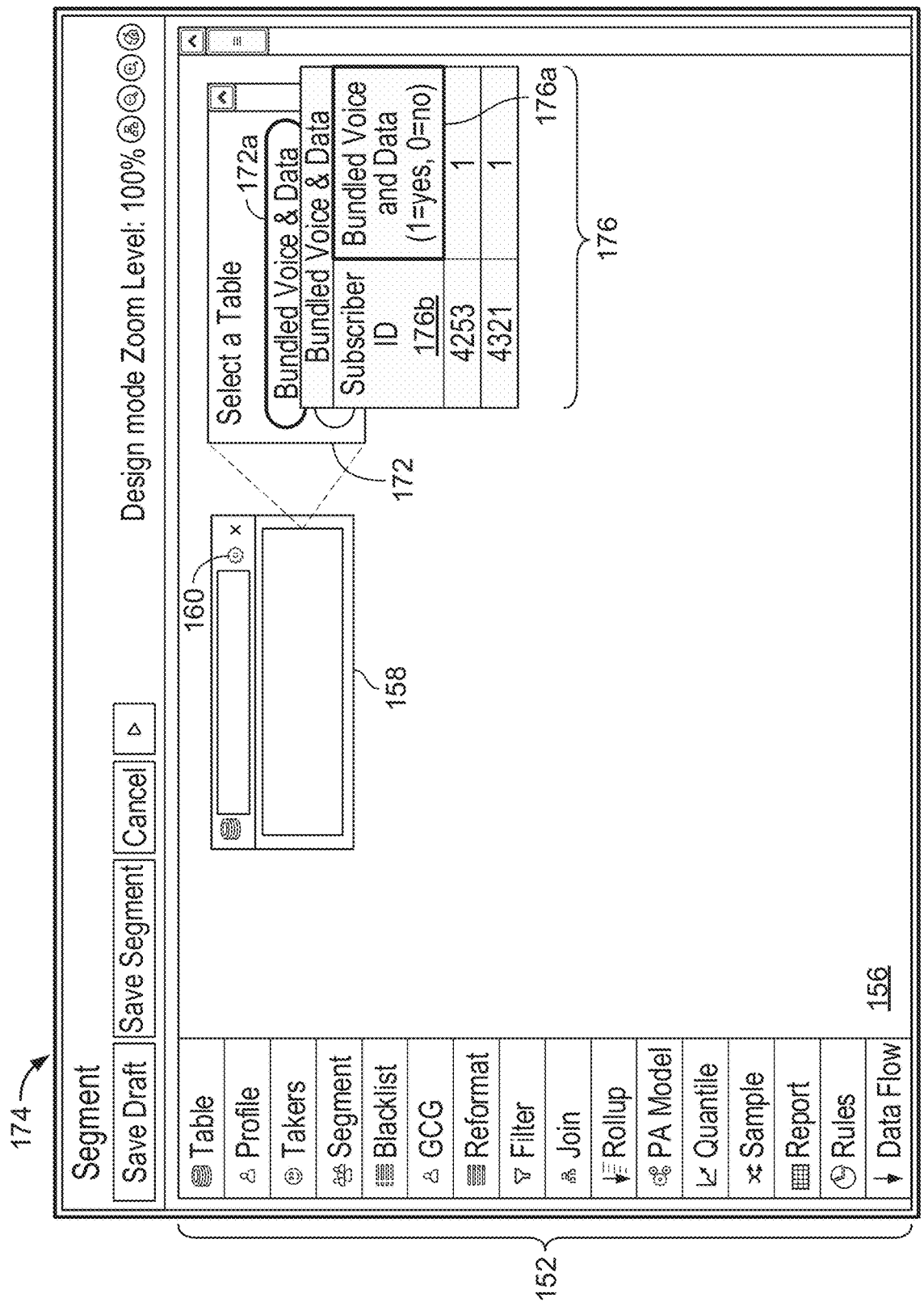

Referring to FIG. 8E, graphical user interface 174 is shown. Graphical user interface 174 is an updated version of graphical user interface 170 (FIG. 8D). Upon selection of visual representation 172a, overlay 176 is shown. Overlay 176 shows the contents of the table 38 (FIG. 7) and includes selectable portion 176a, selection of which enables a user to select the field (i.e., the "bundled voice and data field") represented in selectable portion 176a for inclusion in the executable logic represented by component 158. Overlay 176 also includes portion 176b, which represents the subscriber ID field. In this example, selection of selectable portion 176a automatically causes selection of portion 176b, as the values in the field represented in selectable portion 176a need to be associated with a subscriber ID in order to attribute the values to appropriate subscribers. In some examples, the executable logic represented by component 158 is modified or updated in accordance with the field selected through selection of selectable portion 176a.

Figure 8F:
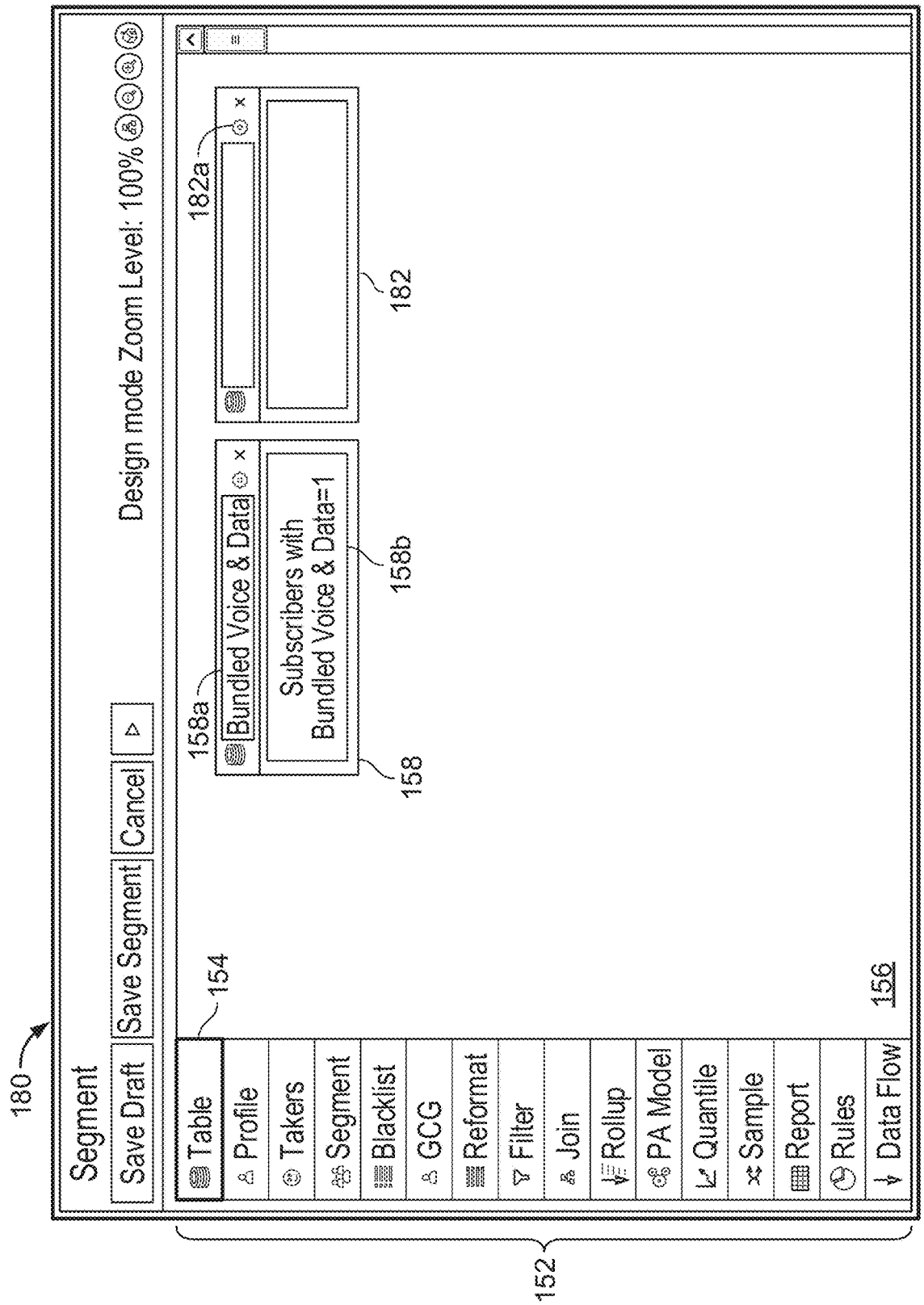

Referring to FIG. 8F, graphical user interface 180 is shown. Graphical user interface 180 is an updated version of graphical user interface 174 (FIG. 8E). In this example, component 158 is updated with portions 158a, 158b. Portion 158a specifies a title for component 158, with the title being based on selection of the field represented in selectable portion 176a in FIG. 8E. Portion 158b specifies that the executable logic (represented by component 158) is configured to select, e.g., from data records received or stored by the system, those data records for which a value of the "bundled voice and data" field is equal to "1". In more general words, portion 158b specifies segmenting of the received or stored data records by identifying which of the received data records have one or more fields that correspond to one or more fields represented in the one or more selectable portions selected. Generally, segmenting includes assignment of data records to specified groups, division of data records and/or exclusion of data records from specified collections and inclusion of data records in other collections. This allows the user to initiate segmentation of the data records "on the fly" through the editor interface. The representations displayed via the editor interface hence provide a graphical shortcut for setting the conditions for the segmenting process, which leads to more efficient (time and resources) segmenting of the incoming data records, e.g., compared to defining these conditions step-by-step such as through typing of the conditions. Overall, a more direct, less error-prone and quicker control of the segmenting of incoming data records is provided to the user. In the example of FIG. 8F, upon selection of selectable portion 176a (FIG. 8E), portion 158b is automatically populated with the following string: "Subscribers with Bundled Voice & Data=_____". In this example, graphical user interface 180 displays a prompt (not shown) that prompts a user to fill in a value of either "1" or "0" for the empty field "_____" in the foregoing string. In this example, the user selects a value of "1." In this example, the subscribers referenced in the foregoing string are represented by the subscriber ID field represented in portion 176b (FIG. 7).

In this example, a user also selects control 154 to cause component 182 to be added to editor interface 156. Component 182 enables specification of instructions to select one or more fields from another particular table (e.g., a curated table). Component 182 includes icon 182a, selection of which enables selection of a particular curated table and/or of fields from the particular curated table.

Figure 8G:
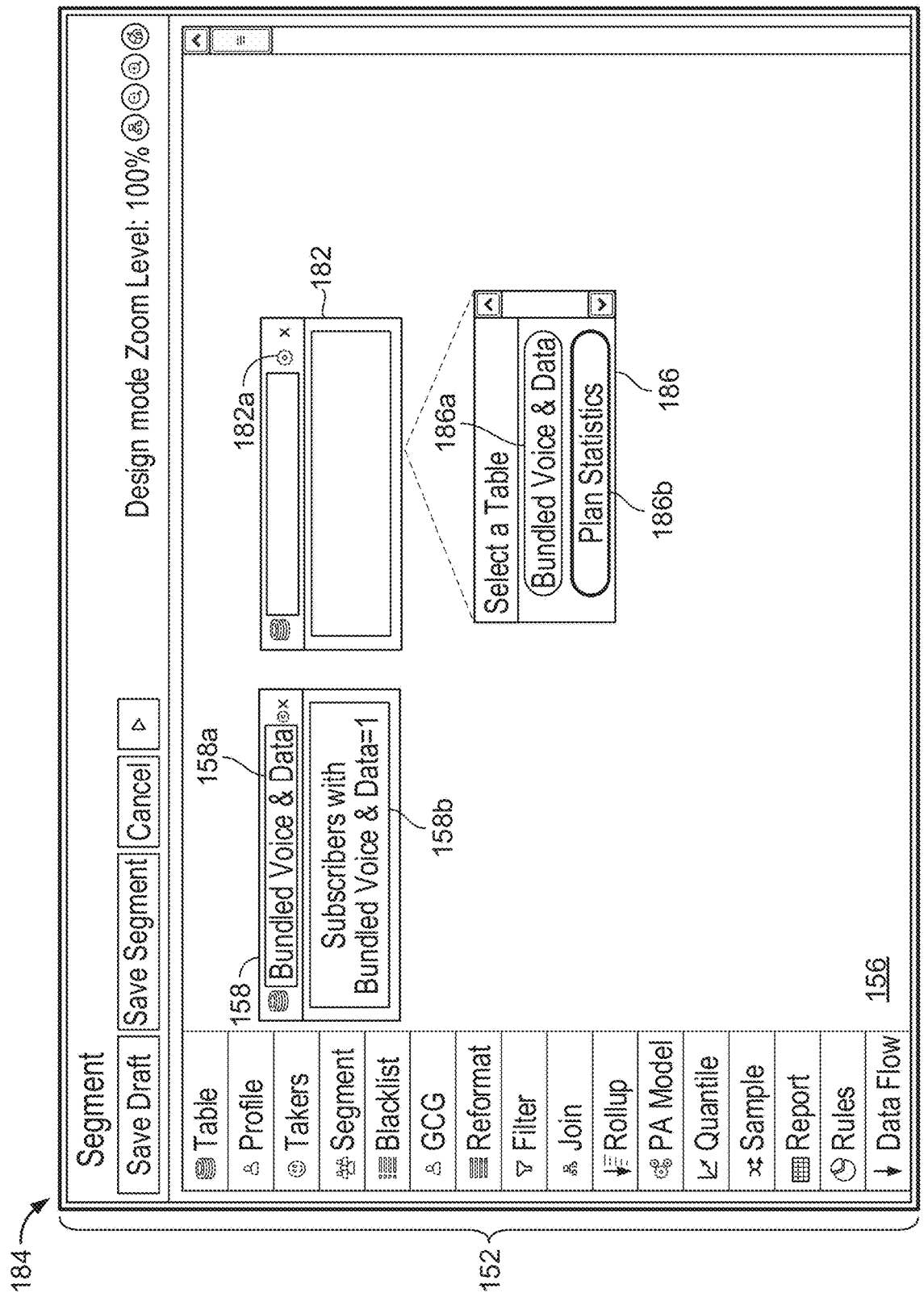

Referring to FIG. 8G, graphical user interface 184 is shown. Graphical user interface 184 is an updated version of graphical user interface 180 (FIG. 8F), e.g., that is updated following selection of icon 182a. Upon selection of icon 182a, overlay portion 186 is rendered in graphical user interface 184. Overlay portion 186 includes visual representation 186a (of table 83 (FIG. 7), which has been modified and curated) and visual representation 186b (of table 76 (FIG. 7), which has been modified and curated). In this example, visual representation 186b is selected.

Figure 8H:
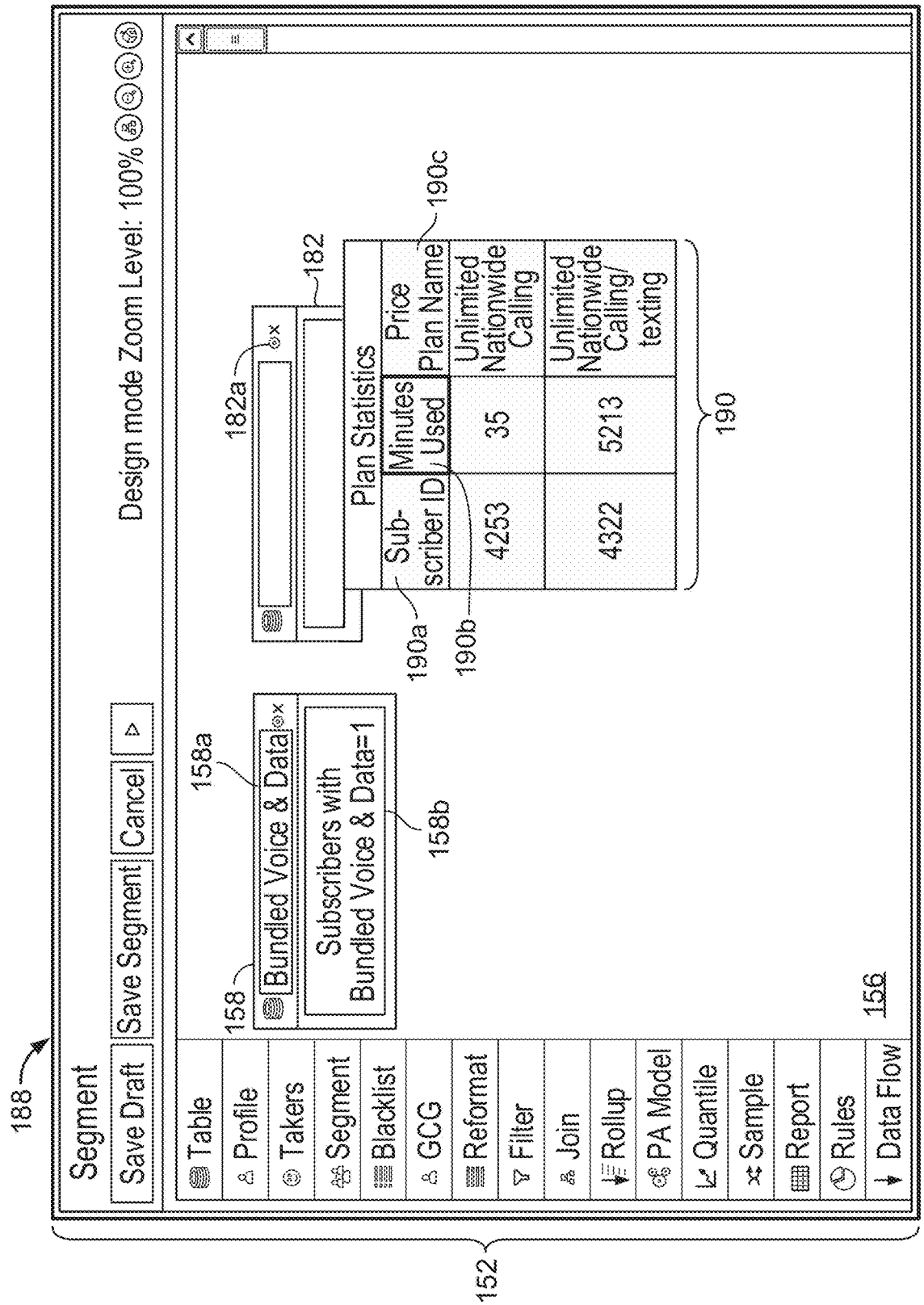

Referring to FIG. 8H, graphical user interface 188 is shown. Graphical user interface 188 is an updated version of graphical user interface 184 (FIG. 8G). Upon selection of visual representation 186b (FIG. 8G), overlay 190 is shown. Overlay 190 shows the contents of table 76 (FIG. 7) and includes selectable portions 190a, 190b, 190c, selection of which enables a user to select the subscriber ID field, the minutes used field and the price plan name field, respectively—for inclusion in the executable logic represented by component 182. In this example, selection of one or more of selectable portions 190b, 190c automatically causes selection of selectable portion 190a, as the values in the fields represented in selectable portions 190a, 190b need to be associated with a subscriber ID in order to attribute the values to appropriate subscribers (e.g., users). In some examples, the executable logic represented by component 182 is modified or updated in accordance with the field selected through selection of selectable portion 190b, which is selected in this example.

Figure 8I:
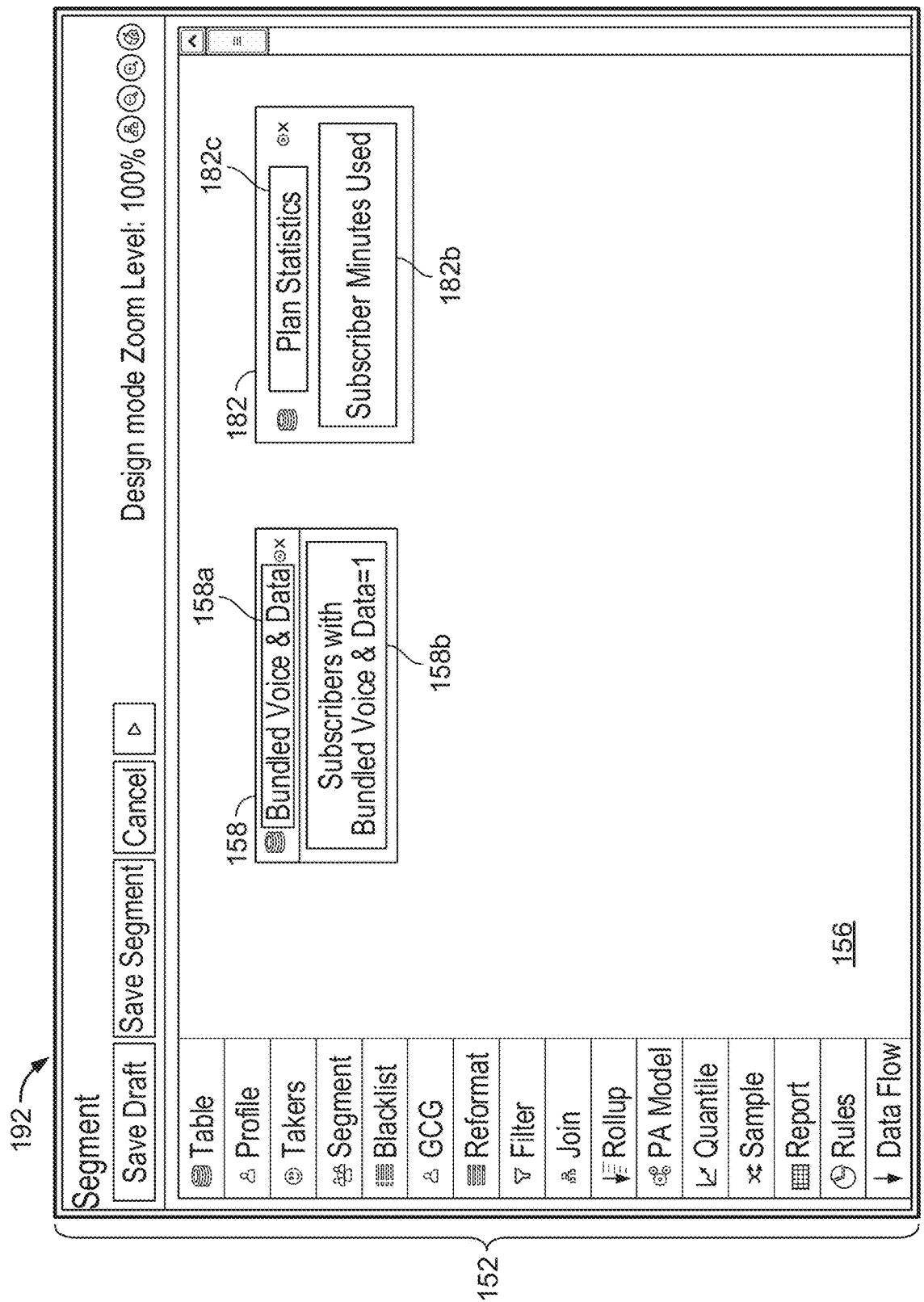

Referring to FIG. 8I, graphical user interface 192 is shown. Graphical user interface 192 is an updated version of graphical user interface 188 (FIG. 8H). In this example, component 182 is updated with portions 182b, 182c. Portion 182c specifies a title for component 182, with the title being based on selection of the field represented in selectable portion 190b in FIG. 8H. Portion 182b specifies that the executable logic (represented by component 182) is configured to select, e.g., from data records received or stored by the system, those data records that include a "minutes used" field, as specified in selectable portion 190b (FIG. 8H). In this example, the "minutes used" field is a curated field and does not actually match the name of the field in actual data records. As such, the system stores a copy of table 75 in FIG. 7 (which includes the actual names of fields in the data records themselves) and table 76 in FIG. 7 (which includes the curated names of fields) and a mapping between each of the field names in table 75 to the field names in table 76. Based on the mapping, the system looks up the actual field name for a curated field name. For example, the system uses this mapping to identify that the "minutes used" field referenced in portion 182b is actually the "min_used" field in data records.

Figure 8J:
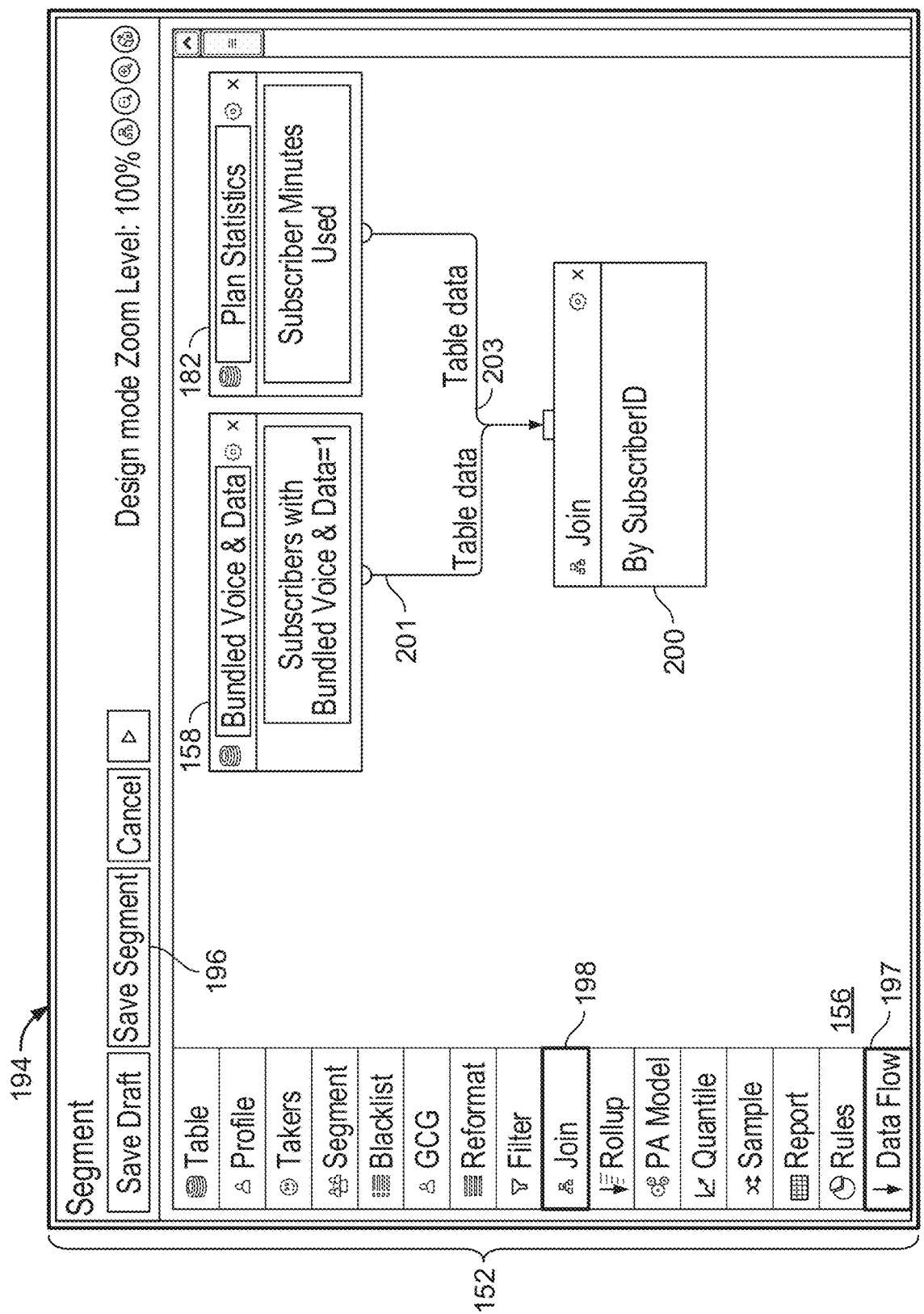

Referring to FIG. 8J, graphical user interface 194 illustrates that editor interface is updated with join component 200, following selection of control 198. In this example, join component 200 represents executable logic to join together two distinct data streams or collection of data records. In this example, join component 200 represents the joining together of the output of component 158 (which is those data records for which the value of the "bundled voice and data" field equals "1") and the output of component 182 (which is those data records with a value in the "subscriber minutes used" field). In a variation, the output of component 158 is values of the "bundled voice and data" field (i.e., field 81c or field 82c in FIG. 7), when the value equals "1," and associated values of the "subscriber ID" field (i.e., field 83a or field 81b in FIG. 7). In this variation, the output of component 182 is values of the "minutes used" field (field 76c or field 75c in FIG. 7) and associated values of the "subscriber ID" field (field 76b or field 75b in FIG. 7). The executable logic represented by join component 200 joins together the output of components 158, 182 by subscriber ID. In this example, connectors 201, 203 may be selected from menu portion 152, e.g., via selection of control 197, to specify that the output of components 158, 182 are input into join component 200 to join together the output of components 158, 182.

In this example, editor interface 156 displays a definition of a particular segment that may be saved (e.g., for future use) through selection of save control 196, selection of which prompts a user to enter a name of the segment to enable subsequent retrieval of the segment by that name.

Figure 8K:
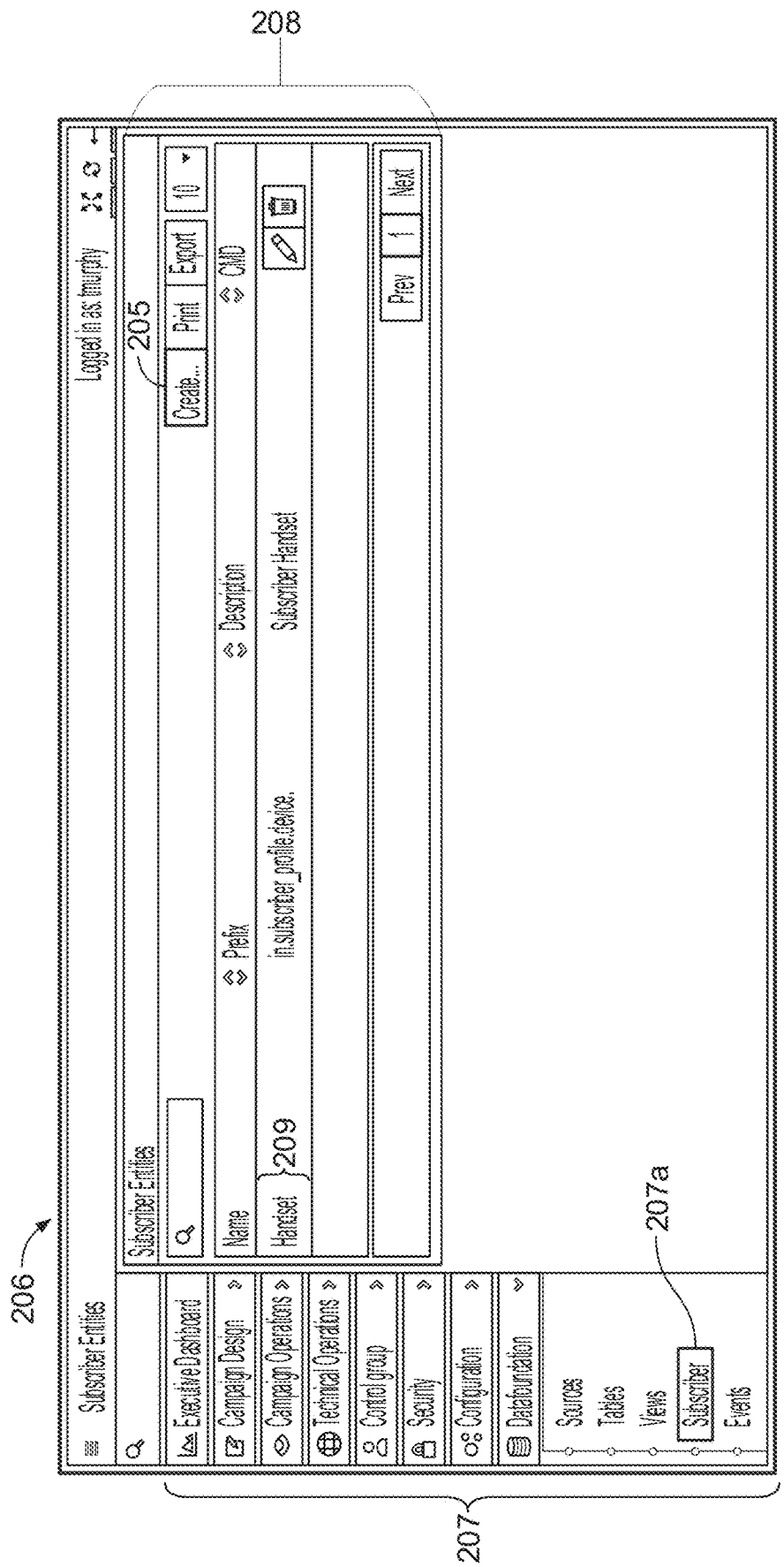

Referring to FIG. 8K, graphical user interface 206 is displayed to enable creation of pre-defined data aggregations (also referred to as "entities"). In particular, based on instructions received through user interface 206—for example—the system joins data from different tables to generate these entities, which are then available (e.g., through the system) when generating segmentations. These entities organize the various data into specified categories.

Graphical user interface 206 includes menu portion 207, with subscriber control 207a—selection of which causes display of entity portion 208. Entity portion 208 displays the defined entities and includes generation control 205, selection of which displays a series of prompts and controls for a user to define a new entity. In this example, entity portion displays visual representation 209 of a previously defined entity that specifies an aggregation of data related to handsets or devices associated with particular keys (e.g., that represent subscribers).

Referring to FIG. 8L, graphical user interface 210 is displayed as an overlay to graphical user interface 206 (FIG. 8K), e.g., upon selection of generation control 205 (FIG. 8K). Graphical user interface 210 enables generation of a new entity and includes name portion 210a for input of information specifying a name of the entity being created, prefix portion 210b for entry of a prefix that specifies the technical or database field name of the generated entity and description portion 210c for entry of information specifying a description of the entity being created.

Graphical user interface 210 also includes field portion 212 that specifies fields 212a-212j that are included in the entity being defined in graphical user interface 210. In this example, fields 212a-212j are fields that are selected from tables included in various data sources, e.g., data sources 12a-12c in FIG. 1. In this example, field portion 212 displays both the original field name (e.g., from an uncurated table) in column 212k and a modified or curated field name in column 212l. In this example, field 212h corresponds to field 75d in FIG. 2 and field 212m is the modified or curated version of field 212h. Field 212m corresponds to field 76f in FIG. 7, e.g., to illustrate how field portion 212 enables selection of fields by both their original field name and their modified field name. Field portion 212 also includes search control 212n for input of a search query or one or more search terms. The system uses the input of search control 212n to search for field names (from tables in data sources) that match or correspond to the search criteria. Upon selection of appropriate fields, those fields are displayed in field portion 212.

Figure 8N:
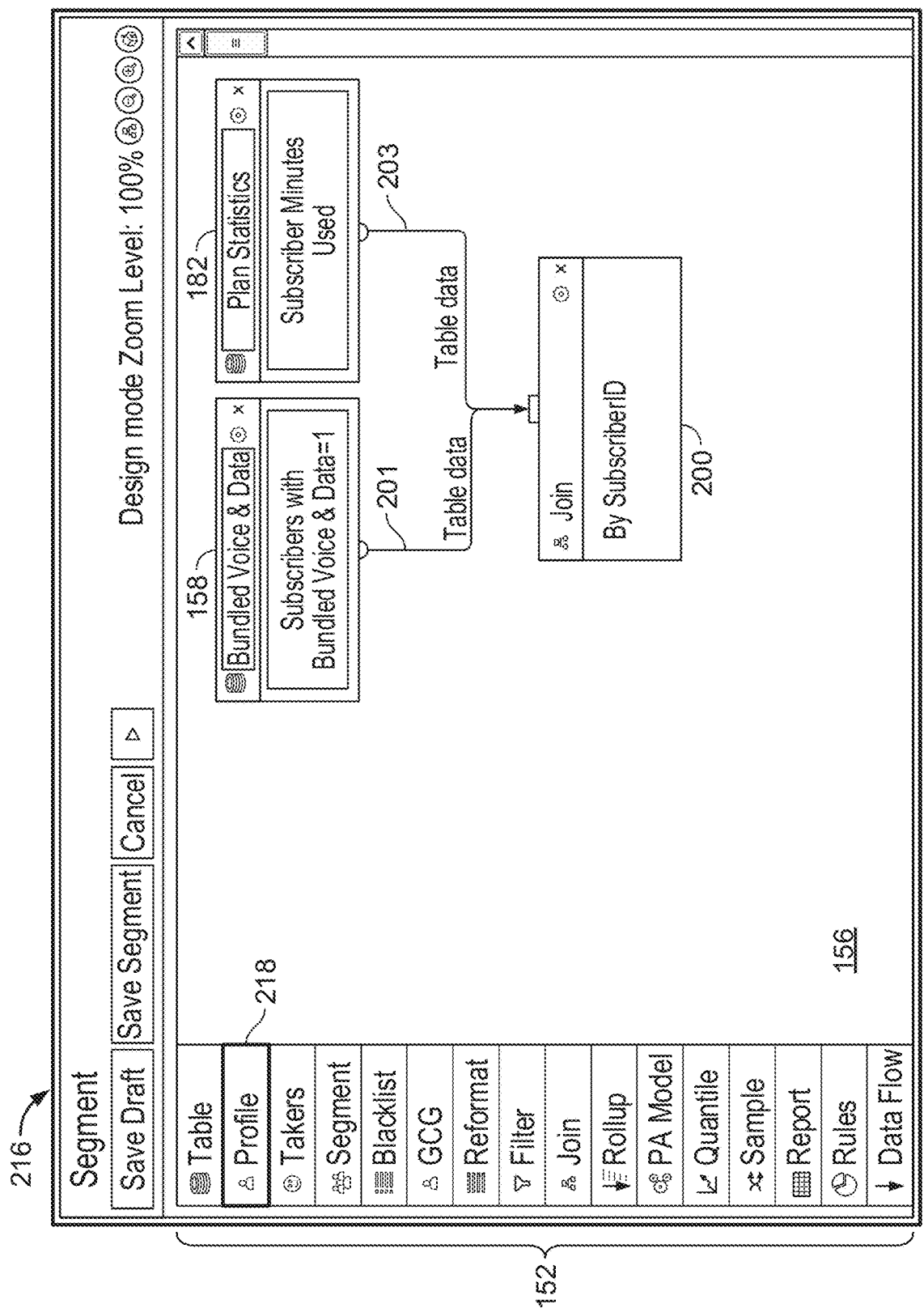
Figure 8M:
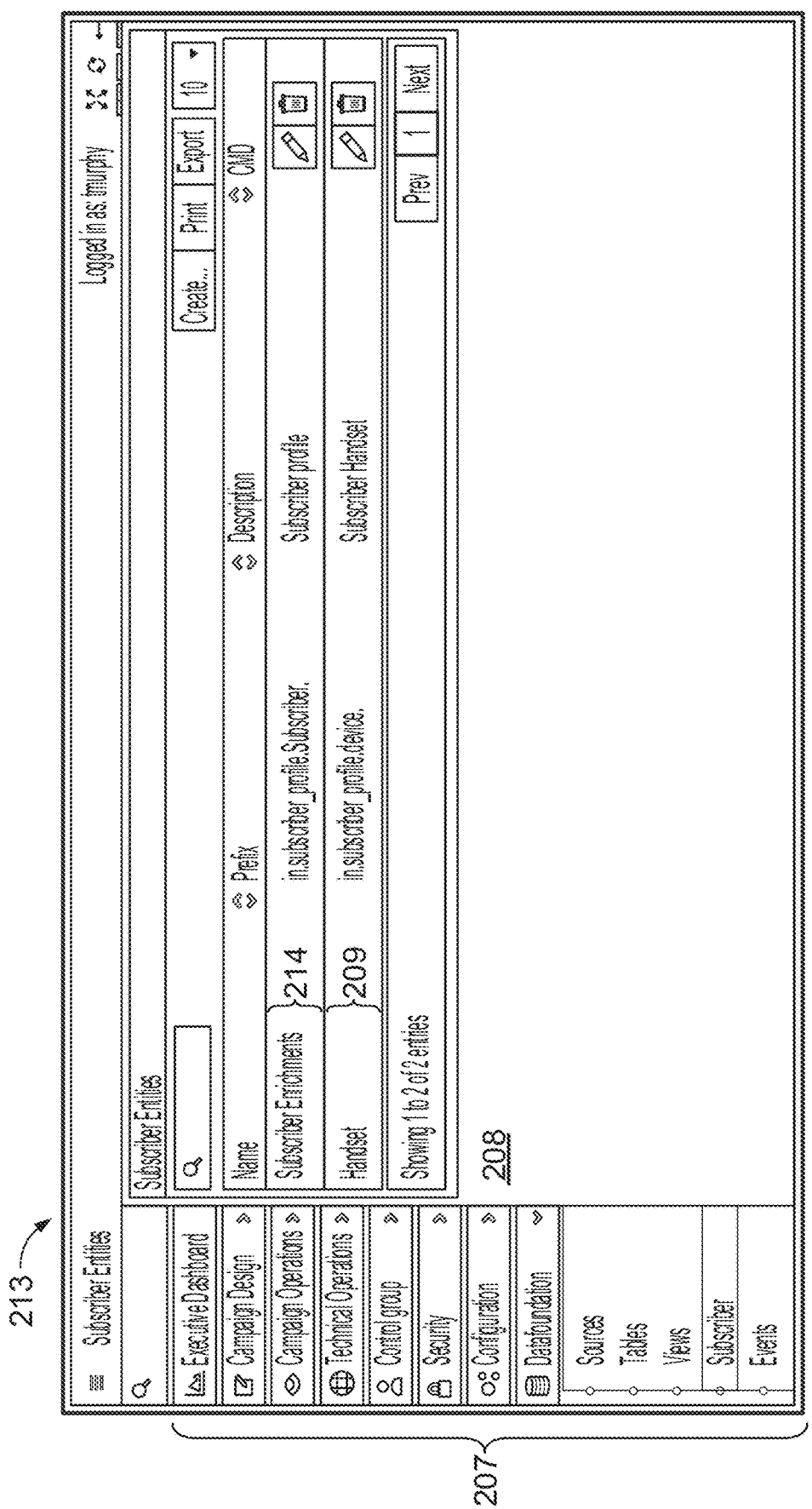

Referring to FIG. 8M, graphical user interface 213 is a modified version of graphical user interface 206 (FIG. 8K). In this example, entity portion 208 is updated to display visual representation 214 that represents the entity (referred to hereinafter as "subscriber enrichment entity") that is created in accordance with the specifications and selections made in graphical user interface 210 (FIG. 8L). In this example, the entities represented in visual representations 209, 214 are made available to the user in defining segments, as described in further detail below.

Referring to FIG. 8N, graphical user interface 216 is displayed and is a same graphical user interface as graphical user interface 194 (FIG. 8J). From menu portion 152, control 218 is selected to access the pre-defined entities, e.g., that are represented in entity portion 208 (FIG. 15).

Figure 8O:
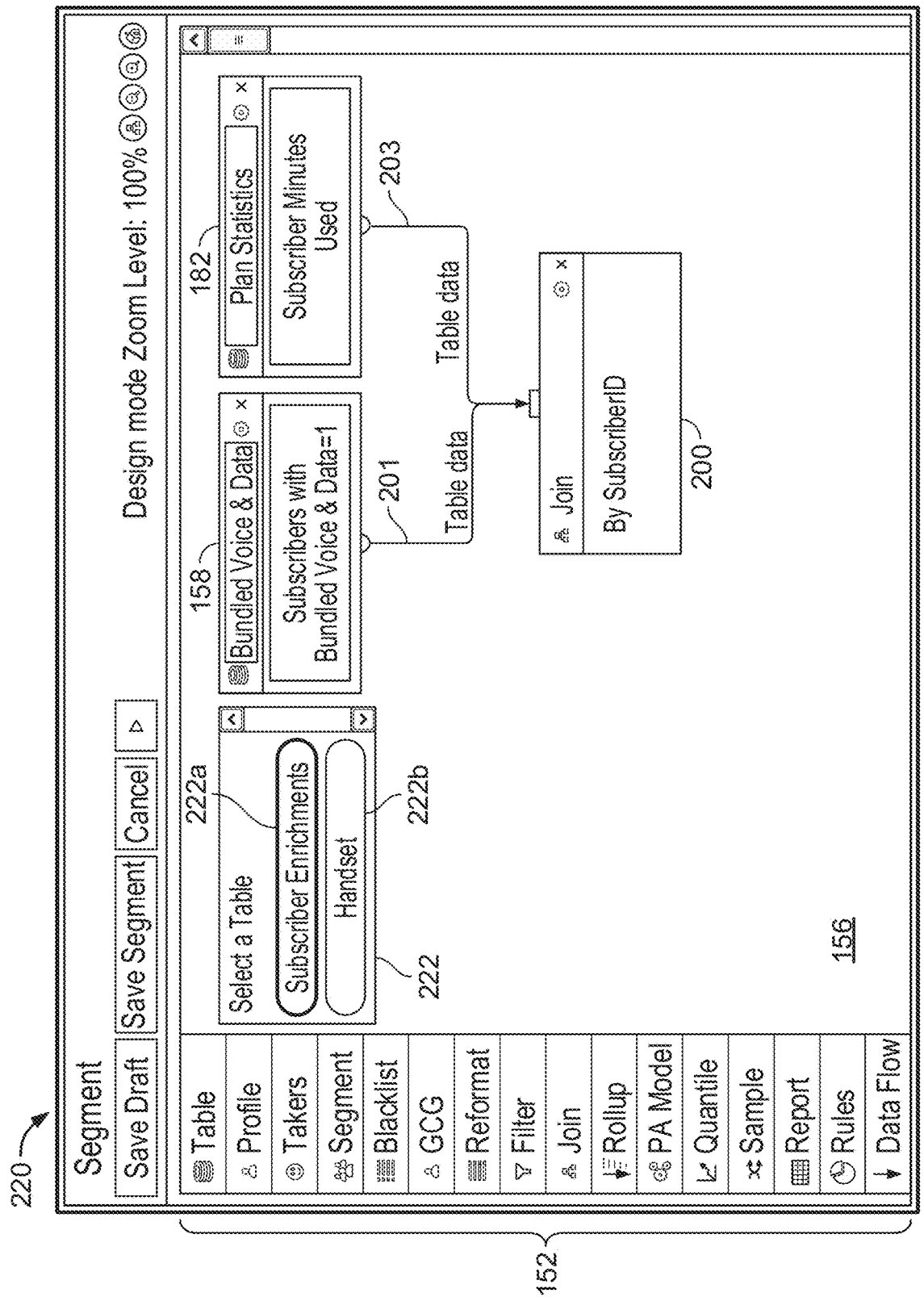

Referring to FIG. 8O, graphical user interface 220 is displayed and is a modified version of graphical user interface 216 (FIG. 8N), in which overlay portion 222 is rendered in editor interface 156. Overlay portion 222 includes visual representation 222a (of the subscriber enrichments entity defined in graphical user interface 210 in FIG. 8L) and visual representation 122b (of the handset entity represented by visual representations 209 in FIG. 8K). In this example, visual representation 222a is selected, e.g., to add subscribers meeting certain criteria specified by the subscriber enrichments entity to the segment being defined in editor interface 156.

Figure 8P:
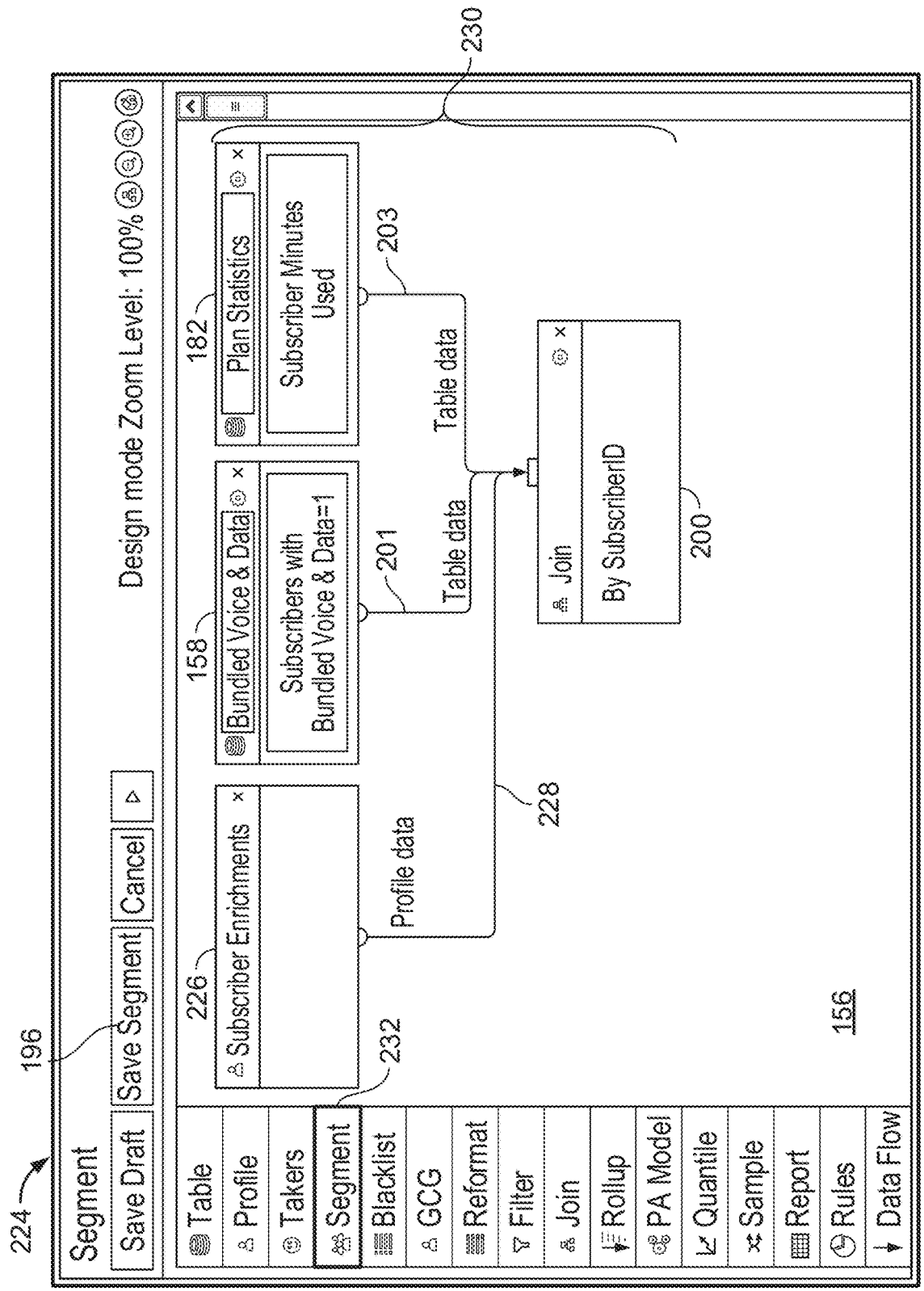

Referring to FIG. 8P, graphical user interface 224 is displayed. Graphical user interface 224 is a modified version of graphical user interface 220 (FIG. 8O), in which entity component 226 is added to editor interface 156. In this example, entity component 226 represents executable logic that, when executed, retrieves those data records with specified fields (e.g., fields 212k-212j in FIG. 8M). In a variation, entity component 226 represents executable logic that, when executed, retrieves values of fields 212k-212j (FIG. 8M) and values of keys associated with those fields. In this example, profile data is output from entity component 226 and joined, via connector 228 to join component 200, with the output of components 158, 182. By adding entity component 226 to editor interface 156, segment 230 is defined to include only those subscribers specified by entity component 226, subscribers with bundled voice and data plans (as specified by component 158) and subscribers that have used minutes (as specified by component 183). In this example, segment 230 is saved—for subsequent use—through selection of save control 196. In this example, selection of save control 196 causes the executable logic represented by components 158, 182, 200, 226 and by connectors 201, 203, 228 to be saved (e.g., in a data structure) for subsequent retrieval, e.g., in further defining other segments. In this example, execution system 14 (FIG. 1) may execute segment 230, e.g., to segment a plurality of data records stored in memory 16 (FIG. 1) to only include those data records with fields and/or with values of fields that satisfy the definition specified by segment 230. In this example, segment 230 can be accessed through segment control 232, which provides for selection of a segment component. The segment component allows for already defined segments to be used as a source for data selection when building segments.

In this example, segment 230 is an executable dataflow graph that is executed by segmentation module 22 in FIG. 1 (or segmentation module 22 in FIG. 9) to perform segmentation. Generally, an executable dataflow graph includes a directed dataflow graph, with vertices in the graph representing components (either data files or processes), and the links or "edges" in the graph indicating flows of data between components. A system for executing such graph-based computations and dataflow graphs is described in prior U.S. Pat. No. 5,966,072, titled "EXECUTING COMPUTATIONS EXPRESSED AS GRAPHS," incorporated herein by reference. By executing segmentation as a dataflow graph executing on system 14 (FIG. 1), system resources of system 14 and memory 16 (FIG. 1) are freed up, as the system (through execution of the dataflow graph) is performing the functionality of sorting, filtering, joining, etc. the data and data records, rather than performing that functionality directly in memory 16 (FIG. 1) or in other data storage devices. That is, the processing power and speed of memory 16 (FIG. 1) is increased due to execution of the dataflow graph to perform the segmentation functionality—rather than performing it by directly operating on data in memory—relative to the processing power and speed of memory 16, when the operations required for the segmentation are performed directly in memory 16.

In some examples, the system described herein identifies segments for various campaigns. Generally, a campaign is a definition of selected offers to send to specified users, e.g., at specified times. A dataflow graph may define a campaign, e.g., when the executable logic of the dataflow graph specifies how to determine which offers to send to segments assigned to that campaign. A campaign may be assigned a holdout type, including, e.g. instructions that specify or restrict membership in a campaign. There are various holdout types, including, e.g., a "none" type, a "global" type, a "voice" type, a "data" type, a "SMS" type, a "package" type, a "reload" type, and so forth. A campaign with a holdout type of none places no restrictions on subscribers. A campaign with a holdout type of global specifies that a subscriber can be in that campaign and no other campaign simultaneously. A campaign with a holdout type of voice specifies that a subscriber can only be in a single campaign of the voice holdout type at a time. A campaign with a holdout type of data specifies that a subscriber can only be in a single campaign of the data holdout type at a time. A campaign with a holdout type of SMS specifies that a subscriber can only be in a single campaign of the SMS holdout type at a time. A campaign with a holdout type of package specifies that a subscriber can only be in a single campaign of the package holdout type at a time. A campaign with a holdout type of reload specifies that a subscriber can only be in a single campaign of the reload holdout type at a time. When configuring a campaign, a user can choose whether or not the subscriber is released from campaign holdout when the campaign cycle ends.

The system also assigns each campaign a theme (e.g., a data structure storing data representing a theme), which represents the goal of a campaign. A campaign theme has a priority. The system uses this priority during campaign arbitration with a contact policy, as described below.

At any point in time, a subscriber may become eligible for one or more campaigns. It is important, and in some cases regulated by governing bodies, not to spam the subscriber with too many offers, but to target the most important offer to the subscriber. A contact policy governs how often the system can communicate to subscribers during campaigns. The contact policy sets the limit on the number of outbound offers the system can transmit. If a subscriber is eligible for multiple campaigns, the system needs to extend those offers in accordance with the contact policy and in accordance with the relative priorities of the various executing campaigns, so as not to extend offers for lower priority campaigns when offers can be extended for higher priority campaigns. For example, a subscriber might be in a particular stage of a high priority campaign, but has started to fall into a low engagement segment. As described below, the system executes campaign arbitration instructions to ensure the subscriber is not assigned lower priority offer when the subscriber should be assigned higher priority offers.

The system executes campaign arbitration instructions to select the best offer based on a campaign theme and priority, in case contact policies limit the number of offers that can be sent to the target customer. For example, if the contact policies dictate that a customer can be sent only two offers per day and the customer is eligible for five offers, the system selects the top two offers based on the campaign theme and priority (e.g., the system selects the two offers that are each associated with one of the campaigns with the top two priorities, relative to the priorities of the other campaigns).

For example, when configuring thousands of campaigns, a campaign scheduled to execute earlier in the day may consume the contact policy limits that the system would want to provide to a higher priority campaign. To resolve this, the system uses the priorities of the campaign themes to reserve a communication slot for a subscriber with a communication subsystem included in the system. Generally, the system stores data structures or queues for each subscriber and populates an entry in the data structure with data representing when a message is transmitted to the subscriber and/or populates an entry in the data structure with data that reserves that entry for a particular campaign. When it comes time for a message to be sent, the system then checks the contact policy for the subscriber and the data structure for that subscriber so that a lower priority campaign does not consume contact policy limits needed later in the day.

Referring to FIG. 8Q, graphical user interface 270 is displayed to enable modification of the subscriber enrichment entity defined in graphical user interface 210 (FIG. 8L). In this example, creation control 272 is selected, e.g., to add one or more additional fields to the definition of the subscriber enrichment entity. In this example, upon selection of creation control 272, one or more in-memory aggregates are added to the subscriber enrichment entity.

Figure 8R:
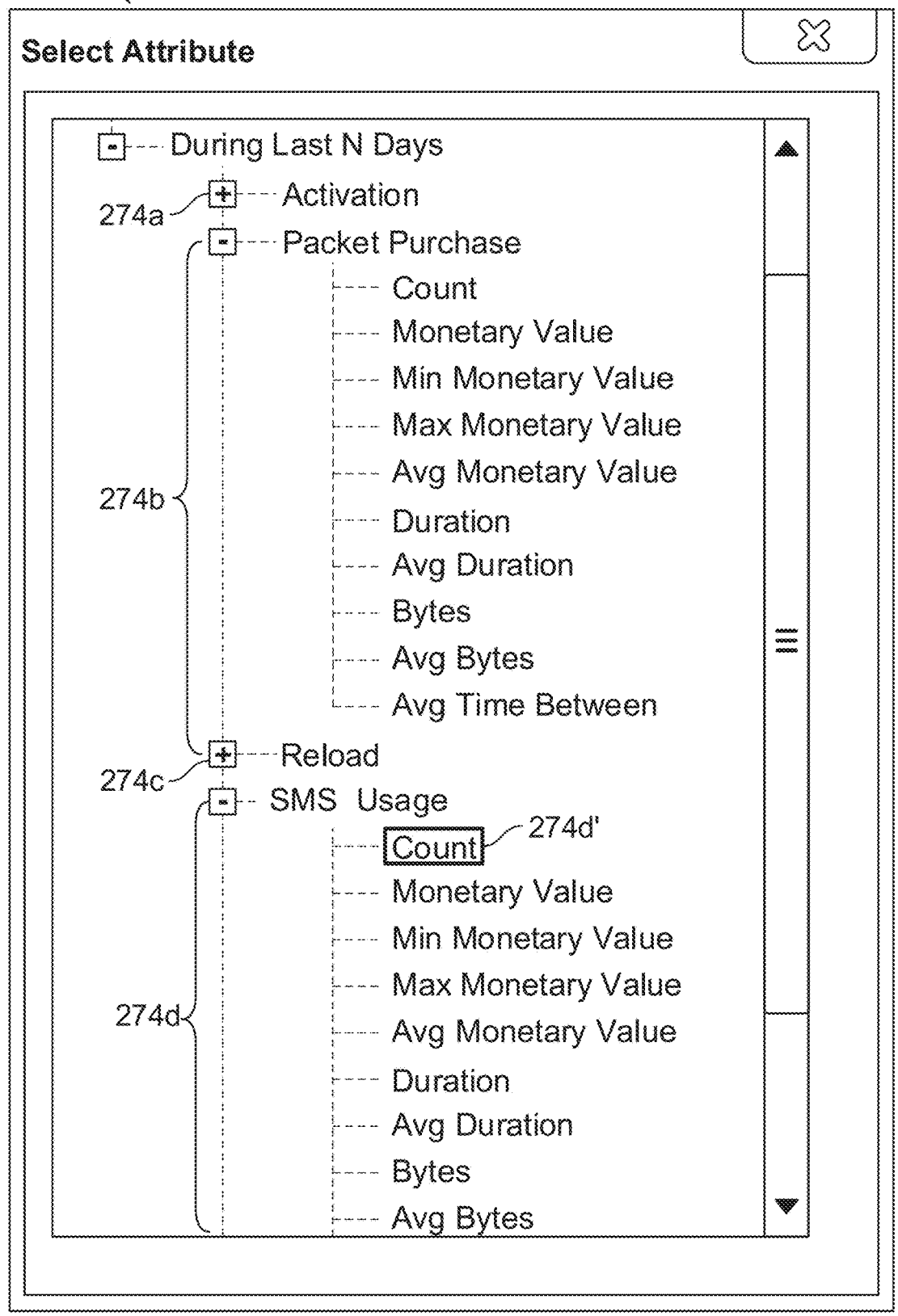

Referring to FIG. 8R, overlay 274 is displayed, e.g., as an overlay to graphical user interface 270 (FIG. 8Q). In this example, overlay 274 displays various types of in-memory aggregates 274a, 274b, 274c, 274d that can be added for inclusion in the subscriber enrichment entity. In this example, one of in-memory aggregates 274d (i.e., in-memory aggregate 274d') is selected for inclusion in the subscriber enrichment entity. In this example, in-memory aggregate 274d' is an in-memory aggregate that specifies a voice usage count (e.g., a number of voice calls made by a user).

Referring to FIG. 8S, graphical user interface 276 is an updated version of graphical user interface 270 (FIG. 8Q), in which field portion 212 is updated to include field 278—in accordance with selection of in-memory aggregate 274d' in FIG. 2l. Field 278 is a field for storing a value of in-memory aggregate 274d', thereby adding in-memory aggregate 274d' to the subscriber enrichment entity. In this example, in-memory aggregate 274d' is a voice usage count in-memory aggregate that provides, per key, a count of the amount of voice calls.

Figure 8T:
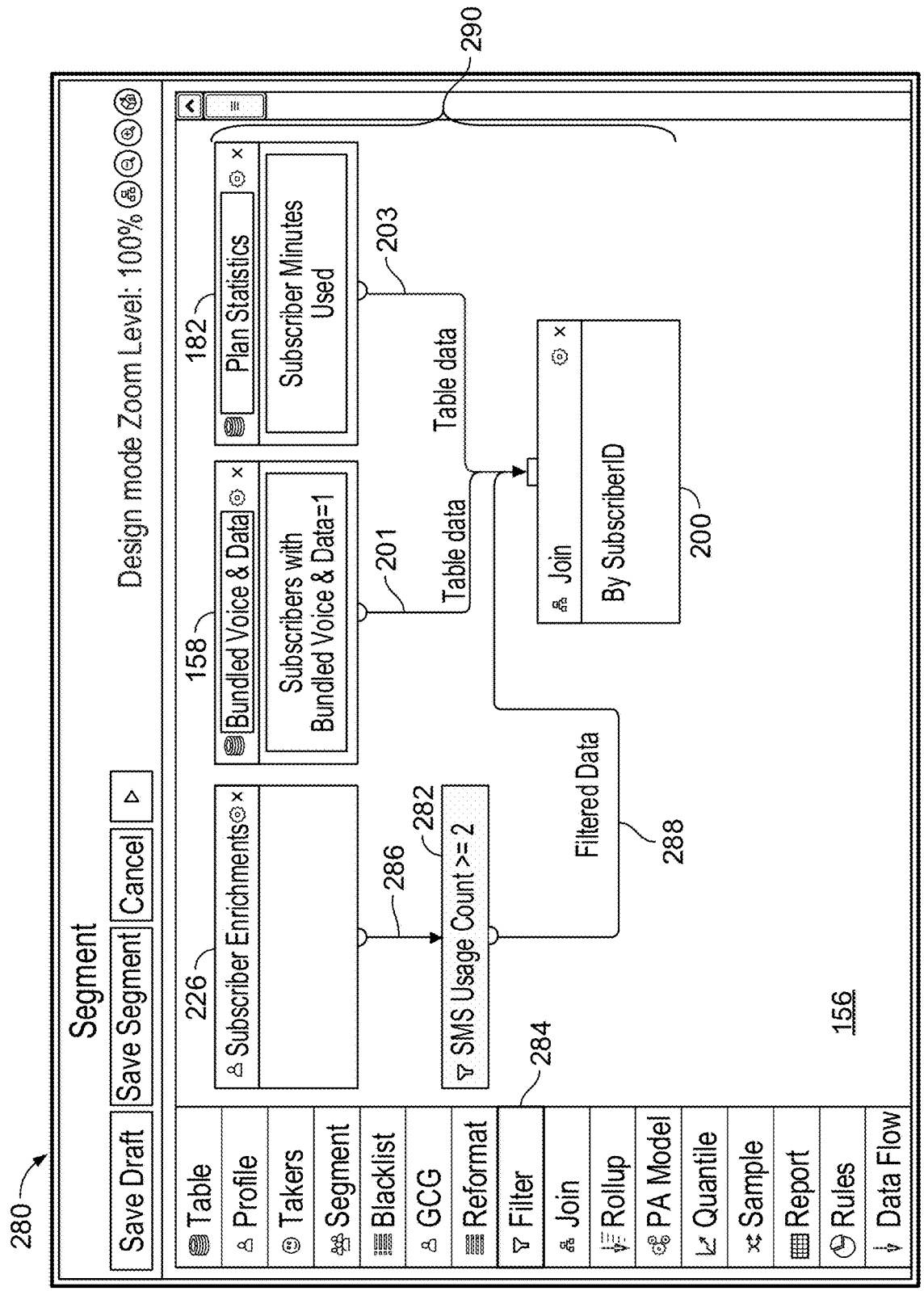

Referring to FIG. 8T, graphical user interface 280 is an updated version of graphical user interface 224 (FIG. 8N) in which filter component 282 is added to editor interface 156, e.g., following selection of filter control 284. The filter component represents executable logic to filter data on its flow according to specified rules. As specified by connector 286, profile data that is output from entity component 226 is input into filter component. In this example, the profile data that is output from entity component 226 includes a value (e.g., for each key value) for the voice usage count in-memory aggregate. Filter component 282 is configured to exclude, from the data records included in the output profile data, those data records where the value of voice usage count in-memory aggregate is greater than or equal to a value of two. In this example, only received data records specifying that a subscriber has made fewer than two voice calls would pass the logic represented by filter component 282, as these are the only received data records specifying that a subscriber has made fewer than two voice calls. Those data records that pass the criteria or logic represented by filter component 282 are the filtered data and they are input into join component 200—as specified by connector 288. The contents of editor interface 156 define a new segment, i.e., segment 290.

Figure 9:
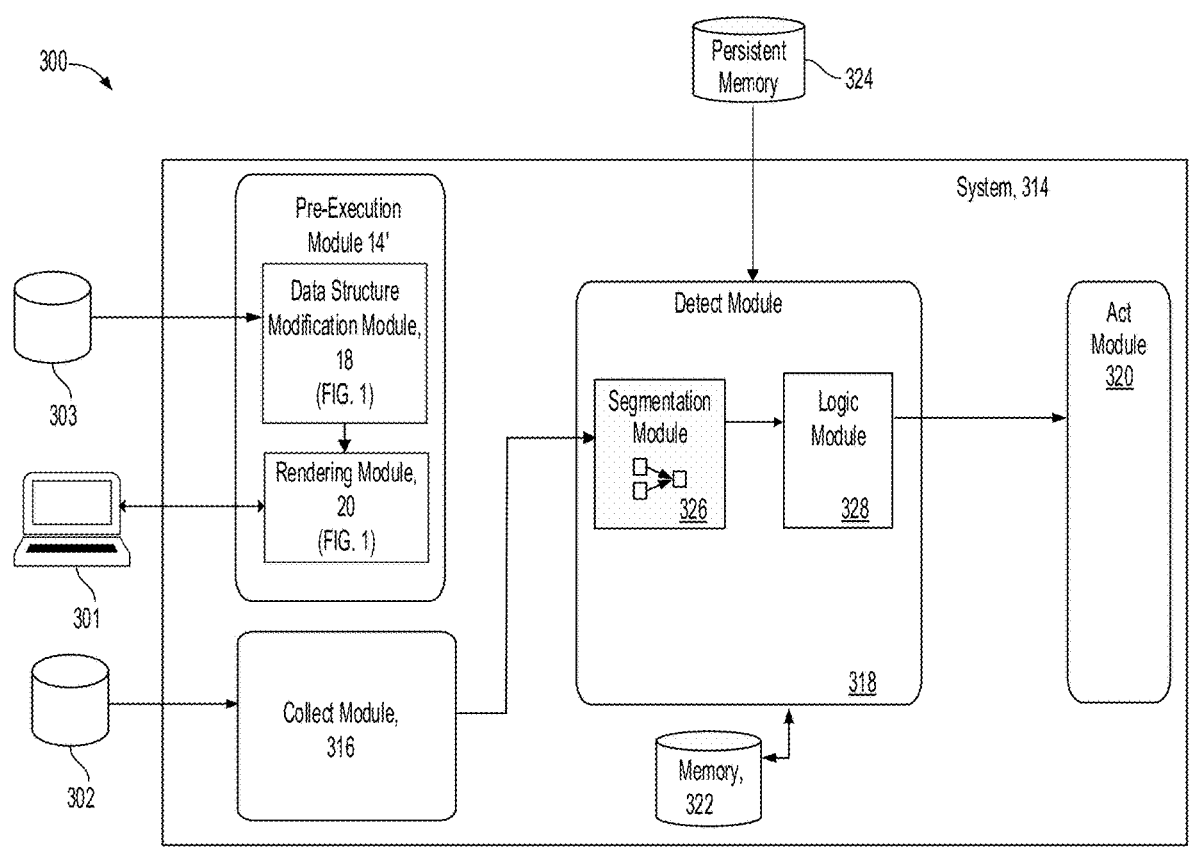
FIG. 9 is a block diagram of an execution environment implementing collect-detect-act (CDA) processing.

Referring to FIG. 9, an execution environment 300 uses a data source 303 (e.g., for receiving data records for which fields are curated or otherwise modified, as previously explained), a data source 302 (for receiving data records to be processed) and includes a system 314 for implementing collect-detect-act (CDA). Generally, CDA refers to the process of system 314 collecting data records, processing those data records to detect which data records include values satisfying specified criteria and performing one or more actions with reference to those data records. The environment also includes a pre-execution module 14' (similar to execution module 14) that includes a data structure modification module 18 (FIG. 1) for selecting one or more data sources from which data is made available and one or more data structures in those selected one or more data sources for modifying one or more data structures (e.g., by modifying field names), as discussed above. The pre-execution module 14' also includes a rendering module 20 (FIG. 1) for rendering in user interface (displayed on a client device 301) visual representations of the modified data structures, as discussed in FIG. 1.

Figure 10:
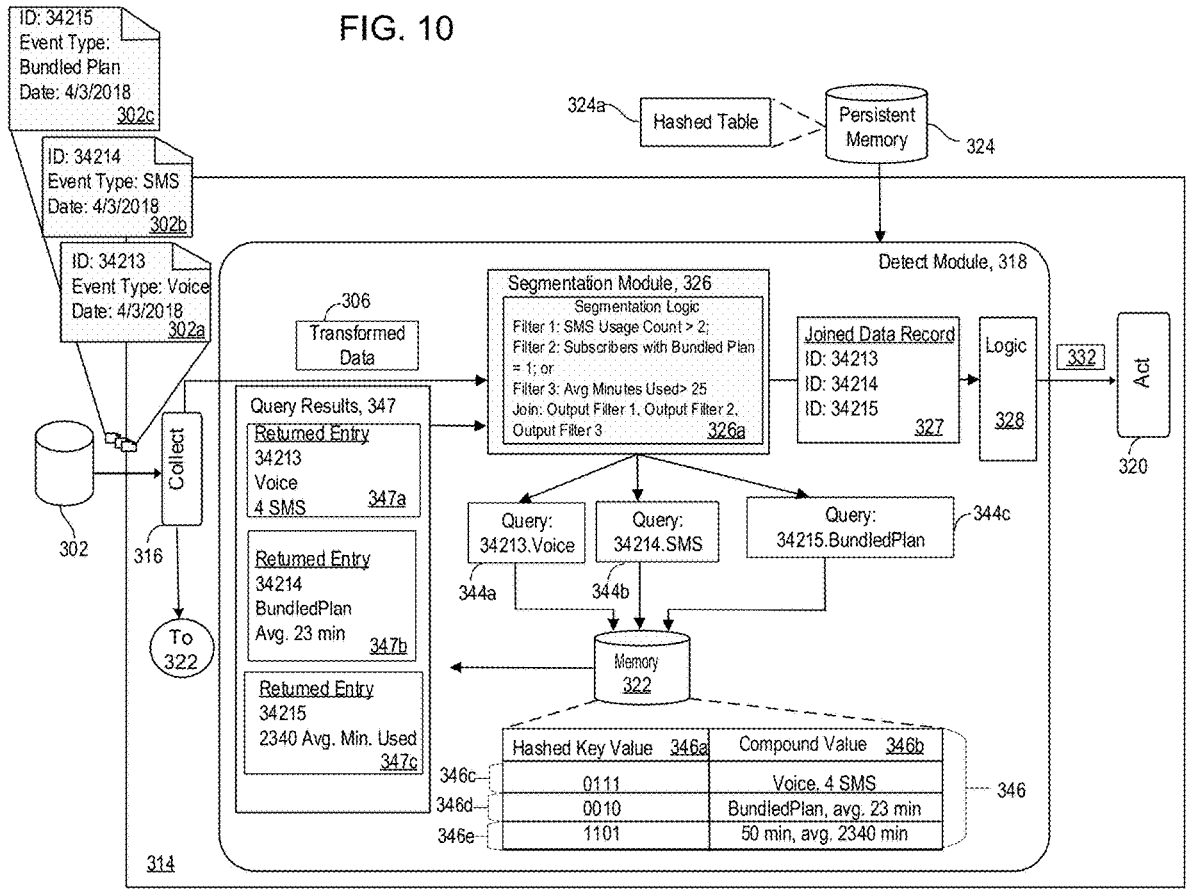
FIG. 10 is a block diagram of details of detect processing in the execution environment of FIG. 9.

Referring to FIG. 10, system 314 includes collect module 316 for collecting data records (e.g., data records 302*a-c* received from data source 302 and other data), transforming the data in the data records 302*a*-302*c* into transformed data 306 and distributing that transformed data 306 to downstream applications, including, e.g., segmentation module 326, detect module 318 and act module 320. The contents of data record 302*a* include "ID: 34213, Event Type: Voice, Date: 4/3/2018." The contents of data record 302*b* is "ID: 34214, Event Type: SMS, Date: 4/3/2018." The contents of data record 302*c* is "ID: 34215, Plan Type: Bundled Plan, Date: 4/3/2018." In this example, act module 320 includes an interface to third party systems and/or to an external system. In particular, collect module 316 gathers data from various sources, such as, e.g., data source 302 or from different servers located at different locations and interconnected via a network, in either batch or real time, and real-time data streams, e.g., real-time data coming from different servers located at different locations and interconnected via a network. Storage devices providing data source 302 may be local to system 314, for example, being stored on a storage medium connected to a computer running system 314 (e.g., a hard drive), or may be remote to system 314, for example, being hosted on a remote system in communication with system 314 over a local or wide area data network.

Collect module 316 records, in memory 322, a record of each event occurring in received data records. Collect module 316 records these occurrences in a data record or in a table, as previously described. In this example, collect module 316 records occurrences of the received events in hash table in memory 322. For each received record, collect module 316 generates (i) a compound key value by generating a compound key, which is then hashed to generate a hashed compound key as shown in column 346*a*, and (ii) a compound value—as shown in column 346*b*. In this example, the compound value is generated from data included in fields in the received data records and/or from previously stored data (e.g., stored in memory 322 or memory 324) that represents an aggregate (e.g., a count, a minimum value, an average value, a maximum value and so forth). In this example, entry 346*c* in hash table 346 is generated from received record 302*a*. To generate entry 346*c*, collect module 316 hashes the value ("34213") of the ID field in record 302*a* to generate hashed value of "0111," which is then stored in column 346*a* for entry 346*c*. In this example, collect module 316 include the value "voice" of the event field in record 302*a* in the compound value column 346*b* of entry 346*c*. Collect module 316 also include in the compound value column 346*b* of entry 346*c* other aggregations (e.g., retrieved from memory 322 or persistent memory 324) for the ID: 34213. In this example, the aggregation data retrieved represents a count ("4") of a number of SMS messages used over a specified period of time (e.g., over the last thirty days). In this example, hash table 346 also includes entries 346*d*, 346*e* with the shown values in columns 346*a* and 346*b*. In this example, entry 346*d* includes compound values of "Bundled plan, avg. 23 min" representing that for the ID with hashed value "0010" that the ID is associated with a bundled plan (which value was retrieved from a field of a received data record) and that the average number of minutes for a subscriber with that ID is twenty-three minutes (which value is an aggregation retrieved from either memory 322 or persistent memory 324). Entry 346*e* includes compound values of "50 min, avg. 2340 min" representing that for the ID with hashed value "1101" that the ID is had a current event (e.g., a phone call) of a length of fifty minutes (which value was retrieved from a field of a received data record) and that the average number of minutes for a subscriber with that ID is two-thousand three hundred forty minutes (which value is an aggregation retrieved from either memory 322 or persistent memory 324). As described in further detail below, segmentation module 326 then segments data records by identifying which of the data records include values for fields that satisfy the various criteria of one or more segment definitions stored in memory 322. In this example, segmentation module 326 includes segmentation logic 326*a*.

Referring now also to FIG. 10, in this example, detect module 318 executes segmentation logic 326*a* stored or otherwise included in segmentation module 326, e.g., which may be the same as segmentation module 22 in FIG. 1. Using the techniques described herein, segmentation module 326 executes one or more segment definitions to identify subscribers (identified by a key or subscriber ID) satisfying the various criteria included in the one or more segment definitions, e.g., segmentation logic 326*a*. For example, segmentation module 326 executes segment definitions against one or more collections of data records, e.g., stored in memory 322 or persistent memory 324, to identify a subset of those data records that satisfy the various criteria of the segment definitions. Generally, a segment definition includes a data structure storing data representing a definition of a segment. In this example, memory 322 stores records of event occurrences for fourteen days. Records of event occurrences that are more than fourteen days olds are stored in persistent memory 324.

In some examples, a segment definition requires a real-time aggregate (or a near real-time (e.g., live time) aggregate) of events occurring within the last fourteen days. In this example, segmentation module 326 generates the real-time aggregate by generating an appropriate query 344*a*-

344c (for the segment definition) and submitting that query to memory 322. In response, memory 322 executes the appropriate one of the queries 344a-344c against hashed table 346. In this example, each of the compound values for each of the respective hashed key values in hashed table 346 is a returned result to queries 344a-344c. In this example, memory returns query results 347, which include returned entries 347a—347c, as described in further detail below.

In this example, segmentation module 326 generates query 344a from contents of record 302a (and/or from data included in transformed data 306 that is representative of contents of record 302a). In this example, segmentation module 326 detects that record 302a includes a voice value for the event type field. Based on this field, segmentation module 326 generates query 344a that includes compound key "34213.Voice," which is a concatenation of the value of the ID field and Event type field in data record 302a. Upon receipt of query 344a, memory 322 is configured to hash the first portion of the compound key, as the first portion represents the value of the ID. In this example, the hashed value of "34213" is "0111" and memory 322 returns to segmentation module 326 entry 346c—as returned entry 347a. In this example, memory 322 unhashes the hashed key value when returning a value of entry 346c, so that returned entry 347a includes the ID value "34213."

Segmentation module 326 generates query 344b from contents of record 302b (and/or from data included in transformed data 306 that is representative of contents of record 302b). In this example, segmentation module 326 detects that record 302b includes a SMS value for the event field. Based on this field, segmentation module 326 generates query 344b that includes compound key "34214.SMS," which is a concatenation of the value of the ID field and event type field in data record 302b. Upon receipt of query 344b, memory 322 is configured to hash the first portion of the compound key, as the first portion represents the value of the ID. In this example, the hashed value of "34214" is "0010" and memory 322 returns to segmentation module 326 entry 346d—as returned entry 347b. In this example, memory 322 unhashes the hashed key value when returning a value of entry 346d, so that returned entry 347b includes the ID value "34214."

Segmentation module 326 generates query 344c from contents of record 302c (and/or from data included in transformed data 306 that is representative of contents of record 302c). In this example, segmentation module 326 detects that record 302c includes a Bundled Plan value for the event field. Based on this field, segmentation module 326 generates query 344c that includes compound key "34215.BundledPlan," which is a concatenation of the value of the ID field and event type field in data record 302c. Upon receipt of query 344c, memory 322 is configured to hash the first portion of the compound key, as the first portion represents the value of the ID. In this example, the hashed value of "34215" is "1101" and memory 322 returns to segmentation module 326 entry 346e—as returned entry 347c. In this example, memory 322 unhashes the hashed key value when returning a value of entry 346e, so that returned entry 347c includes the ID value "34215."

Upon receipt of query results 347, segmentation module 326 executes each of returned entries 347a-347c against segmentation logic 326a. In this example, returned entry 347a passes filter 1 and therefore the user represented by the ID in returned entry 347a is included in the segment. In this example, returned entry 347b passes filter 2 and therefore the user represented by the ID in returned entry 347b is included in the segment. In this example, returned entry 347c passes filter 3 and therefore the user represented by the ID in returned entry 347c is included in the segment. Based on each of entries 347a-347c passing at least one of the filters included in segmentation logic 326a, segmentation module 326 executes the logic (specified in segmentation logic 326a) of "Join: Output Filter 1, Output Filter 2, Output Filter 3" and generates joined data record 327, which specifies the values of the ID fields of data records that are included in the segment defined by segmentation logic 326a. Segmentation module 326 transmits joined data record 327 to logic module 328 for further processing, as described in more detail below.

In some examples, segmentation module 326 stores a shared variable that represents the requested real-time aggregate. Segmentation module 326 stores the value(s) or entries returned from memory 322 in the shared variable, which is then accessible by the various segment definitions requesting the shared variable. In this example, aggregates returned from memory 322 (e.g., as one or more items of compound values that are included in a returned entry, e.g., from hashed table 346) are real-time aggregates (or near real-time aggregates) because system 314 does not need to retrieve data from disk (e.g., persistent memory 324). Rather, the aggregates can be retrieved from on-system memory (e.g., memory 322). Additionally, system 314 pre-computes the aggregates, e.g., by recording the occurrences of events—rather than storing the records themselves. By recording the occurrences of events, system 314 can more quickly execute a query by simply identifying columns with names matching (or otherwise corresponding) to the requested types of data. Then, if the requested aggregation is a count—for example, system 314 can count the number of occurrences in the identified columns, which has a decreased processing time—than a processing time required to parse through data records and fields in data records to identify those data records with values that satisfy the specified criteria of the segment.

In another example, segmentation module 326 requests a real-time aggregate for data records occurring in the last twenty days. As such, system 314 needs to query both memory 322 and persistent memory 324 for the real-time aggregate. In this example, system 314 queries memory 322 as described above. System 314 also queries persistent memory 324 for data (and/or for occurrences of data) satisfying the criteria needed for the real-time aggregate. Based on the requested criteria, persistent memory 324 retrieves (e.g., from hash table 324a that hashes contents of older records, e.g., records that were received prior to a specified date) appropriate and/or relevant data in data records and transmits that retrieved data (as on-disk data) to detect module 318.

In this example, data from persistent memory 324 includes data specifying occurrences of events, with those occurrences happening more than fourteen days ago. In this example, segmentation module 326 aggregates the data from persistent memory 324 with the data retrieved from memory 322 to generate the requested real-time aggregate (e.g., aggregations that are included in the compound value portion of a compound key value). In particular, the segment definition implemented by segmentation module 326 specifies that only users who have made more than three voice calls in the last twenty days are included in the segment. In this example, the executable logic implemented by logic module 328 in executed on data records for users in the segment (e.g., data records that include keys representing users in the segment). In this example, system 314 queries memory 322 for counts of voice calls associated with a particular subscriber ID.

In this example, memory 322 returns a count of two voice calls having been made for the user represented by the particular subscriber ID. System 314 then queries persistent memory 324 for counts of voice calls (made within the last six days) and the associated, specified subscriber IDs. Data returned from persistent memory 324 (e.g., based on querying has table 324a) specifies that one voice call has been made for the user associated with particular subscriber ID. As such, on-disk data specifies a count of one voice call having been made for the user represented by the particular subscriber ID. Detect module 318 receives on-disk data and aggregates the count (included in on-disk data) for the particular subscriber ID with the count for the particular subscriber ID retrieved from memory 322 to identify that the user associated with the particular subscriber ID has made three calls in the last 20 days, and therefore satisfies the criteria of the segment definition and is included in the segment.

In this example, segmentation module 326 transmits to logic module 328 data items specifying a subscriber ID of a subscriber satisfying the criteria of the one or more segment definitions. In this example, each of data items is a wide record that includes all compound values that are used by system 314. That is, the wide record is a wide record of all events or compound keys that are used by the system. In this example, the system stores all compound keys and associated compound values, as previously described. However, the system only includes in the wide record those compound keys that are actually being used by system 314 (e.g., by segmentation module 326, logic module 328 or act module 320). In this example, the system pre-identifies which compound keys are being used and/or accessed and the system only adds to the wide record those accessed compound keys (and associated compound values) to optimize system performance and ensure that there are no increased in latency in terms of data processing.

Logic module 328 stores and executes executable logic represented as dataflow graphs, as previously described. In this example, logic module 328 executes the dataflow graphs against particular segments of subscribers, as identified in segmentation module 326. The dataflow graph identifies different actions to be performed with regard to different subscribers, e.g., based on attributes of subscribers included in the segment.

Upon detection of a subscriber (included in a segment) that satisfies various criteria for performance of an action, detect module 318 publishes trigger 332 (e.g., instructions or messages) to a queue, the contents of which are received and processed by act module 320. Generally, trigger 332 specifies one or more instructions to perform one or more actions.

Act module 320 executes actions that have been triggered, such as sending a text message or email, opening a ticket for work orders in a case management system, cutting a service immediately, providing a web service to the targeted system or device, transmitting packetized data with one or more notifications and so forth. In another example, act module 320 generates instructions and/or contents of messages and sends these instructions (and/or contents) to third party systems, which in turn execute the actions based on the instructions, e.g., transmit the text messages, provides the web service and so forth. In an example, act module 320 is configured to generate customized content for various recipients. In this example, act module 320 is configured with rules or instructions that specify which customized content is sent or transmitted to which recipients.

Figure 11:
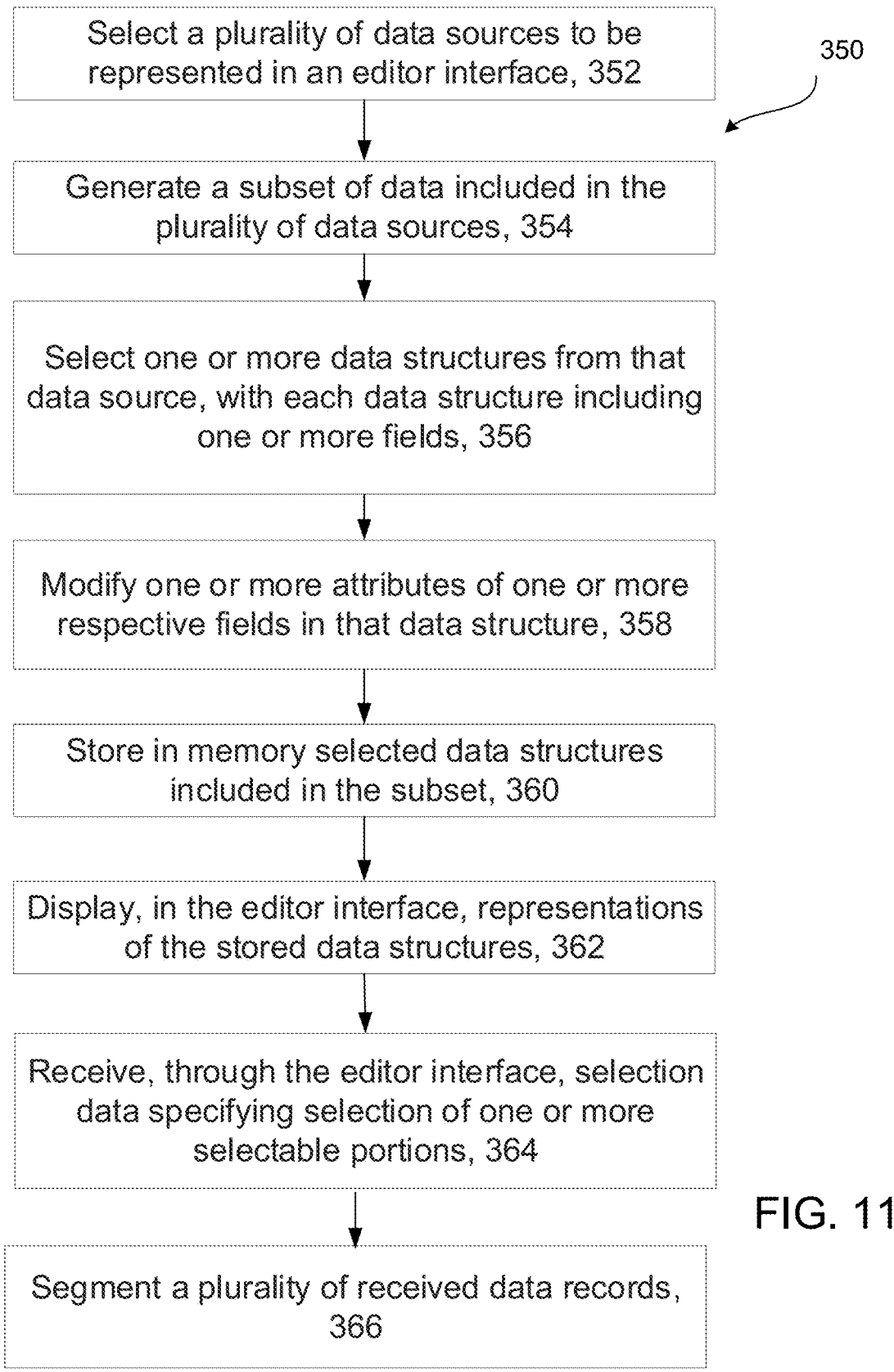
FIG. 11 is a flow diagram for producing modified data structures included in combined data sources.

Referring now to FIG. 11, a process 350 for processing data structures to modify attributes of the data structures is shown. The processing selects 352 one or more of a plurality of data sources to be represented in an editor interface, and generates 354 a subset of data included in the plurality of data sources, and selects 356 one or more data structures from the selected data source(s), with each data structure including one or more fields that are modified by modifying 358 one or more attributes of one or more fields in the selected data structure. The modified data structure(s) are stored 360 in memory (e.g., memory 16 FIG. 1 or 56 of FIG. 6 or 58 of FIG. 6) and the selected data structures are included in the subset. Displayed in the editor interface are representations of the stored data structures. The process receives 364 through the editor interface the selection data that specify selection of one or more selectable portions and the process 350 segments 366 a plurality of received data records by identifying which of the received data records have one or more fields that correspond to one or more fields represented in the one or more selectable portions selected.

Figure 12:
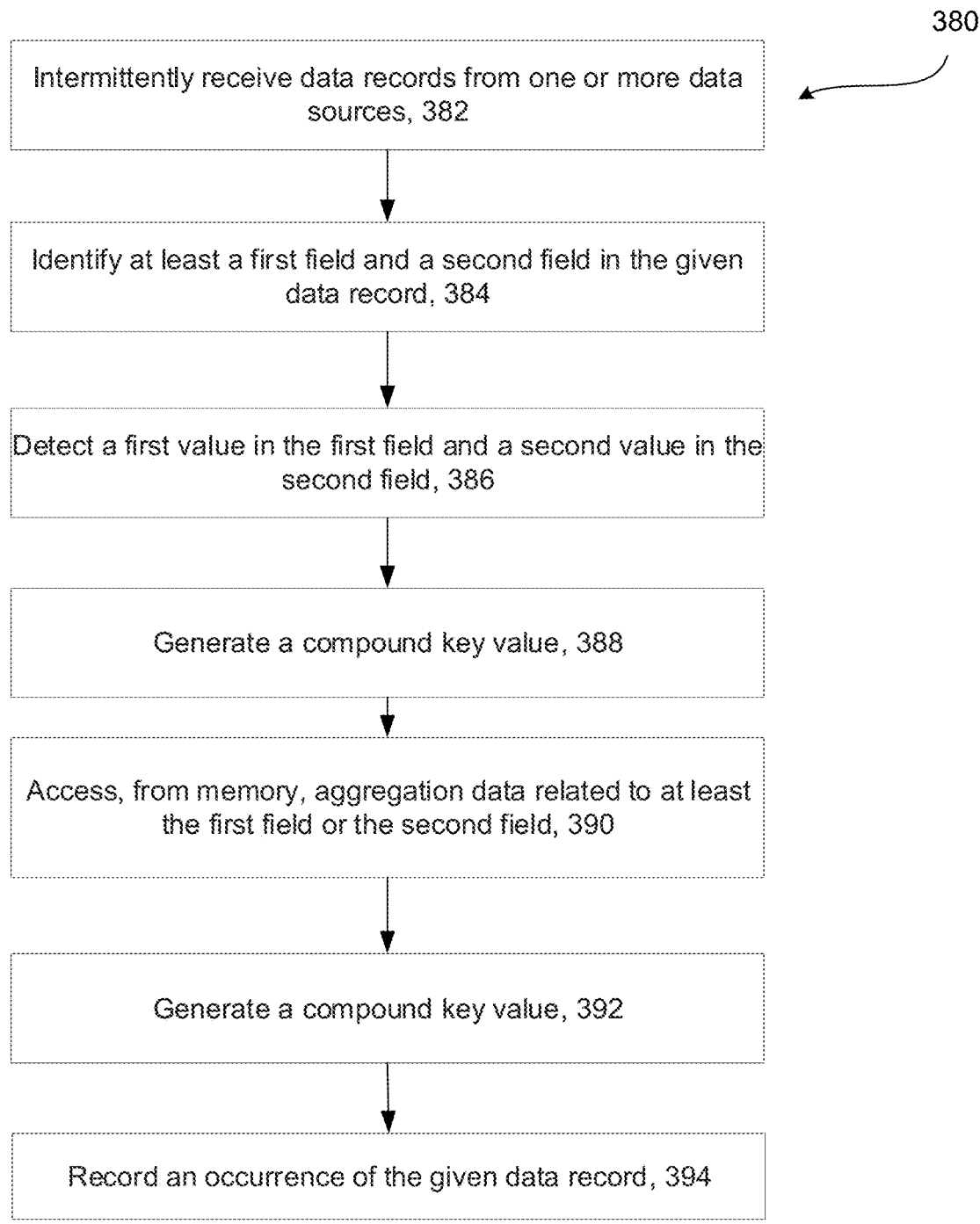
FIG. 12 is a flow diagram of generating compound key values.

Referring now to FIG. 12, a process 380 for aggregating data records is shown. The process 380 intermittently receives 382 data records from one or more data sources, e.g., 72a-72d (FIG. 7), and identifies 384 at least a first field and a second field in a given data record from the one or more data sources. The process 380 detects 386 existence of a first value in the first field and a second value in the second field of the given record. The process 380 generates 388 a compound key value, as described above. The process accesses 390 from memory 322 (FIG. 7), aggregation data that is related to at least the first field or the second field of the given record, and generates 392 a compound key value, and records 394 an occurrence of the given data record.

Figure 13:
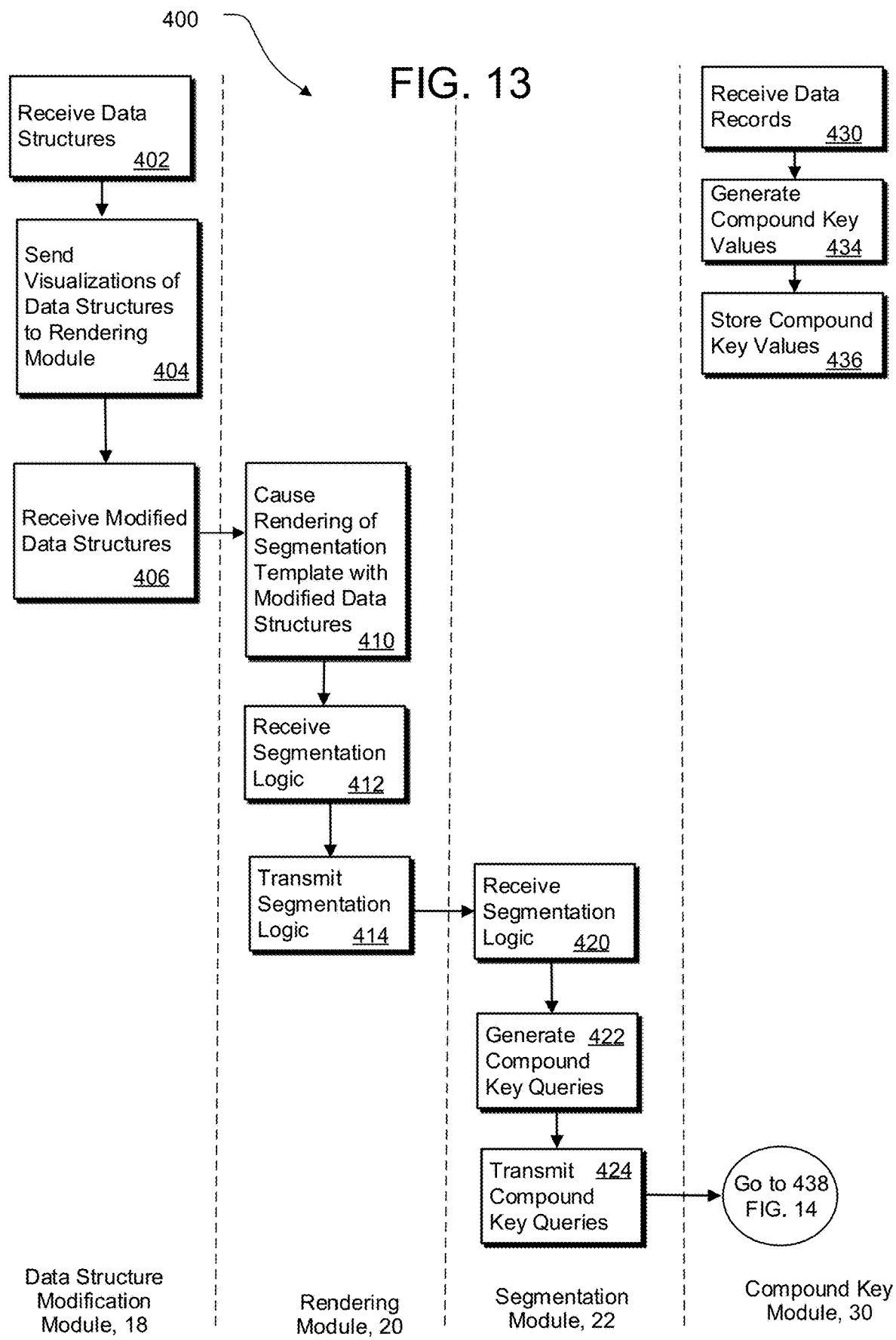
FIGS. 13 and 14 are each a diagram depicting functions of the functional modules included in the execution system.

Referring now to FIG. 13, process 400 is executed in which functional modules executed by each of the data structure modification module 18, rendering module 20, segmentation module 22, and compound key module 30 and logic module 25 are shown. The data structure modification module 18, receives data structures 402, causes rendering 404 of visualization of the data structures, and receives 406 modified data structures 418 resulting from the execution system modifying the data structures in the data structure modification module 18.

The rendering module 20 receives the modified data structures from the data structure modification module 18 and causes 410 rendering of a segmentation template, with the modified data structures. The rendering module also receives segmentation logic 412, and transmits 414 the segmentation logic to the segmentation module 22.

The segmentation module 22 receives 420 the segmentation logic and generates 422 compound key queries that are transmitted 424 to the compound key module 30.

The compound key module 30 receives 430 data records (e.g., from repository 12a in FIG. 1), from which a compound key is generated by generating 434 compound key values. The compound key module 30 stores 436 the compound key values (e.g., in data repository 12e in FIG. 3).

Figure 14:
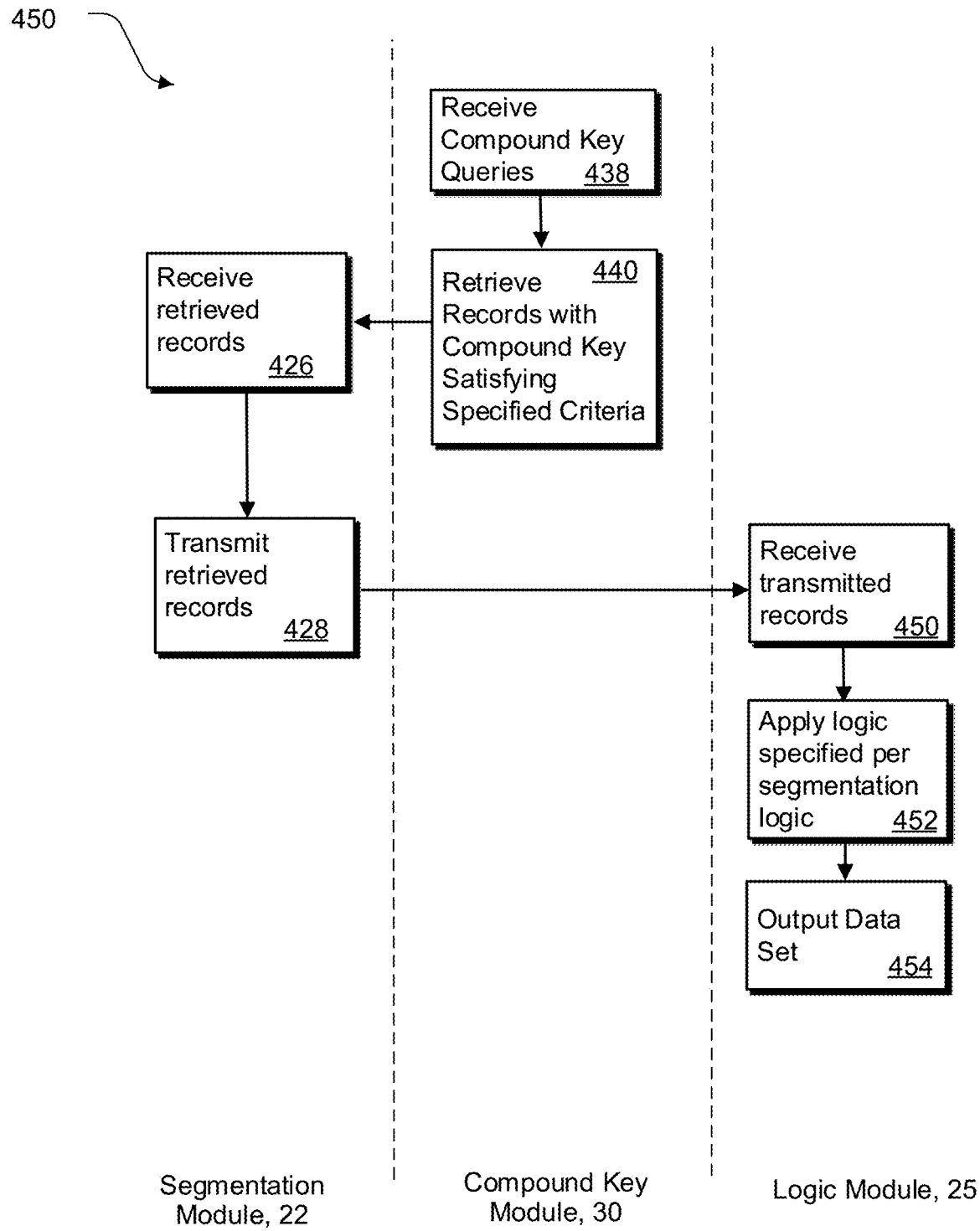

Referring now to FIG. 14, process 450 is shown in which functional modules executed by each of the segmentation module 22, and compound key module 30 and logic module 25 are shown. The compound key module 30 receives 438 compound key queries and retrieves 440 those records with the compound key that satisfy specified criteria, and transmits the retrieved records to the segmentation module 22. The segmentation module 22 receives 426 retrieved queried records from the compound key module 30 and transmits 428 the retrieved records to the logic module 25.

The logic module 25 receives 450 the transmitted records from the segmentation module 22 and applies 452 logic that is specified by the segmentation logic, such as the executable logic represented by component 158, and thereafter outputs 454 a data set resulting from the processing.

The techniques described above can be implemented using software for execution on a computer. For instance, the software forms procedures in one or more computer programs that execute on one or more programmed or programmable computer systems (which can be of various architectures such as distributed, client/server, or grid) each including at least one processor, at least one data storage system (including volatile and non-volatile memory and/or storage elements), at least one input device or port, and at least one output device or port. The software can form one or more modules of a larger program, for example, that provides other services related to the design and configuration of charts and flowcharts. The nodes, links and elements of the chart can be implemented as data structures stored in a computer readable medium or other organized data conforming to a data model stored in a data repository.

The techniques described herein can be implemented in digital electronic circuitry, or in computer hardware, firmware, software, or in combinations thereof. An apparatus can be implemented in a computer program product tangibly embodied or stored in a machine-readable storage device (e.g., a non-transitory machine-readable storage device, a machine-readable hardware storage device, and so forth) for execution by a programmable processor; and method actions can be performed by a programmable processor executing a program of instructions to perform functions by operating on input data and generating output. The embodiments described herein, and other embodiments of the claims and the techniques described herein, can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object oriented programming language, or in assembly or machine language if desired; and in any case, the language can be a compiled or interpreted language.

Processors suitable for the execution of a computer program include, by way of example, both general and special purpose microprocessors, and any one or more processors of any kind of digital computer. Generally, a processor will receive instructions and data from a read-only memory or a random-access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Computer readable media for embodying computer program instructions and data include all forms of non-volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in special purpose logic circuitry. Any of the foregoing can be supplemented by, or incorporated in, ASICs (application-specific integrated circuits).

To provide for interaction with a user, embodiments can be implemented on a computer having a display device, e.g., a LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments can be implemented in a computing system that includes a back end component, e.g., as a data server, or that includes a middleware component, e.g., an application server, or that includes a front end component, e.g., a client computer having a graphical user interface or a Web browser through which a user can interact with an implementation of embodiments, or any combination of such back end, middleware, or front end components. The components of the system can be interconnected by any form or medium of digital data communication, e.g., a communication network. Examples of communication networks include a local area network (LAN) and a wide area network (WAN), e.g., the Internet.

The system and method or parts thereof may use the "World Wide Web" (Web or WWW), which is that collection of servers on the Internet that utilize the Hypertext Transfer Protocol (HTTP). HTTP is a known application protocol that provides users access to resources, which may be information in different formats such as text, graphics, images, sound, video, Hypertext Markup Language (HTML), as well as programs. Upon specification of a link by the user, the client computer makes a TCP/IP request to a Web server and receives information, which may be another Web page that is formatted according to HTML. Users can also access other pages on the same or other servers by following instructions on the screen, entering certain data, or clicking on selected icons. It should also be noted that any type of selection device known to those skilled in the art, such as check boxes, drop-down boxes, and the like, may be used for embodiments using web pages to allow a user to select options for a given component. Servers run on a variety of platforms, including UNIX machines, although other platforms, such as Windows 2000/2003, Windows NT, Sun, Linux, and Macintosh may also be used. Computer users can view information available on servers or networks on the Web through the use of browsing software, such as Firefox, Netscape Navigator, Microsoft Internet Explorer, or Mosaic browsers. The computing system can include clients and servers. A client and server are generally remote from each other and typically interact through a communication network. The relationship of client and server arises by virtue of computer programs running on the respective computers and having a client-server relationship to each other.

Other embodiments are within the scope and spirit of the description and the claims. For example, due to the nature of software, functions described above can be implemented using software, hardware, firmware, hardwiring, or combinations of any of these. Features implementing functions may also be physically located at various positions, including being distributed such that portions of functions are implemented at different physical locations. The use of the term "a" herein and throughout the application is not used in a limiting manner and therefore is not meant to exclude a multiple meaning or a "one or more" meaning for the term "a." Additionally, to the extent priority is claimed to a provisional patent application, it should be understood that the provisional patent application is not limiting but includes examples of how the techniques described herein may be implemented.

A number of embodiments of the invention have been described. Nevertheless, it will be understood by one of ordinary skill in the art that various modifications may be made without departing from the spirit and scope of the claims and the techniques described herein.

What is claimed is:

1. A data processing system for producing a subset of data from a plurality of data sources, specifying one or more attributes of one or more respective fields of the subset and displaying an editor interface that enables segmentation of data records by displaying one or more representations of the one or more specified attributes, including:
    memory storing a plurality of data sources to be represented in an editor interface;
    a data structure modification module that identifies a plurality of data sources to be represented in an editor interface and generates a subset of data included in the plurality of data sources, by:
        for each of the data sources,
            identifying one or more first data structures from that data source, with each first data structure including one or more fields; and
            for at least one first data structure,
                accessing a second data structure corresponding to the at least one first data structure; and
                specifying one or more attributes of one or more respective fields in that second data structure, with the one or more specified attributes of the one or more respective fields the second data structure corresponding to a version of one or more attributes of one or more fields in the at least one first data structure, wherein the version includes a modification to the one or more attributes of the one or more fields of the at least one first data structure;
    memory that stores second data structures included in the subset, with at least one of the second data structures including one or more given attributes corresponding to the version of the one or more attributes of the one or more respective fields of the at least one first data structure corresponding to the at least one of the second data structures;
    a rendering module that displays, in the editor interface, representations of the one or more given attributes (i) specified for the at least one of the second data structures, and (ii) corresponding to the version of the one or more attributes of the one or more respective fields of the at least one first data structure corresponding to the at least one of the second data structures in the subset, wherein the version includes the modification to the one or more attributes of the one or more fields in the at least one first data structure, and that further:
        receives, through the editor interface, selection data specifying selection of one or more representations of the one or more given attributes corresponding to the version of the one or more attributes of the one or more fields of the at least one first data structure corresponding to the at least one of the second data structures, wherein the version includes the modification to the one or more attributes of the one or more fields in the at least one first data structure; and
        receives, through the editor interface, one or more criteria be applied to data records; and
    a segmentation modules that segments, based on the one or more criteria, a plurality of received data records by identifying some of the received data records that have one or more fields represented in the one or more selected representations of the one or more given attributes corresponding to the version of the one or more attributes of the one or more fields of the at least one first data structure corresponding to the at least one of the second data structures, wherein one or more of the segmented data records are associated with a key field specifying a value of a key; and
    when instructions are received through the editor interface to join segmented data records based on one or more values of one or more keys:
        for segmented data records associated with a given value of a key, joins the segmented data records associated with the given value of the key; and
        outputs the joined data records.

2. The data processing system of claim 1, wherein a data structure includes a key field that represents a key for that data structure, a record is associated with a value of the key, wherein the data processing system includes one or more processing devices and one or more machine-readable media that store instructions that are executable by the one or more processing devices to perform operations including:
    selecting a plurality of fields from a plurality of selected data structures; and
    storing in memory executable instructions that when executed:
        select, for a specified value of the key, values for the respective selected fields;
        join the selected values for the specified value of the key; and
        output the joined values.

3. The data processing system of claim 1, wherein the representations are first representations, and wherein the data processing system includes one or more processing devices and one or more machine-readable media that store instructions that are executable by the one or more processing devices to perform operations including:
    displaying in the editor interface a second representation of the executable instructions.

4. The data processing system of claim 1, wherein the operations further include:
    receiving, through the editor interface, selection data specifying selection of the second representation and further specifying that one or more criteria be applied to those output, joined values of one or more given fields represented by the at least one of the second data structures.

5. The data processing system of claim 1, wherein the data processing system includes one or more processing devices and one or more machine-readable media that store instructions that are executable by the one or more processing devices to perform operations including:
    displaying a user interface with one or more first controls for selecting data structures and with one or more second controls for modifying one or more fields.

6. The data processing system of claim 1, wherein the data processing system includes one or more processing devices and one or more machine-readable media that store instructions that are executable by the one or more processing devices to perform operations including:
    receiving, through the editor interface, additional data specifying one or more criteria to be applied to one or more given fields represented by one or more selectable portions selected through the editor interface;

wherein segmenting includes segmenting the plurality of received data records by identifying which of the received data records have one or more value of one or more fields that correspond to one or more fields represented in the one or more selectable portions selected and that satisfy the one or more criteria.

7. The data processing system of claim 1, wherein a data structure includes one or more records, with each record having one or more values for a particular field.

8. The data processing system of claim 1, wherein at least one of the data sources includes an unselected data structure.

9. A method implemented by a data processing system for producing a subset of data from a plurality of data sources, specifying one or more attributes of one or more respective fields of the subset and displaying an editor interface that enables segmentation of data records by displaying one or more representations of the one or more specified attributes, the method including:

identifying a plurality of data sources to be represented in an editor interface;

generating a subset of data included in the plurality of data sources, by:

for each of the data sources, identifying one or more first data structures from that data source, with each first data structure including one or more fields; and for at least one first data structure, accessing a second data structure corresponding to the at least one first data structure; and specifying one or more attributes of one or more respective fields in that second data structure, with the one or more specified attributes of the one or more respective fields of the second data structure corresponding to a version of one or more attributes of one or more fields in the at least one first data structure, wherein the version includes a modification to the one or more attributes of the one or more fields of the at least one first data structure; and storing in memory second data structures included in the subset, with at least one of the second data structures including one or more given attributes corresponding to the version of the one or more attributes of the one or more respective fields of the at least one first data structure corresponding to the at least one of the second data structures, wherein the version includes the modification to the one or more attributes of the one or more fields in the at least one first data structure;

displaying, in the editor interface, representations of the one or more given attributes (i) specified for the at least one of the second data structures, and (ii) corresponding to the version of the one or more attributes of the one or more respective fields of the at least one first data structure corresponding to the at least one of the second data structures in the subset, wherein the version includes the modification to the one or more attributes of the one or more fields in the at least one first data structure;

receiving, through the editor interface, selection data specifying selection of one or more representations of the one or more given attributes corresponding to the version of the one or more attributes of the one or more fields of the at least one first data structure corresponding to the at least one of the second data structures, wherein the version includes the modification to the one or more attributes of the one or more fields in the at least one first data structure;

receiving, through the editor interface, one or more criteria be applied to data records;

based on the one or more criteria, segmenting a plurality of received data records by identifying some of the received data records that have one or more fields represented in the one or more selected representations of the one or more given attributes corresponding to the version of the one or more attributes of the one or more fields of the at least one first data structure corresponding to the at least one of the second data structures, wherein the version includes the modification to the one or more attributes of the one or more fields in the at least one first data structure, wherein one or more of the segmented data records are associated with a key field specifying a value of a key; and when instructions are received through the editor interface to join segmented data records based on one or more values of one or more keys:

for segmented data records associated with a given value of a key, joining the segmented data records associated with the given value of the key; and outputting the joined data records.

10. The method of claim 9, wherein a data structure includes a key field that represents a key for that data structure, a record is associated with a value of the key, the method further includes:

selecting a plurality of fields from a plurality of selected data structures; and storing in memory executable instructions that when executed:

select, for a specified value of the key, values for the respective selected fields;

join the selected values for the specified value of the key; and output the joined values.

11. The method of claim 9, wherein the representations are first representations, and wherein the method further includes:

displaying in the editor interface a second representation of the executable instructions.

12. The method of claim 11, further including:

receiving, through the editor interface, selection data specifying selection of the second representation and further specifying that one or more criteria be applied to those output, joined values of one or more given fields represented by the at least one of the second data structures.

13. The method of claim 9, including:

displaying a user interface with one or more first controls for selecting data structures and with one or more second controls for modifying one or more fields.

14. The method of claim 9, further including:

receiving, through the editor interface, additional data specifying one or more criteria to be applied to one or more given fields represented by one or more selectable portions selected through the editor interface;

wherein segmenting includes segmenting the plurality of received data records by identifying which of the received data records have one or more value of one or more fields that correspond to one or more fields represented in the one or more selectable portions selected and that satisfy the one or more criteria.

15. The method of claim 9, wherein a data structure includes one or more records, with each record having one or more values for a particular field.

16. The method of claim 9, wherein at least one of the data sources includes an unselected data structure.

17. One or more non-transitory machine-readable media for producing a subset of data from a plurality of data sources, specifying one or more attributes of one or more respective fields of the subset and displaying an editor interface that enables segmentation of data records by displaying one or more representations of the one or more specified attributes, the one or more machine-readable media storing instructions that are executable by one or more processing devices to perform operations including:
   identifying a plurality of data sources to be represented in an editor interface;
   generating a subset of data included in the plurality of data sources, by:
      for each of the data sources,
         identifying one or more first data structures from that data source, with each first data structure including one or more fields; and
         for at least one first data structure,
            accessing a second data structure corresponding to the at least one first data structure; and
            specifying one or more attributes of one or more respective fields in that second data structure, with the one or more specified attributes of the one or more respective fields of the second data structure corresponding to a version of one or more attributes of one or more fields in the at least one first data structure, wherein the version includes a modification to the one or more attributes of the one or more fields of the at least one first data structure; and
      storing in memory second data structures included in the subset, with at least one of the second data structures including one or more given attributes corresponding to the version of the one or more attributes of the one or more respective fields of the at least one first data structure corresponding to the at least one of the second data structures, wherein the version includes the modification to the one or more attributes of the one or more fields in the at least one first data structure;
   displaying, in the editor interface, representations of the one or more given attributes (i) specified for the at least one of the second data structures, and (ii) corresponding to the version of the one or more attributes of the one or more respective fields of the at least one first data structure corresponding to the at least one of the second data structures in the subset, wherein the version includes the modification to the one or more attributes of the one or more fields in the at least one first data structure;
   receiving, through the editor interface, selection data specifying selection of one or more representations of the one or more given attributes corresponding to the version of the one or more attributes of the one or more fields of the at least one first data structure corresponding to the at least one of the second data structures, wherein the version includes the modification to the one or more attributes of the one or more fields in the at least one first data structure;
   receiving, through the editor interface, one or more criteria be applied to data records;
   based on the one or more criteria, segmenting a plurality of received data records by identifying some of the received data records that have one or more fields represented in the one or more selected representations of the one or more given attributes corresponding to the version of the one or more attributes of the one or more fields of the at least one first data structure corresponding to the at least one of the second data structures, wherein the version includes the modification to the one or more attributes of the one or more fields in the at least one first data structure, wherein one or more of the segmented data records are associated with a key field specifying a value of a key; and
   when instructions are received through the editor interface to join segmented data records based on one or more values of one or more keys:
      for segmented data records associated with a given value of a key, joining the segmented data records associated with the given value of the key; and
      outputting the joined data records.

18. The one or more machine-readable media of claim 17, wherein a data structure includes a key field that represents a key for that data structure, a record is associated with a value of the key, wherein the operations further include:
   selecting a plurality of fields from a plurality of selected data structures; and
   storing in memory executable instructions that when executed:
      select, for a specified value of the key, values for the respective selected fields;
      join the selected values for the specified value of the key; and
      output the joined values.

19. The one or more machine-readable media of claim 17, wherein the representations are first representations, and wherein the operations further include:
   displaying in the editor interface a second representation of the executable instructions.

20. The one or more machine-readable media of claim 19, wherein the operations further include:
   receiving, through the editor interface, selection data specifying selection of the second representation and further specifying that one or more criteria be applied to those output, joined values of one or more given fields represented by the at least one of the second data structures.

21. The one or more machine-readable media of claim 17, wherein the operations further include:
   displaying a user interface with one or more first controls for selecting data structures and with one or more second controls for modifying one or more fields.

22. The one or more machine-readable media of claim 17, wherein the operations further include:
   receiving, through the editor interface, additional data specifying one or more criteria to be applied to one or more given fields represented by one or more selectable portions selected through the editor interface;
   wherein segmenting includes segmenting the plurality of received data records by identifying which of the received data records have one or more value of one or more fields that correspond to one or more fields represented in the one or more selectable portions selected and that satisfy the one or more criteria.

23. The one or more machine-readable media of claim 17, wherein a data structure includes one or more records, with each record having one or more values for a particular field.

24. The one or more machine-readable media of claim 17, wherein at least one of the data sources includes an unselected data structure.

\* \* \* \* \*

UNITED STATES PATENT AND TRADEMARK OFFICE
CERTIFICATE OF CORRECTION

PATENT NO. : 11,561,993 B2
APPLICATION NO. : 16/163647
DATED : January 24, 2023
INVENTOR(S) : Trevor Murphy and Oded Ravid It is certified that error appears in the above-identified patent and that said Letters Patent is hereby corrected as shown below:

In the Claims

Column 36, Line 2, Claim 1, after "criteria", insert -- to --

Column 38, Line 5, Claim 9, after "criteria", insert -- to --

Column 39, Line 67, Claim 17, after "criteria", insert -- to --

Signed and Sealed this
Second Day of January, 2024

Katherine Kelly Vidal
*Director of the United States Patent and Trademark Office*